(12) United States Patent
Mori et al.

(10) Patent No.: US 10,374,503 B2
(45) Date of Patent: Aug. 6, 2019

(54) POWER CONVERSION DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 44 days.

(21) Appl. No.: 15/544,351

(22) PCT Filed: Feb. 16, 2015

(86) PCT No.: PCT/JP2015/054112
§ 371 (c)(1),
(2) Date: Jul. 18, 2017

(87) PCT Pub. No.: WO2016/132427
PCT Pub. Date: Aug. 25, 2016

(65) Prior Publication Data
US 2018/0269771 A1    Sep. 20, 2018

(51) Int. Cl.
*H02P 27/06* (2006.01)
*H02M 1/00* (2006.01)
(Continued)

(52) U.S. Cl.
CPC .............. *H02M 1/00* (2013.01); *H02M 1/14* (2013.01); *H02M 7/493* (2013.01);
(Continued)

(58) Field of Classification Search
CPC .. H02M 1/00; H02M 1/14; H02M 2001/0009; H02M 7/53871; H02P 27/06
See application file for complete search history.

(56) References Cited

U.S. PATENT DOCUMENTS 5,488,286 A * 1/1996 Rozman ................. F02N 11/04
290/46
2009/0322264 A1* 12/2009 Imura ................... B60L 15/025
318/400.09
(Continued)

FOREIGN PATENT DOCUMENTS

JP    2001-327173 A    11/2001
JP    2012-085379 A    4/2012
(Continued)

OTHER PUBLICATIONS

International Search Report for PCT/JP/2015/054112 dated Apr. 28, 2015 [PCT/ISA/210].
(Continued)

*Primary Examiner* — Muhammad S Islam
(74) *Attorney, Agent, or Firm* — Sughrue Mion, PLLC; Richard C. Turner

(57) ABSTRACT

When a first medium phase voltage command and a first minimum phase voltage command are close to each other in a first three-phase voltage command, then a first three-phase application voltage is calculated from the first three-phase voltage command by switching from a first calculation process, which corresponds to first two-phase modulation, to a second calculation process, and when a second medium phase voltage command and a second minimum phase voltage command are close to each other in a second three-phase voltage command, a second three-phase application voltage is calculated from the second three-phase voltage command by switching from a third calculation process, which corresponds to first two-phase modulation, to fourth calculation process.

14 Claims, 27 Drawing Sheets

(51) Int. Cl.
*H02M 1/14* (2006.01)
*H02M 7/5387* (2007.01)
*H02P 25/22* (2006.01)
*H02P 27/08* (2006.01)
*H02M 7/493* (2007.01)
*H02P 25/022* (2016.01)
*H02P 21/22* (2016.01)
*H02M 3/158* (2006.01)

(52) U.S. Cl.
CPC ... *H02M 7/53871* (2013.01); *H02M 7/53873* (2013.01); *H02P 21/22* (2016.02); *H02P 25/022* (2013.01); *H02P 25/22* (2013.01); *H02P 27/06* (2013.01); *H02P 27/085* (2013.01); *H02M 2001/0009* (2013.01); *H02M 2003/1586* (2013.01)

(56) References Cited

U.S. PATENT DOCUMENTS

| | | | |
|---|---|---|---|
| 2011/0260656 A1* | 10/2011 | Kazama | B60L 11/1803 318/85 |
| 2012/0049782 A1 | 3/2012 | Suzuki | |
| 2012/0206077 A1* | 8/2012 | Yoneshima | H02P 6/185 318/400.33 |
| 2013/0175012 A1* | 7/2013 | Yamada | H05K 999/99 165/121 |
| 2013/0229135 A1* | 9/2013 | Long | H02P 21/13 318/400.34 |
| 2013/0334995 A1* | 12/2013 | Kuroda | H02P 27/06 318/400.27 |
| 2015/0244301 A1* | 8/2015 | Sato | H02P 27/06 318/139 |

FOREIGN PATENT DOCUMENTS

| | | |
|---|---|---|
| JP | 5354369 B | 11/2013 |
| WO | 2012/081493 A1 | 6/2012 |

OTHER PUBLICATIONS

Written Opinion for PCT/JP/2015/054112 dated Apr. 28, 2015 [PCT/ISA/237].
Kubo et al., "Variable Carrier Frequency Mixed PWM Technique Based on Current Ripple Prediction for Reduced Switching Loss", The 2014 International Power Electronics Conference, 2014, XP 55503128, pp. 1601-1605 (total 5 pages).
Dusmez et al., "A New SVPWM Technique for DC Negative Rail Current Sensing at Low Speeds", IEEE Transactions on Industrial Electronics, Feb. 2015, vol. 62, No. 2, XP 11569123, pp. 826-831 (total 6 pages).
Holmes et al., "Pulse Width Modulation for Power Converters Principles and Practice", IEEE, 2003, XP 55516360, pp. 299-315 (total 19 pages).
Communication dated Oct. 25, 2018 from the European Patent Office in counterpart Application No. 15882532.3.

* cited by examiner

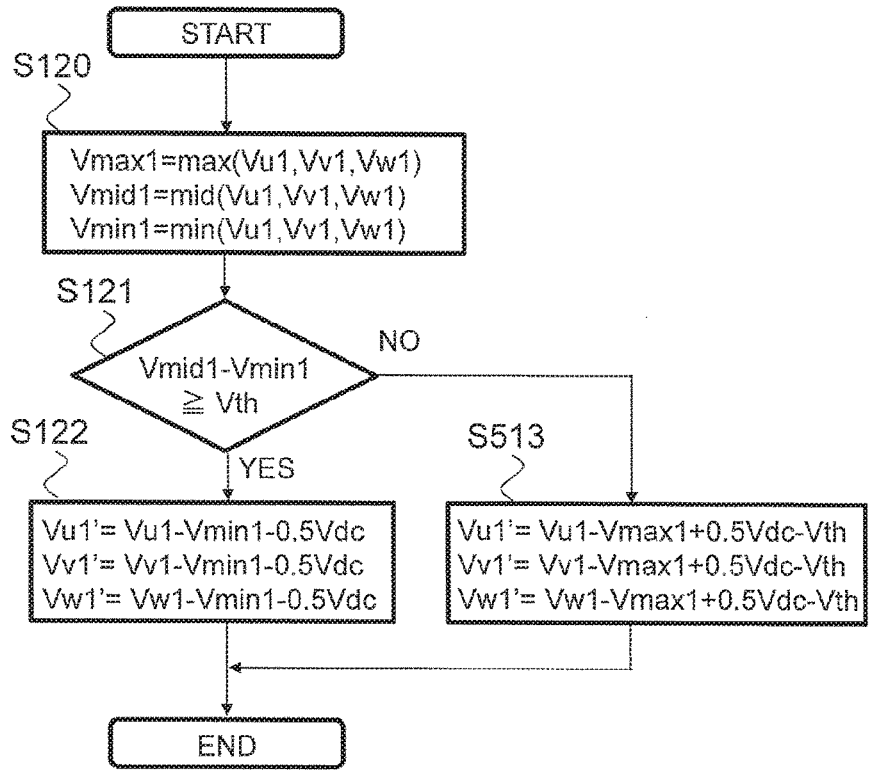
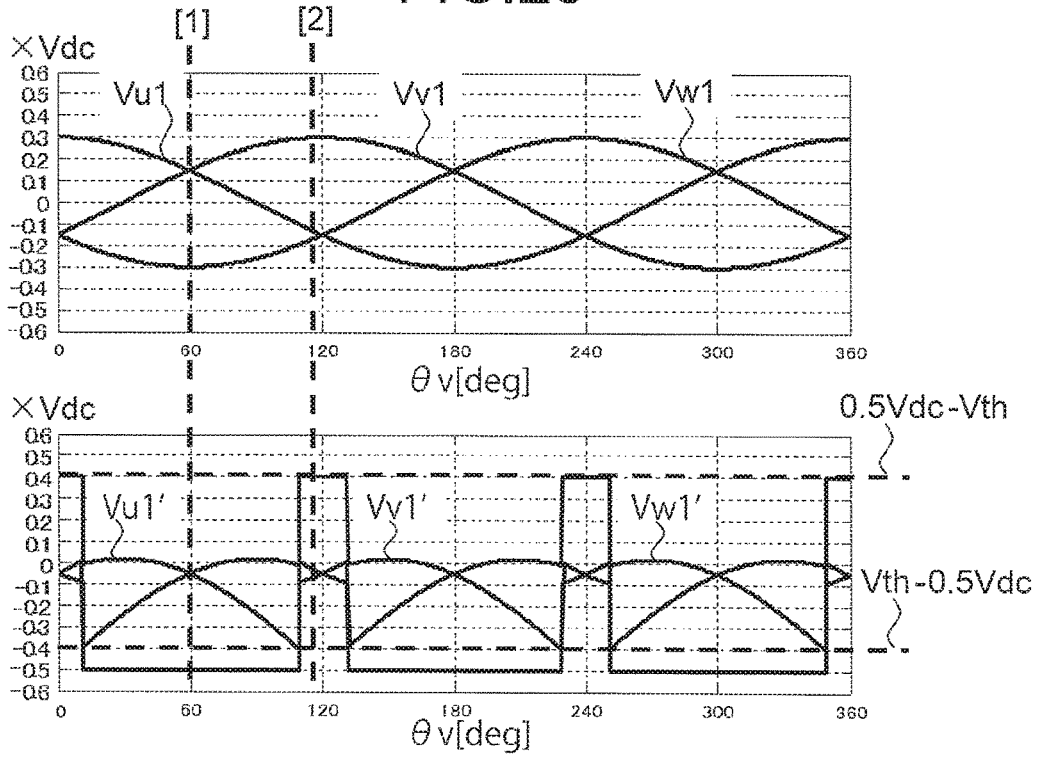

| Qup1 | Qun1 | Qvp1 | Qvn1 | Qwp1 | Qwn1 | FIRST VOLTAGE VECTOR | Iinv1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

| Sup2 | Sun2 | Svp2 | Svn2 | Swp2 | Swn2 | SECOND VOLTAGE VECTOR | Iinv2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | -Iw2 |
| 0 | 1 | 1 | 0 | 0 | 1 | V3(2) | Iv2 |
| 0 | 1 | 1 | 0 | 1 | 0 | V4(2) | -Iu2 |
| 0 | 1 | 0 | 1 | 1 | 0 | V5(2) | Iw2 |
| 1 | 0 | 0 | 1 | 1 | 0 | V6(2) | -Iv2 |
| 1 | 0 | 1 | 0 | 1 | 0 | V7(2) | 0 |

FIG.39
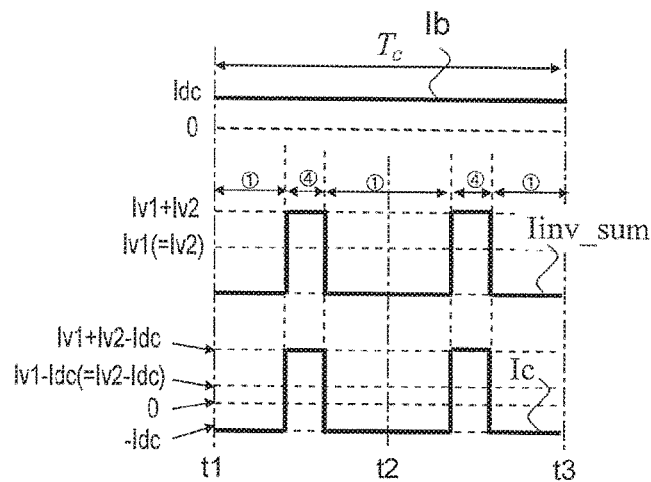
FIG.40
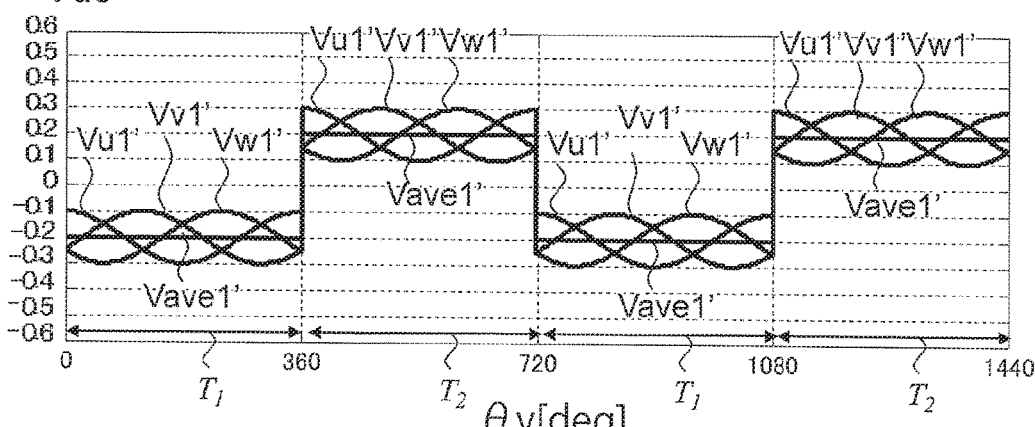
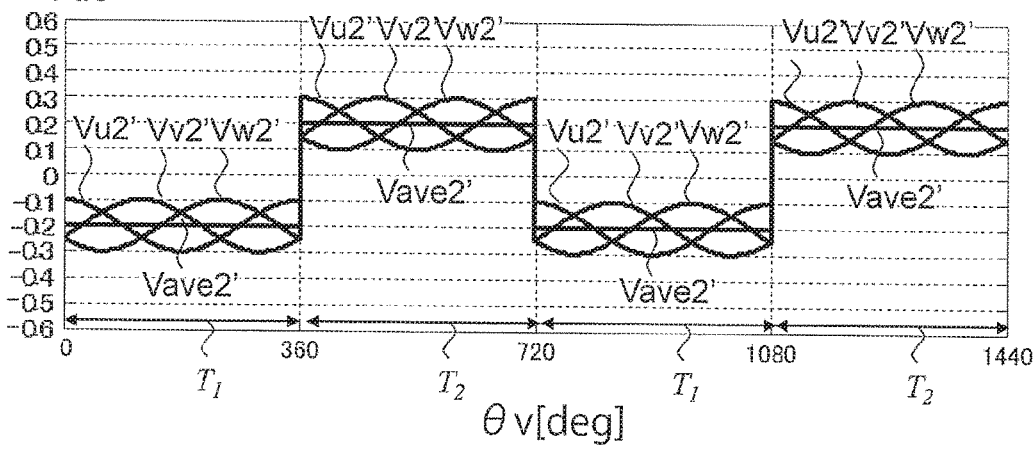

POWER CONVERSION DEVICE

CROSS REFERENCE TO RELATED APPLICATIONS

This application is a National Stage of International Application No. PCT/JP2015/054112 filed Feb. 16, 2015, the contents of all of which are incorporated herein by reference in their entirety.

TECHNICAL FIELD

The present invention which relates to a power conversion device provided with a current detector, and which aims to improve the current detection accuracy of the current detector.

BACKGROUND ART

A method for suppressing the ripple current of a capacitor in a power conversion device has been proposed in the prior art (see, for example, PTL 1). Specifically, the prior art described in PTL 1 discloses the following technology.

More specifically, ripple current in a capacitor is reduced by setting the phase difference in a PWM command signal between a first inverter section and a second inverter section to 180°, and carrying out first two-phase modulation for controlling switching such that both inverter sections have a duty ratio of 0% in the smallest phase (see paragraphs [0044] to [0061] of PTL 1).

More specifically, ripple current in a capacitor is reduced by setting the phase difference in a PWM command signal between a first inverter section and a second inverter section to 180°, and carrying out second two-phase modulation for controlling switching such that both inverter sections have a duty ratio of 100% in the largest phase (see paragraphs [0062] to [0078] of PTL 1).

CITATION LIST

Patent Literature

[PTL 1] Japanese Patent No. 5354369

SUMMARY OF INVENTION

Technical Problem

The problems of the prior art which have been the subject of new focus by the present inventors are described in detail in the embodiments, but a summary thereof is given below.

More specifically, in the prior art technology described in PTL 1, there is a problem in that noise is mixed into the detection value which is detected by the current detector, if the first two-phase modulation is carried out in a state where a first medium phase voltage command and a first minimum phase voltage command, of the three-phase voltage commands input from the voltage command calculator, are close to each other. Similarly, there is also a problem in that noise is mixed into the detection value which is detected by the current detector, if the first two-phase modulation is carried out in a state where a second medium phase voltage command and a second minimum phase voltage command, of the three-phase voltage commands input from the voltage command calculator, are close to each other.

In this way, noise and vibration are produced by the AC rotary machine, as a result of noise being mixed into the detection values detected by the current detector.

The present invention was devised in order to resolve problems such as that described above, an object thereof being to achieve a power conversion device which can improve the accuracy of current detection by a current detector compared to the prior art, while suppressing ripple current in a smoothing capacitor.

Solution to Problem

The power conversion device of the present invention is a power conversion device to which a DC power source which outputs DC voltage and an AC rotary machine having a first three-phase coil and a second three-phase coil are connected, the power conversion device including: a first power converter having a first high potential-side switching element and a first low potential-side switching element, and converting the DC voltage supplied from the DC power source into a first AC voltage and applying the first AC voltage to the first three-phase coil; a second power converter having a second high potential-side switching element and a second low potential-side switching element, and converting the DC voltage supplied from the DC power source into a second AC voltage and applying the second AC voltage to the second three-phase coil; a control unit which respectively controls the first high potential-side switching element and the first low potential-side switching element, and the second high potential-side switching element and the second low potential-side switching element; a first current detector which detects a first three-phase current flowing in the first three-phase coil; and a second current detector which detects a second three-phase current flowing in the second three-phase coil, wherein the control unit includes: a voltage command calculator which calculates a first three-phase voltage command for the first three-phase coil and a second three-phase voltage command for the second three-phase coil on the basis of a control command to the AC rotary machine, and outputs the calculated first three-phase voltage command and second three-phase voltage command; an offset calculator which calculates a first three-phase application voltage to be applied to the first three-phase coil from the first three-phase voltage command input from the voltage command calculator and outputs the calculated first three-phase application voltage, and also calculates a second three-phase application voltage to be applied to the second three-phase coil from the second three-phase voltage command input from the voltage command calculator and outputs the calculated second three-phase application voltage; and a switching signal generator which outputs a first switching signal to the first high potential-side switching element and the first low potential-side switching element by comparing the first three-phase application voltage input from the offset calculator with a first carrier wave signal, and outputs a second switching signal to the second high potential-side switching element and the second low potential-side switching element by comparing the second three-phase application voltage input from the offset calculator with a second carrier wave signal having a phase difference of 180° with respect to the first carrier wave signal; and when voltage commands in the first three-phase voltage command input from the voltage command calculator are taken to be a first maximum phase voltage command, a first medium phase voltage command, and a first minimum phase voltage command, in order of decreasing magnitude, and voltage commands in the second three-phase voltage command input from the voltage command calculator are taken to be a second maximum phase voltage command, a second medium phase voltage command and a second minimum phase voltage command, in order of decreasing magnitude, then the offset calculator, in accordance with a first differential value which is a difference between the first medium phase voltage command and the first minimum phase voltage command, executes a first calculation process for calculating the first three-phase application voltage by changing all of the voltage commands in the first three-phase voltage command by the same amount mutually in such a manner that the voltage applied to a phase corresponding to the first minimum phase voltage command becomes equal to a minimum value of the first carrier wave signal, when the first differential value is equal to or greater than a previously established reference voltage threshold value; executes a second calculation process for calculating the first three-phase application voltage from the first three-phase voltage command in such a manner that the voltage applied to a phase corresponding to the first minimum phase voltage command is equal to or greater than a reference voltage lower limit value, which is a sum of the reference voltage threshold value and the minimum value of the first carrier wave signal, when the first differential value is less than the reference voltage threshold value; and in accordance with a second differential value which is a difference between the second medium phase voltage command and the second minimum phase voltage command; executes a third calculation process for calculating the second three-phase application voltage by changing all of the voltage commands of the second three-phase voltage command by the same amount mutually in such a manner that the voltage applied to a phase corresponding to the second minimum phase voltage command is equal to the minimum value of the second carrier wave signal, when the second differential value is equal to or greater than the reference voltage threshold value; and executes a fourth calculation process for calculating the second three-phase application voltage from the second three-phase voltage command in such a manner that the voltage applied to a phase corresponding to the second minimum phase voltage command is equal to or greater than the reference voltage lower limit value, when the second differential value is less than the reference voltage threshold value.

Advantageous Effects of Invention

According to the present invention, if a first medium phase voltage command and a first minimum phase voltage command are close to each other in a first three-phase voltage command, then a first three-phase application voltage is calculated from the first three-phase voltage command by switching from a first calculation process which corresponds to first two-phase modulation, to a second calculation process, and if a second medium phase voltage command and a second minimum phase voltage command are close to each other in a second three-phase voltage command, a second three-phase application voltage is calculated from the second three-phase voltage command by switching from a third calculation process which corresponds to first two-phase modulation, to fourth calculation process. By adopting a configuration of this kind, it is possible to achieve a power conversion device wherein the occurrence of switching in a second power converter can be avoided during a current detection period of a first current detector, and the occurrence of switching in a first power converter can be avoided during a current detection period of a second current detector, and the accuracy of current detection by the current detector can be improved in comparison with the prior art, while suppressing ripple current in a smoothing capacitor.

BRIEF DESCRIPTION OF DRAWINGS

FIG. 24 is a flowchart showing operations performed when a first offset calculator calculates a first three-phase application voltage in a fifth embodiment of the present invention.

FIG. 25 is an illustrative diagram depicting a first three-phase voltage command output by a voltage command calculator, and the first three-phase application voltage output by the first offset calculator, in the fifth embodiment of the present invention.

FIG. 39 is an illustrative diagram for the purpose of comparison with FIG. 38.

FIG. 40 is an illustrative diagram showing the first three-phase application voltage and the second three-phase application voltage output by the offset calculator when the offset calculator executes a sixth calculation process and a seventh calculation process in alternating fashion in the seventh embodiment of the present invention.

DESCRIPTION OF EMBODIMENTS

Below, a power conversion device according to the present invention is described below on the basis of preferred embodiments with reference to the drawings. In the illustration, parts which are the same or corresponding are labelled with the same numerals and repeated description thereof is omitted.

First Embodiment

Figure 1:
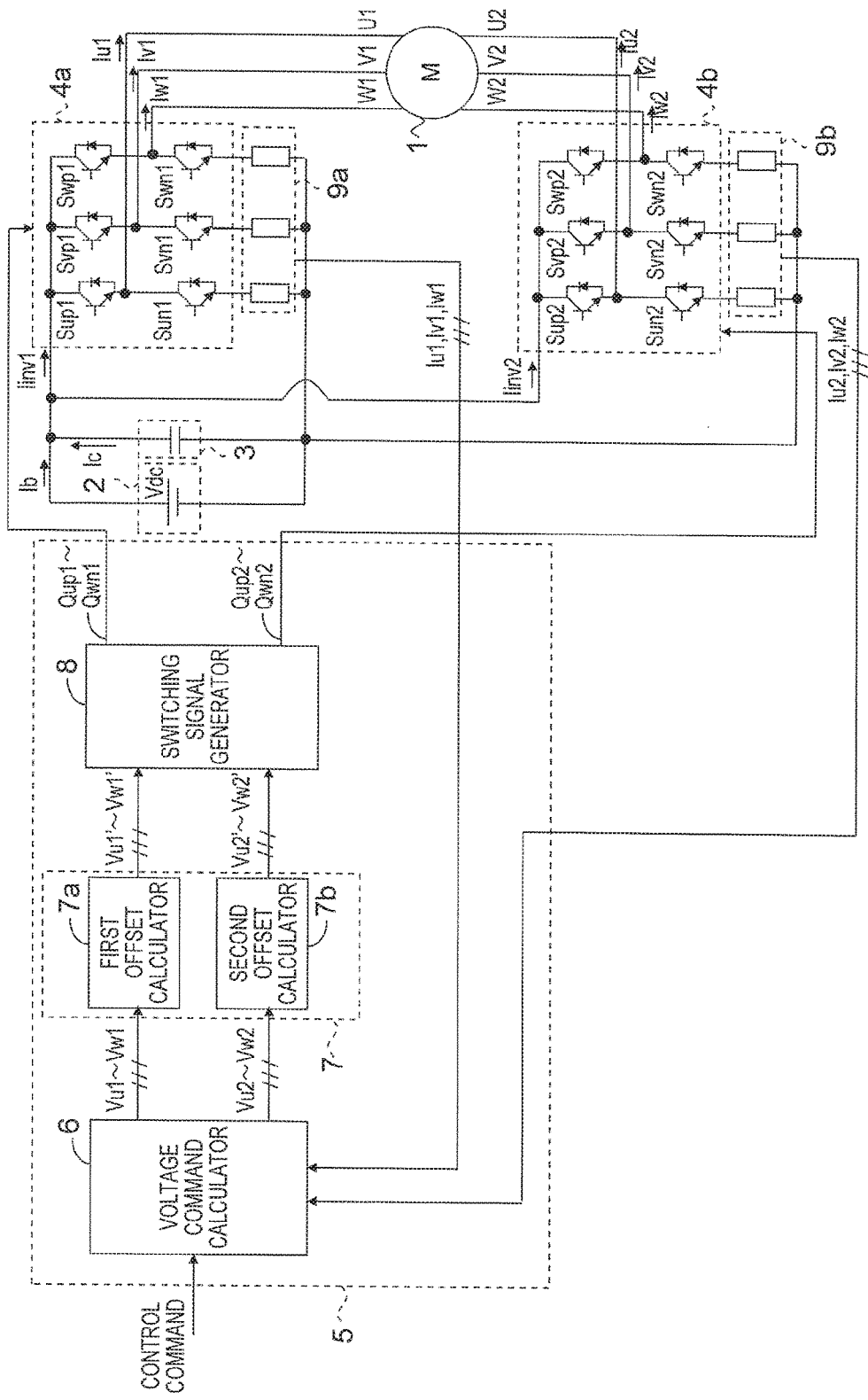
FIG. 1 is a schematic drawing showing the whole of a power conversion device according to a first embodiment of the present invention.

FIG. 1 is a schematic drawing showing the whole of a power conversion device according to a first embodiment of the present invention. FIG. 1 also shows an AC rotary machine 1 and a DC power source 2 which are connected to the power conversion device according to the first embodiment.

As illustrated in FIG. 1, the power conversion device according to the first embodiment comprises a smoothing capacitor 3, a first power converter 4a, a second power converter 4b, a control unit 5, a first current detector 9a and a second current detector 9b.

The AC rotary machine 1 is a three-phase AC rotary machine which has a first three-phase coil constituted by a U-phase coil U1, a V-phase coil V1 and a W-phase coil W1, and a second three-phase coil constituted by a U-phase coil U2, a V-phase coil V2 and a W-phase coil W2. Furthermore, in the AC rotary machine 1, the first three-phase coil and the second three-phase coil are housed in a stator, without being electrically connected.

Specific examples of an AC rotary machine 1 are a permanent magnet synchronous rotary machine, an induction rotary machine or a synchronous reluctance rotary machine, etc. The invention of the present application can be applied to an AC rotary machine of any type, provided that it is an AC rotary machine having two three-phase coils.

The DC power source 2 outputs a DC voltage Vdc to the first power converter 4a and the second power converter 4b. The DC power source 2 includes any devices which output a DC voltage, such as a battery, DC-DC converter, diode rectifier, PWM rectifier, etc.

The smoothing capacitor 3 is provided in parallel connection with the DC power source 2, in order to suppress variation in the bus line current and achieve a stable DC current. The smoothing capacitor 3 is not illustrated in detail in FIG. 1, but apart from the true capacitance C of the capacitor, there is an equivalent serial resistance Rc and a lead inductance Lc.

The first power converter 4a includes a reverse conversion circuit (in other words, an inverter). More specifically, the first power converter 4a includes a first high potential-side switching element which is configured from switching elements Sup1, Svp1 and Swp1, and a first low potential-side switching element which is configured from switching elements Sun1, Svn1 and Swn1.

Specific examples of the first high potential-side switching elements and the first low potential-side switching elements are IGBTs, semiconductor switches, such as bipolar transistors or MOS power transistors, and diodes connected inversely in parallel.

The first power converter 4a converts the DC voltage Vdc input from the DC power source 2, by controlling the on or off switching of the first high potential-side switching elements and the first low potential-side switching elements in accordance with a first switching signal input from the control unit 5. Furthermore, when the first power converter 4a applies the converted voltage to the first three-phase coil, a first three-phase current flows in the first three-phase coil. The first three-phase current comprises a U-phase current Iu1, a V-phase current Iv1 and a W-phase current Iw1.

In this respect, the first switching signal comprises switching signals Qup1 to Qwn1 (in other words, the switching signals Qup1, Qun1, Qvp1, Qvn1, Qwp1 and Qwn1). The switching signals Qup1, Qvp1 and Qwp1 are switching signals for switching the switching elements Sup1, Svp1 and Swp1 respectively on or off. Furthermore, the switching signals Qun1, Qvn1 and Qwn1 are switching signals for switching the switching elements Sun1, Svn1 and Swn1 respectively on or off.

Below, a value of "1" in the switching signals Qup1 to Qwn1 indicates that a signal for switching on the corresponding switching element is output, and a value of "0" indicates that a signal for switching off the corresponding switching element is output.

The second power converter 4b includes a reverse conversion circuit (in other words, an inverter). More specifically, the second power converter 4b includes a second high potential-side switching element which is configured from switching elements Sup2, Svp2 and Swp2, and a second low potential-side switching element which is configured from switching elements Sun2, Svn2 and Swn2.

Specific examples of the second high potential-side switching elements and the second low potential-side switching elements are IGBTs, semiconductor switches, such as bipolar transistors or MOS power transistors, and diodes connected inversely in parallel.

The second power converter 4b converts the DC voltage Vdc input from the DC power source 2, by controlling the on or off switching of the second high potential-side switching elements and the second low potential-side switching elements in accordance with a second switching signal input from the control unit 5. Furthermore, when the second power converter 4b applies the converted voltage to the second three-phase coil, a second three-phase current flows in the second three-phase coil. The second three-phase current comprises a U-phase current Iu2, a V-phase current Iv2 and a W-phase current Iw2.

In this respect, the second switching signal comprises switching signals Qup2 to Qwn2 (in other words, the switching signals Qup2, Qun2, Qvp2, Qvn2, Qwp2 and Qwn2). The switching signals Qup2, Qvp2 and Qwp2 are switching signals for switching the switching elements Sup2, Svp2 and Swp2 respectively on or off. Furthermore, the switching signals Qun2, Qvn2 and Qwn2 are switching signals for switching the switching elements Sun2, Svn2 and Swn2 respectively on or off.

Below, a value of "1" in the switching signals Qup2 to Qwn2 indicates that a signal for switching on the corresponding switching element is output, and a value of "0" indicates that a signal for switching off the corresponding switching element is output.

The control unit 5 is described below. As illustrated in FIG. 1, the control unit 5 includes a voltage command calculator 6, an offset calculator 7 including a first offset calculator 7a and a second offset calculator 7b, and a switching signal generator 8.

The voltage command calculator 6 calculates a first three-phase voltage command for the first three-phase coil and a second three-phase voltage command for the second three-phase coil, on the basis of a control command input to the AC rotary machine 1, as voltage commands for applying voltages to the first three-phase coil and the second three-phase coil in order to drive the AC rotary machine 1. Furthermore, the voltage command calculator 6 outputs the calculated first three-phase voltage command to the first offset calculator 7a and outputs the calculated second three-phase voltage command to the second offset calculator 7b.

The first three-phase voltage command comprises a U-phase voltage command Vu1, a V-phase voltage command Vv1 and a W-phase voltage command Vw1. Furthermore, the second three-phase voltage command comprises a U-phase voltage command Vu2, a V-phase voltage command Vv2 and a W-phase voltage command Vw2.

In this respect, the specific calculation method for the first three-phase voltage command and the second three-phase voltage command performed by the voltage command calculator 6 is well known, and therefore detailed description thereof is omitted here, but the following examples thereof may be cited.

For example, a current command for the AC rotary machine 1 is set as a control command for the AC rotary machine 1 which is input to the voltage command calculator 6. In this case, the voltage command calculator 6 calculates the first three-phase voltage command by proportional integral control such that the deviation between the set current command and the first three-phase current detected by the first current detector 9a is zero. Furthermore, the voltage command calculator 6 calculates the second three-phase voltage command by proportional integral control such that the deviation between the set current command and the second three-phase current detected by the second current detector 9b is zero. In other words, the voltage command calculator 6 calculates the first three-phase voltage command and the second three-phase voltage command by current feedback control.

The first offset calculator 7a calculates the first three-phase application voltage to be applied to the first three-phase coil, from the first three-phase voltage command input from the voltage command calculator 6, by executing one of a first calculation process and a second calculation process. The first offset calculator 7a also outputs the calculated first three-phase application voltage to the switching signal generator 8. The first three-phase application voltage comprises a U-phase application voltage Vu1', a V-phase application voltage Vv1' and a W-phase application voltage Vw1'.

Figure 2:
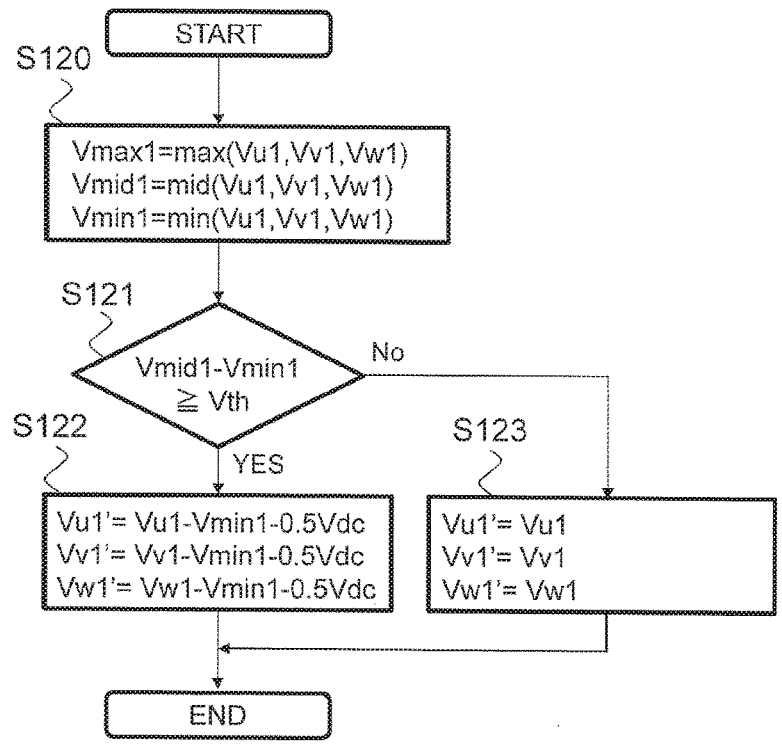
FIG. 2 is a flowchart showing operations performed when a first offset calculator calculates a first three-phase application voltage in the first embodiment of the present invention.
Figure 3:
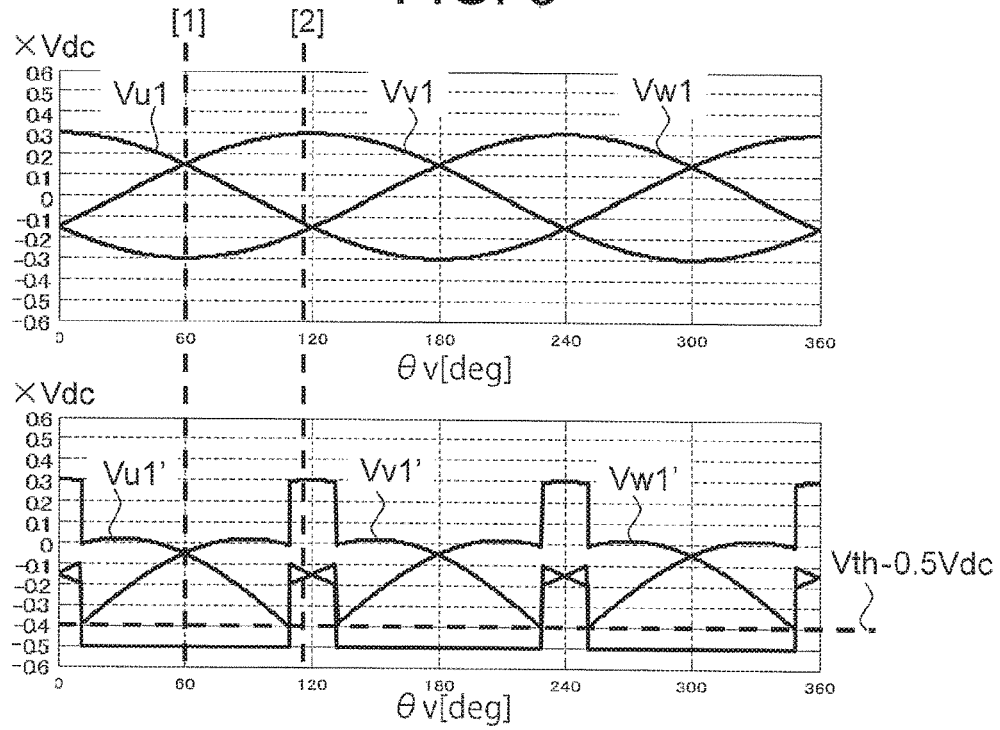
FIG. 3 is an illustrative diagram depicting a first three-phase voltage command output by a voltage command calculator, and the first three-phase application voltage output by the first offset calculator, in the first embodiment of the present invention.

Here, the calculation of the first three-phase application voltage by the first offset calculator 7a is described with reference to FIG. 2 and FIG. 3. FIG. 2 is a flowchart showing operations performed when the first offset calculator 7a calculates the first three-phase application voltage in the first embodiment of the present invention. FIG. 3 is an illustrative diagram depicting the first three-phase voltage command output by the voltage command calculator 6, and the first three-phase application voltage output by the first offset calculator 7a, in the first embodiment of the present invention.

As illustrated in FIG. 2, in step S120, the voltage commands in the first three-phase voltage command input from the voltage command calculator 6 by the first offset calculator 7a are, in order of decreasing magnitude, a first maximum phase voltage command Vmax1, a first medium phase voltage command Vmid1, and a first minimum phase voltage command Vmin1.

In step S121, the first offset calculator 7a calculates the difference between the first medium phase voltage command Vmid1 and the first minimum phase voltage command Vmin1, and determines whether or not the calculated difference is equal to or greater than a reference voltage threshold value Vth. The reference voltage threshold value Vth is described below.

In step S121, the first offset calculator 7a advances to step S122 if it is determined that the calculated difference is equal to or greater than the reference voltage threshold value Vth (in other words, YES), and advances to step S123 if it is determined that the calculated difference is less than the reference voltage threshold value Vth (in other words, NO).

In step S122, the first offset calculator 7a calculates the first three-phase application voltage by executing the first calculation process. More specifically, the first offset calculator 7a calculates the first three-phase application voltage by subtracting the first minimum phase voltage command Vmin1 from the respective voltage commands of the first three-phase voltage command, and then adding the minimum value of a first carrier wave signal C1. To give a specific example, the minimum value of the first carrier wave signal C1 is −0.5 Vdc.

In other words, in step S122, the first offset calculator 7a calculates the first three-phase application voltage by shifting all of the voltage commands in the first three-phase voltage command, equally, in the negative direction, in such a manner that the voltage applied to the phase corresponding to the first minimum phase voltage command Vmin1 is equal to the minimum value of the first carrier wave signal C1 (here, −0.5 Vdc).

In step S123, the first offset calculator 7a calculates the first three-phase application voltage by executing the second calculation process. More specifically, the first offset calculator 7a sets the voltage commands in the first three-phase voltage command directly as the first three-phase application voltage.

In other words, in step S123, the first offset calculator 7a calculates the first three-phase application voltage by setting all of the voltage commands in the first three-phase voltage command as the first three-phase application voltage, without shifting in the positive or negative direction.

The waveforms of the respective voltage commands in the first three-phase voltage command are depicted in the upper portion of FIG. 3 and the waveforms of the respective application voltages in the first three-phase application voltage are depicted in the lower portion of FIG. 3. Furthermore, in FIG. 3, the horizontal axis represents the voltage phase θv[deg] and the vertical axis represents the voltage value which is indicated as a multiple of the DC voltage Vdc. In FIG. 3, the first three-phase voltage command is a balanced three-phase AC voltage.

As illustrated in FIG. 3, the voltage commands in the first three-phase voltage command are sinusoidal waveforms with reference to 0. In each of the application voltages in the first three-phase application voltage, when the first calculation process is executed, the voltage applied to the phase corresponding to the first minimum phase voltage command Vmin1 is −0.5 Vdc. Furthermore, when the second calculation process is executed, the application voltages in the first three-phase application voltage match the voltage commands in the first three-phase voltage command.

The second offset calculator 7b calculates the second three-phase application voltage to be applied to the second three-phase coil, from the second three-phase voltage command input from the voltage command calculator 6, by executing one of a third calculation process and a fourth calculation process. Furthermore, the second offset calculator 7b also outputs the calculated second three-phase application voltage to the switching signal generator 8. The second three-phase application voltage comprises a U-phase application voltage Vu2', a V-phase application voltage Vv2' and a W-phase application voltage Vw2'.

Figure 4:
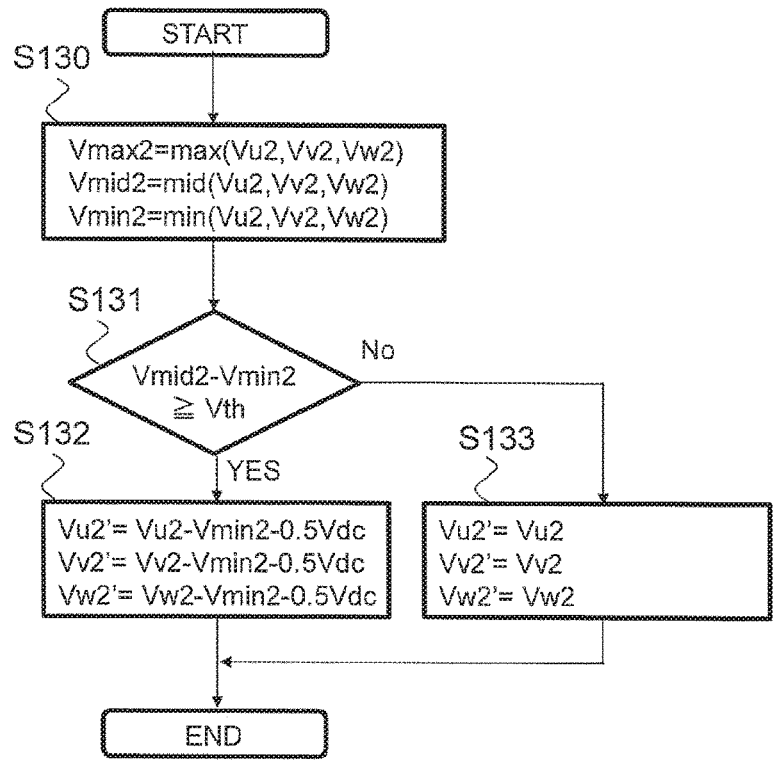
FIG. 4 is a flowchart showing operations performed when a second offset calculator calculates a second three-phase application voltage in the first embodiment of the present invention.
Figure 5:
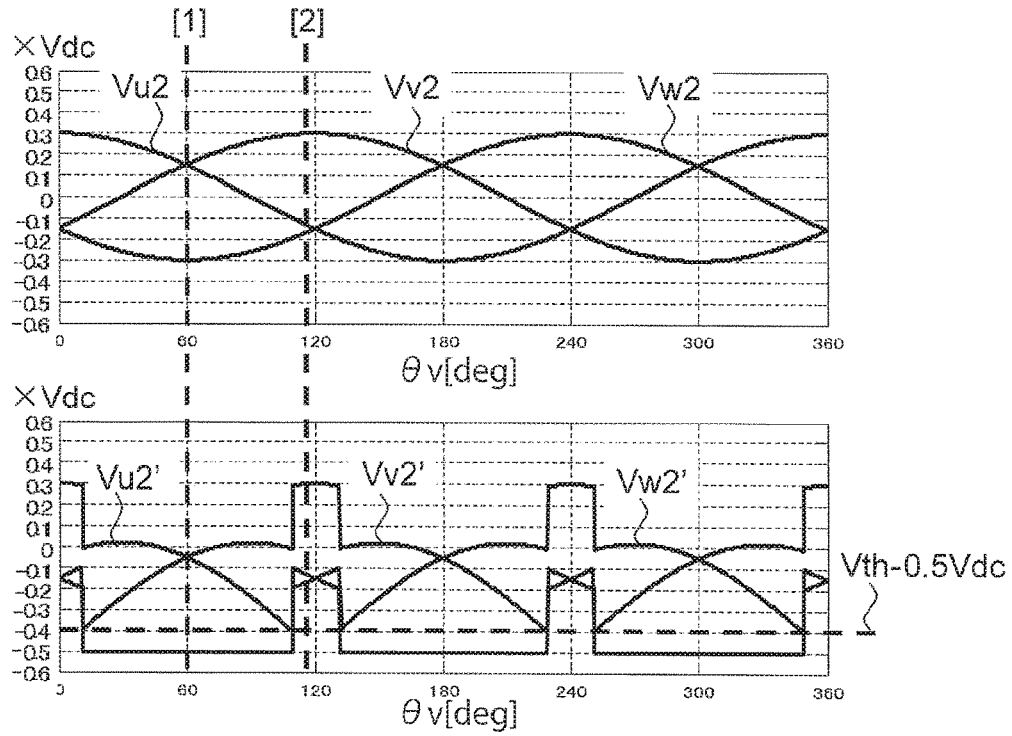
FIG. 5 is an illustrative diagram depicting a second three-phase voltage command output by the voltage command calculator, and the second three-phase application voltage output by the second offset calculator, in the first embodiment of the present invention.

Here, the calculation of the second three-phase application voltage by the second offset calculator 7b is described with reference to FIG. 4 and FIG. 5. FIG. 4 is a flowchart showing operations performed when the second offset calculator 7b calculates the second three-phase application voltage in the first embodiment of the present invention. FIG. 5 is an illustrative diagram depicting the second three-phase voltage command output by the voltage command calculator 6, and the second three-phase application voltage output by the second offset calculator 7b, in the first embodiment of the present invention.

As illustrated in FIG. 4, in step S130, the voltage commands in the second three-phase voltage command input from the voltage command calculator 6 by the second offset calculator 7b are, in order of decreasing magnitude, a second maximum phase voltage command Vmax2, a second medium phase voltage command Vmid2, and a second minimum phase voltage command Vmin2.

In step S131, the second offset calculator 7b calculates the difference between the second medium phase voltage command Vmid2 and the second minimum phase voltage command Vmin2, and determines whether or not the calculated difference is equal to or greater than the reference voltage threshold value Vth.

In step S131, the second offset calculator 7b advances to step S132 if it is determined that the calculated difference is equal to or greater than the reference voltage threshold value Vth (in other words, YES), and advances to step S133 if it is determined that the calculated difference is less than the reference voltage threshold value Vth (in other words, NO).

In step S132, the second offset calculator 7b calculates the second three-phase application voltage by executing the third calculation process. More specifically, the second offset calculator 7b calculates the second three-phase application voltage by subtracting the second minimum phase voltage command Vmin2 from the respective voltage commands of the second three-phase voltage command, and then adding the minimum value of a second carrier wave signal C2. To give a specific example, the minimum value of the second carrier wave signal C2 is −0.5 Vdc.

In other words, in step S132, the second offset calculator 7b calculates the second three-phase application voltage by shifting all of the voltage commands in the second three-phase voltage command, equally, in the negative direction, in such a manner that the voltage applied to the phase corresponding to the second minimum phase voltage command Vmin2 is equal to the minimum value of the second carrier wave signal C2 (here, −0.5 Vdc).

In step S133, the second offset calculator 7b calculates the second three-phase application voltage by executing the fourth calculation process. More specifically, the second offset calculator 7b sets the voltage commands in the second three-phase voltage command directly at the second three-phase application voltage.

In other words, in step S133, the second offset calculator 7b calculates the second three-phase application voltage by setting all of the voltage commands in the second three-phase voltage command as the second three-phase application voltage, without shifting in the positive or negative direction.

The waveforms of the respective voltage commands in the second three-phase voltage command are depicted in the upper portion of FIG. 5 and the waveforms of the respective application voltages in the second three-phase application voltage are depicted in the lower portion of FIG. 5. Furthermore, in FIG. 5, the horizontal axis represents the voltage phase θv[deg] and the vertical axis represents the voltage value which is indicated as a multiple of the DC voltage Vdc. Furthermore, in FIG. 5, the second three-phase voltage command is a balanced three-phase AC voltage.

As illustrated in FIG. 5, the voltage commands in the second three-phase voltage command are sinusoidal waveforms with reference to 0. In each of the application voltages in the second three-phase application voltage, when the third calculation process is executed, the voltage applied to the phase corresponding to the second minimum phase voltage command Vmin2 is −0.5 Vdc. Furthermore, when the fourth calculation process is executed, the application voltages in the second three-phase application voltage match the voltage commands of the second three-phase voltage command.

The switching signal generator 8 outputs the first switching signal respectively to the first high potential-side switching elements and the first low potential-side switching elements by comparing the first three-phase application voltage input from the first offset calculator 7a with the first carrier wave signal C1. In other words, the switching signal generator 8 outputs the switching signals Qup1 to Qwn1, in accordance with the application voltages in the first three-phase application voltage.

Furthermore, the switching signal generator 8 outputs the second switching signal respectively to the second high potential-side switching elements and the second low potential-side switching elements by comparing the second three-phase application voltage input from the second offset calculator 7b with the second carrier wave signal C2 having a phase difference of 180° with respect to the first carrier wave signal C1. In other words, the switching signal generator 8 outputs the switching signals Qup2 to Qwn2, in accordance with the application voltages in the second three-phase application voltage.

Moreover, the maximum value of the first carrier wave signal C1 is greater than the maximum value of the voltage commands in the first three-phase voltage command, and the minimum value of the first carrier wave signal C1 is smaller than the minimum value of the voltage commands in the first three-phase voltage command. Similarly, the maximum value of the second carrier wave signal C2 is greater than the maximum value of the voltage commands in the second three-phase voltage command, and the minimum value of the second carrier wave signal C2 is smaller than the minimum value of the voltage commands in the second three-phase voltage command.

In this respect, to give a concrete example, as stated above, the maximum value of the first carrier wave signal C1 and the second carrier wave signal C2 is set to 0.5 Vdc, and the minimum value thereof is set to −0.5 Vdc. Furthermore, as can be seen from FIG. 3 and FIG. 5, the maximum value of each of the voltage commands in the first three-phase voltage command and the second three-phase voltage command is set to 0.3 Vdc and the minimum value thereof is set to −0.3 Vdc.

Figure 6A:
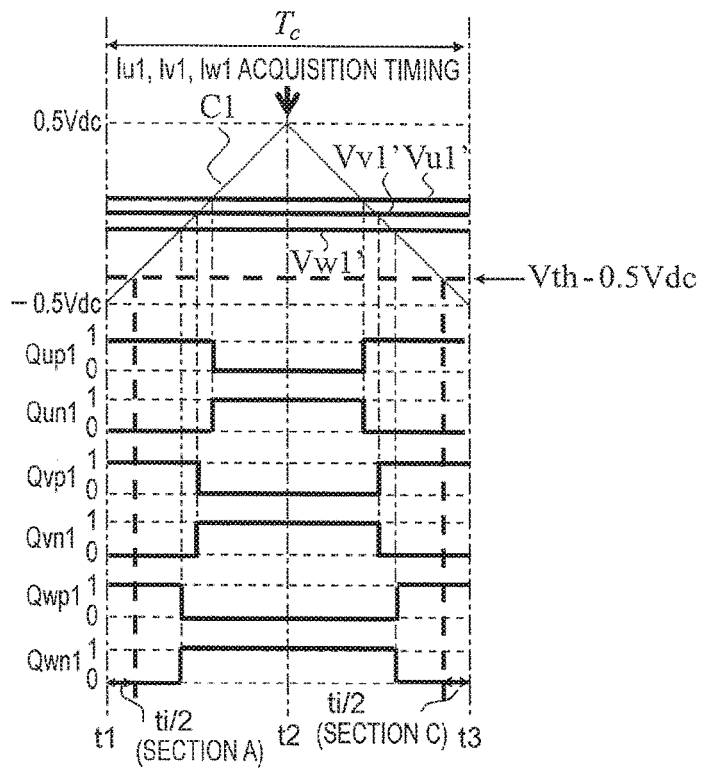
FIG. 6A is an illustrative diagram depicting a first switching signal which is output from a switching signal generator in the first embodiment of the present invention.
Figure 6B:
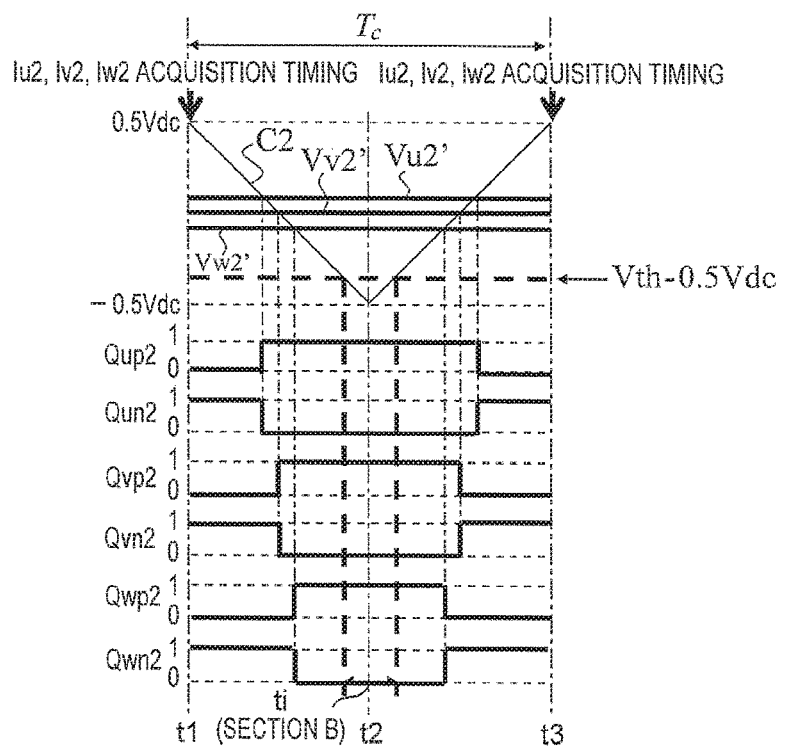
FIG. 6B is an illustrative diagram depicting a second switching signal which is output from the switching signal generator in the first embodiment of the present invention.

Here, the operation of the switching signal generator 8 is described further with reference to FIG. 6A and FIG. 6B. FIG. 6A is an illustrative diagram depicting the first switching signal which is output from the switching signal generator 8 in the first embodiment of the present invention. FIG. 6B is an illustrative diagram depicting the second switching signal which is output from the switching signal generator 8 in the first embodiment of the present invention.

FIG. 6A shows the respective waveforms of the first carrier wave signal C1, the first three-phase application voltage, and the switching signals Qup1 to Qwn1.

As illustrated in FIG. 6A, the first carrier wave signal C1 is a triangular wave having a carrier period Tc, and at timing t1 and t3, the voltage value is a minimum (here, −0.5 Vdc) and at timing t2, which is midway between the timing t1 and the timing t3, the voltage value is a maximum (here, 0.5 Vdc).

The switching signal generator 8 compares the application voltages in the first three-phase application voltage and the first carrier wave signal C1, and outputs the switching signals Qup1 to Qwn1 in accordance with the comparison results.

More specifically, as a result of the comparison between the U-phase application voltage Vu1' and the first carrier wave signal C1, the switching signal generator 8 outputs "Qup1=1 and Qun1=0", if the U-phase application voltage Vu1' is in a range greater than the first carrier wave signal C1, and outputs "Qup1=0 and Qun1=1", if the U-phase application voltage Vu1' is in a range equal to or lower than the first carrier wave signal C1.

Similarly, as a result of the comparison between the V-phase application voltage Vv1' and the first carrier wave signal C1, the switching signal generator 8 outputs "Qvp1=1 and Qvn1=0", if the V-phase application voltage Vv1' is in a range greater than the first carrier wave signal C1, and outputs "Qvp1=0 and Qvn1=1", if the V-phase application voltage Vv1' is in a range equal to or lower than the first carrier wave signal C1.

Similarly, as a result of the comparison between the W-phase application voltage Vw1' and the first carrier wave signal C1, the switching signal generator 8 outputs "Qwp1=1 and Qwn1=0", if the W-phase application voltage Vw1' is in a range greater than the first carrier wave signal C1, and outputs "Qwp1=0 and Qwn1=1", if the W-phase application voltage Vw1' is in a range equal to or lower than the first carrier wave signal C1.

FIG. 6B shows the respective waveforms of the second carrier wave signal C2, the second three-phase application voltage, and the switching signals Qup2 to Qwn2.

As illustrated in FIG. 6B, the second carrier wave signal C2 is a triangular wave having the carrier period Tc, and at timing t1 and t3, the voltage value is a maximum (here, 0.5 Vdc) and at timing t2, which is midway between the timing t1 and the timing t3, the voltage value is a minimum (here, −0.5 Vdc). Furthermore, the second carrier wave signal C2 has a phase difference of 180° with respect to the first carrier wave signal C1, when the carrier period Tc is represented by 360°.

The switching signal generator 8 compares the application voltages in the second three-phase application voltage and the second carrier wave signal C2, and outputs the switching signals Qup2 to Qwn2 in accordance with the comparison results.

More specifically, as a result of the comparison between the U-phase application voltage Vu2' and the second carrier wave signal C2, the switching signal generator 8 outputs "Qup2=1 and Qun2=0", if the U-phase application voltage Vu2' is in a range greater than the second carrier wave signal C2, and outputs "Qup2=0 and Qun2=1", if the U-phase application voltage Vu2' is in a range equal to or lower than the second carrier wave signal C2.

Similarly, as a result of the comparison between the V-phase application voltage Vv2' and the second carrier wave signal C2, the switching signal generator 8 outputs "Qvp2=1 and Qvn2=0", if the V-phase application voltage Vv2' is in a range greater than the second carrier wave signal C2, and outputs "Qvp2=0 and Qvn2=1", if the V-phase application voltage Vv2' is in a range equal to or lower than the second carrier wave signal C2.

Similarly, as a result of the comparison between the W-phase application voltage Vw2' and the second carrier wave signal C2, the switching signal generator 8 outputs "Qwp2=1 and Qwn2=0", if the W-phase application voltage Vw2' is in a range greater than the second carrier wave signal C2, and outputs "Qwp2=0 and Qwn2=1", if the W-phase application voltage Vw2' is in a range equal to or lower than the second carrier wave signal C2.

The first current detector 9a detects the respective currents in the first three-phase current flowing in the first three-phase coil. In the specific configuration of the first current detector 9a given here, a current detection resistance element is connected in series to each of the first low potential-side switching elements, for example.

In FIG. 1, current detection resistance elements is provided so as to correspond to each of the three phases, but it is also possible to use the fact that the overall sum of the currents in the first three-phase current is zero, and to provide the current detection resistance elements so as to correspond to two of the three phases. In other words, current detection resistance elements may be provided so as to correspond to at least two of the phases of the first power converter 4a.

The second current detector 9b detects the respective currents in the second three-phase current flowing in the second three-phase coil. In the specific configuration of the second current detector 9b given here, a current detection resistance element is connected in series with each of the second low potential-side switching elements, for example.

In FIG. 1, the current detection resistance element is provided so as to correspond to each of the three phases, but it is also possible to use the fact that the overall sum of the currents in the second three-phase current is zero, and to provide the current detection resistance element so as to correspond to two of the three phases. In other words, a current detection resistance element may be provided so as to correspond to at least two of the phases of the second power converter 4b.

Next, the timing for detecting the current and the conditions for achieving accurate current detection in the first current detector 9a and the second current detector 9b are described with reference to FIG. 6A and FIG. 6B.

The first current detector 9a detects the first three-phase current at the timing t2, which is the timing at which the first low potential-side switching elements all turn on. In FIG. 6A, at the timing t2, the first carrier wave signal C1 has a maximum value.

Furthermore, the second current detector 9b detects the second three-phase current at the timing t1 and the timing t3, which are the timings at which the second low potential-side switching elements all turn on. In FIG. 6B, at the timings t1 and t3, the second carrier wave signal C2 has a maximum value.

Furthermore, the time required respectively by the first current detector 9a and the second current detector 9b to detect the current is taken to be the activation time ti. The activation time ti is the lower limit value of the activation time of the current detection resistance element which is determined by taking account of the ringing convergence time included in the detection waveform, the conversion time of the analogue/digital converter, and the time required for sample and hold, and in specific terms, has a value in a range from several μs to several tens of μs.

Furthermore, FIG. 6A depicts a section A in which two time widths of ti/2 are provided after the timing t1, which is the current detection timing of the second current detector 9b, and a section C in which a time width of ti/2 is provided before the timing t3. FIG. 6B shows a section B in which a time width of ti/2 is provided both before and after the timing t2, which is the current detection timing of the first current detector 9a. Below, the sections A, B and C are each considered to be current detection periods.

Here, in order for the first current detector 9a to detect the first three-phase current accurately, it is necessary that the switching signals Qup2 to Qwn2 do not switch from "0" to "1" and from "1" to "0", during the current detection period. In other words, no on and off switching of the second high potential-side switching elements and the second low potential-side switching elements should occur during the section B. If, conversely, switching occurs in the second power converter 4b during the current detection period, then noise becomes mixed into the first three-phase current detected by the first current detector 9a, and this noise is a cause of vibrations and noise in the AC rotary machine 1.

Similarly, in order for the second current detector 9b to detect the second three-phase current accurately, it is necessary that the switching signals Qup1 to Qwn1 do not switch from "0" to "1" and from "1" to "0", during the current detection period. In other words, no on and off switching of the first high potential-side switching elements and the first low potential-side switching elements should occur during the section A and the section C. If, conversely, switching occurs in the first power converter 4a during the current detection period, then noise becomes mixed into the second three-phase current detected by the second current detector 9b, and this noise is a cause of vibrations and noise in the AC rotary machine 1.

Next, the definitions of the reference voltage threshold value Vth and the reference voltage lower limit value Vlo will be described. The reference voltage lower limit value Vlo is a threshold value for ensuring that switching does not occur in the second power converter 4b during the current detection period of the first current detector 9a and switching of the first power converter 4a does not occur during the current detection period of the second current detector 9b, and is defined by the following equation using the reference voltage threshold value Vth and the minimum value of the first carrier wave signal C1.

Reference voltage lower limit value *Vlo*=reference voltage threshold value *Vth*+(minimum value of first carrier wave signal *C1*)

As stated above, here, the minimum value of the first carrier wave signal C1 is taken to be −0.5 Vdc, and therefore in this case, the reference voltage lower limit value Vlo is expressed by "Vth−0.5 Vdc".

Furthermore, if the application voltages in the first three-phase application voltage are equal to or greater than the reference voltage lower limit value Vlo, then switching does not occur in the first power converter 4a during the section A and the section C. On the other hand, if the application voltages in the first three-phase application voltage are less than the reference voltage lower limit value Vlo, then switching occurs in the first power converter 4a during the section A and the section C.

By means of the first offset calculator 7a executing the first calculation process, if the application voltage in the phase corresponding to the first minimum phase voltage command, in the first three-phase application voltages, matches the minimum value of the first carrier wave signal C1, then the following occurs. More specifically, in the phase corresponding to the first minimum phase voltage command, a high potential-side switching element is always off and a low potential-side switching element is always on, during the carrier period Tc of the first carrier wave signal C1, and therefore switching does not occur in the first power converter 4a during the section A or the section C.

Furthermore, if the application voltages in the second three-phase application voltage are equal to or greater than the reference voltage lower limit value Vlo, then switching does not occur in the second power converter 4b during the section B. On the other hand, if the application voltages in the second three-phase application voltage are less than the reference voltage lower limit value Vlo, then switching occurs in the second power converter 4b during the section B.

By means of the second offset calculator 7b executing the third calculation process, if the application voltage of the phase corresponding to the second minimum phase voltage command, in the second three-phase application voltages, matches the minimum value of the second carrier wave signal C2, then the following occurs. More specifically, in the phase corresponding to the second minimum phase voltage command, the high potential-side switching element is always off and the low potential-side switching element is always on, during the carrier period Tc of the second carrier wave signal C2, and therefore switching does not occur in the second power converter 4b during the section B.

Here, the reference voltage threshold value Vth should be determined on the basis of the activation time ti, and specifically, may be determined by the following equation, for example.

$Vth = ti/Tc \times Vdc$

For example, if the activation time ti is 5 μs, the carrier period Tc is 50 μs, and the DC voltage Vdc is 12 V, then the reference voltage threshold value Vth is 1.2 V (=0.1 Vdc). Here, to give a specific example, the reference voltage threshold value Vth is 0.1 Vdc.

Next, the beneficial effects obtained by adopting a configuration wherein the reference voltage threshold value Vth is used to switch between the first calculation process and the second calculation process, and to switch between the third calculation process and the fourth calculation process, is described with additional reference to FIG. 7A to FIG. 8B, as well as the various diagrams indicated previously.

Figure 7A:
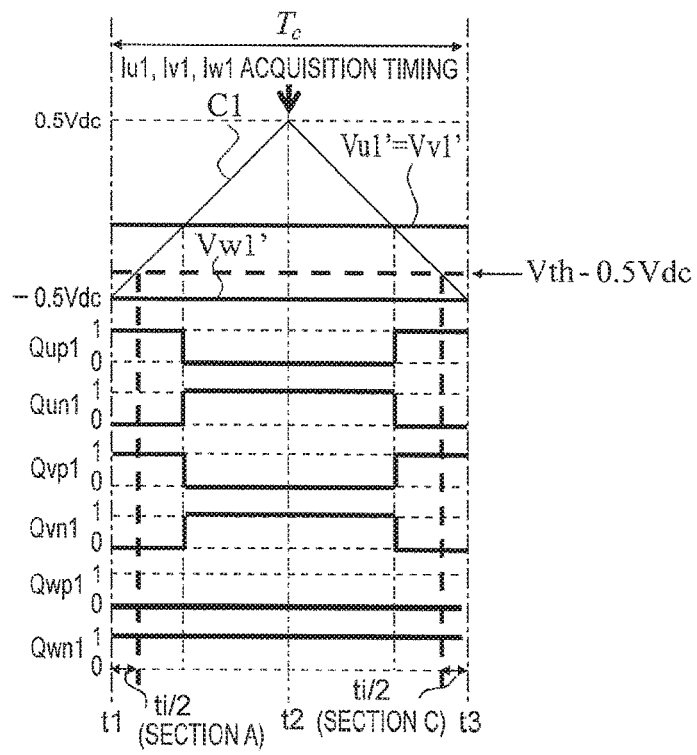
FIG. 7A is an illustrative diagram depicting the first switching signal which is output from the switching signal generator at moment [1] in FIG. 3.
Figure 7B:
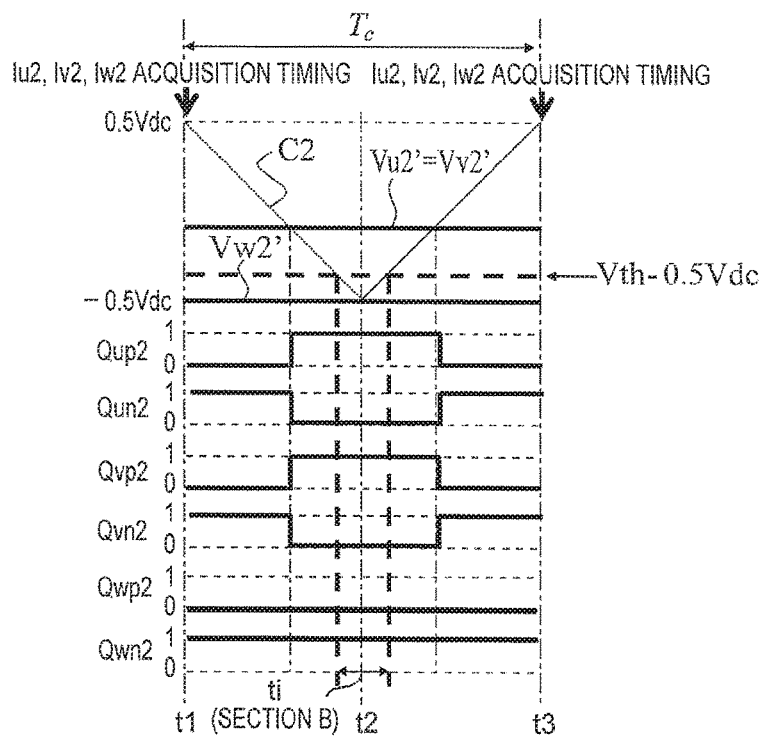
FIG. 7B is an illustrative diagram depicting the second switching signal which is output from the switching signal generator at moment [1] in FIG. 5.

FIG. 7A is an illustrative diagram depicting the first switching signal which is output from the switching signal generator 8 at moment [1] in FIG. 3. FIG. 7B is an illustrative diagram depicting the second switching signal which is output from the switching signal generator 8 at moment [1] in FIG. 5.

Figure 8A:
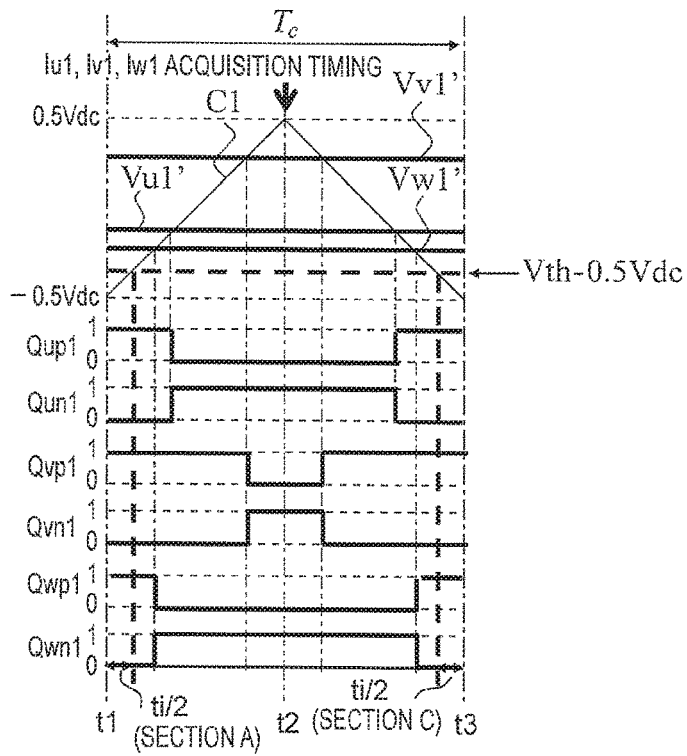
FIG. 8A is an illustrative diagram depicting the first switching signal which is output from the switching signal generator at moment [2] in FIG. 3.
Figure 8B:
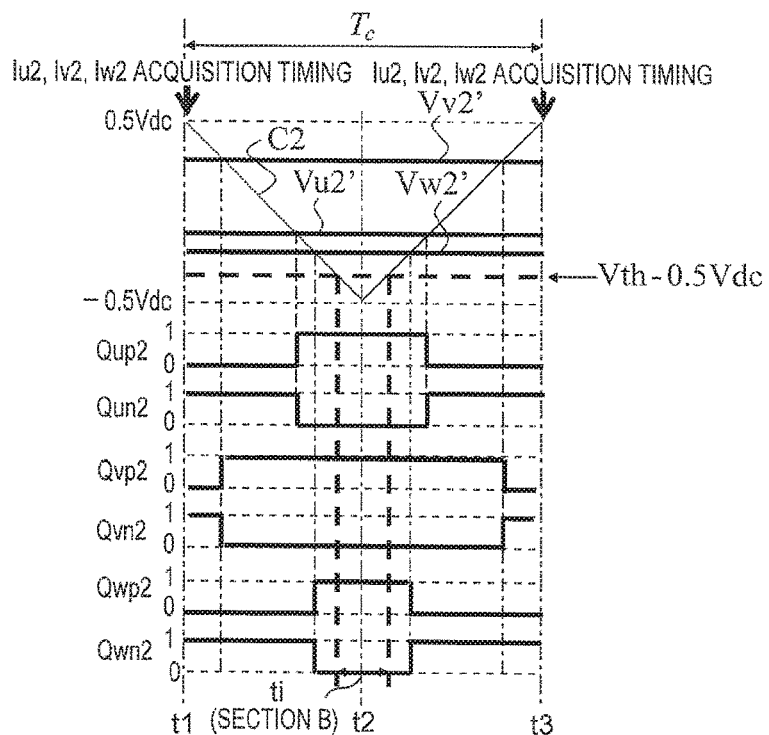
FIG. 8B is an illustrative diagram depicting the second switching signal which is output from the switching signal generator at moment [2] in FIG. 5.

FIG. 8A is an illustrative diagram depicting the first switching signal which is output from the switching signal generator 8 at moment [2] in FIG. 3. FIG. 8B is an illustrative diagram depicting the second switching signal which is output from the switching signal generator 8 at moment [2] in FIG. 5.

Here, if only the perspective of suppressing ripple current in the smoothing capacitor 3 is taken into consideration, it is desirable for the first calculation process and the third calculation process to be selected always, rather than the second calculation process and the fourth calculation process. Therefore, a configuration is adopted in which the first calculation process and the third calculation process are selected, as far as possible, within a range that avoids the effects of noise in the first current detector 9a and the second current detector 9b.

Firstly, the switching between the first calculation process and the second calculation process by the first offset calculator 7a will be described.

As illustrated in FIG. 2, the first offset calculator 7a executes step S121, and in accordance with the execution results, executes step S122 as the first calculation process, or executes step S123 as the second calculation process.

Here, if the difference between the first medium phase voltage command Vmid1 and the first minimum phase voltage command Vmin1 is equal to or greater than the reference voltage threshold value Vth, then the voltage applied to the phase corresponding to the first medium phase voltage command Vmid1 (=Vmid1−0.5 Vdc−Vmin1) in the first three-phase application voltage is equal to or greater than the reference voltage lower limit value Vlo. Therefore, switching of the switching signal corresponding to this phase does not occur in the section A or the section C.

A state of this kind corresponds, more specifically, to moment [1] in FIG. 3, for example, and referring to FIG. 3, the W-phase application voltage Vw1' is uniform at the minimum value (=−0.5 Vdc). Furthermore, the U-phase application voltage Vu1' and the V-phase application voltage Vv1' are values close to −0.05 Vdc, and are greater than the reference voltage lower limit value Vlo (=Vth−0.5 Vdc=−0.4 Vdc).

Furthermore, at moment [1] in FIG. 3, the waveforms of the parameters in the carrier period Tc are as indicated in FIG. 7A. As can be seen from FIG. 7A, switching of the switching signals Qup1 to Qwn1 does not occur in the section A or the section C.

Consequently, the first offset calculator 7a executes step S121, and if the difference between the first medium phase voltage command Vmid1 and the first minimum phase voltage command Vmin1 is equal to or greater than the reference voltage threshold value Vth, executes step S122.

On the other hand, if the difference between the first medium phase voltage command Vmid1 and the first minimum phase voltage command Vmin1 is less than the reference voltage threshold value Vth, then the voltage applied to the phase corresponding to the first medium phase voltage command Vmid1 (=Vmid1−0.5 Vdc−Vmin1), in the first three-phase application voltage, is less than the reference voltage lower limit value Vlo. Therefore, switching of the switching signal corresponding to this phase occurs in the section A or the section C. When switching occurs in this way, as stated above, vibration and noise is produced in the AC rotary machine 1, which is not desirable.

Consequently, the first offset calculator 7a executes step S121, and if the difference between the first medium phase voltage command Vmid1 and the first minimum phase voltage command Vmin1 is less than the reference voltage threshold value Vth, executes step S123. In other words, the first offset calculator 7a sets the voltage commands in the first three-phase voltage command directly as the first three-phase application voltage. Consequently, the application voltages in the first three-phase application voltage are equal to or greater than the reference voltage lower limit value Vlo, and therefore switching of the switching signal does not occur in the section A and the section C. As a result of this, it is possible to suppress vibrations and noise in the AC rotary machine 1.

A state of this kind corresponds, specifically, to moment [2] in FIG. 3, for example, and referring to FIG. 3, the V-phase application voltage Vv1' is a value close to 0.3 Vdc, and the U-phase application voltage Vu1' and the W-phase application voltage Vw1' are values close to −0.15 Vdc. More specifically, the application voltages in the first three-phase application voltage are equal to the voltage commands of the first three-phase voltage command, and are therefore equal to or greater than the reference voltage lower limit value Vlo.

Furthermore, at moment [2] in FIG. 3, the waveforms of the parameters in the carrier period Tc are as indicated in FIG. 8A. As can be seen from FIG. 8A, similarly to FIG. 7A, switching of the switching signals Qup1 to Qwn1 does not occur in the section A or the section C.

Consequently, the first offset calculator 7a executes step S121, and if the difference between the first medium phase voltage command Vmid1 and the first minimum phase voltage command Vmin1 is less than the reference voltage threshold value Vth, executes step S123.

Next, the switching between the third calculation process and the fourth calculation process by the second offset calculator 7b will be described.

As illustrated in FIG. 4, the second offset calculator 7b executes step S131, and in accordance with the execution results, executes step S132 as the third calculation process, or executes step S133 as the fourth calculation process.

Here, if the difference between the second medium phase voltage command Vmid2 and the second minimum phase voltage command Vmin2 is equal to or greater than the reference voltage threshold value Vth, then the voltage applied to the phase corresponding to the second medium phase voltage command Vmid2 (=Vmid2−0.5 Vdc−Vmin2) in the second three-phase application voltage is equal to or greater than the reference voltage lower limit value Vlo. Therefore, switching of the switching signal corresponding to this phase does not occur in the section B.

A state of this kind corresponds, more specifically, to moment [1] in FIG. 5, for example, and referring to FIG. 5, the W-phase application voltage Vw2' is uniform at the minimum value (=−0.5 Vdc). Furthermore, the U-phase application voltage Vu2' and the V-phase application voltage Vv2' are values close to −0.05 Vdc, and are greater than the reference voltage lower limit value Vlo (=Vth−0.5 Vdc=−0.4 Vdc).

Furthermore, at moment [1] in FIG. 5, the waveforms of the parameters in the carrier period Tc are as indicated in FIG. 7B. As can be seen from FIG. 7B, switching of the switching signals Qup2 to Qwn2 does not occur in the section B.

Consequently, the second offset calculator 7b executes step S131, and if the difference between the second medium phase voltage command Vmid2 and the second minimum phase voltage command Vmin2 is equal to or greater than the reference voltage threshold value Vth, executes step S132.

On the other hand, if the difference between the second medium phase voltage command Vmid2 and the second minimum phase voltage command Vmin2 is less than the reference voltage threshold value Vth, then the voltage applied to the phase corresponding to the second medium phase voltage command Vmid2 (=Vmid2−0.5 Vdc−Vmin2), in the second three-phase application voltage, is less than the reference voltage lower limit value Vlo. Therefore, switching of the switching signal corresponding to this phase occurs in the section B. When switching occurs in this way, as stated above, vibration and noise is produced in the AC rotary machine 1, which is not desirable.

Consequently, the second offset calculator 7b executes step S131, and if the difference between the second medium phase voltage command Vmid2 and the second minimum phase voltage command Vmin2 is less than the reference voltage threshold value Vth, executes step S133. More specifically, the second offset calculator 7b sets the voltage commands in the second three-phase voltage command directly as the second three-phase application voltage. Consequently, the application voltages in the second three-phase application voltage are equal to or greater than the reference voltage lower limit value Vlo, and therefore switching of the switching signal does not occur in the section B. As a result of this, it is possible to suppress vibrations and noise in the AC rotary machine 1.

A state of this kind corresponds, specifically, to moment [2] in FIG. 5, for example, and referring to FIG. 5, the V-phase application voltage Vv2' is a value close to 0.3 Vdc, and the U-phase application voltage Vu2' and the W-phase application voltage Vw2' are values close to −0.15 Vdc. More specifically, the application voltages in the second three-phase application voltage are equal to the voltage commands of the second three-phase voltage command, and are therefore equal to or greater than the reference voltage lower limit value Vlo.

Furthermore, at moment [2] in FIG. 5, the waveforms of the parameters in the carrier period Tc are as indicated in FIG. 8B. As can be seen from FIG. 8B, similarly to FIG. 7B, switching of the switching signals Qup2 to Qwn2 does not occur in the section B.

Consequently, the second offset calculator 7b executes step S131, and if the difference between the first medium phase voltage command Vmid1 and the first minimum phase voltage command Vmin1 is less than the reference voltage threshold value Vth, executes step S133.

Next, as a comparative example, a case is described, with reference to FIG. 9 to FIG. 11B, in which the first calculation process and the second calculation process are not switched and the third calculation process and the fourth calculation process are not switched either. In other words, here, a case is envisaged in which the first offset calculator 7a executes only the first calculation process, and the second offset calculator 7b executes only the third calculation process.

Figure 9:
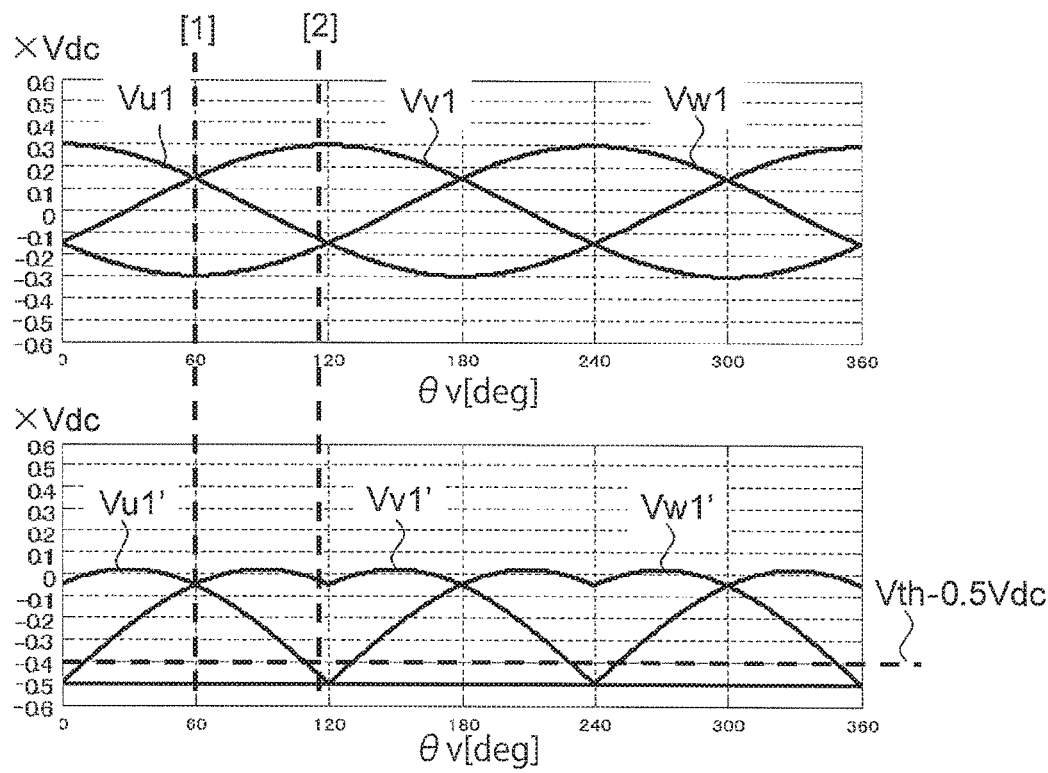
FIG. 9 is an illustrative diagram for the purpose of comparison with FIG. 3.
Figure 10:
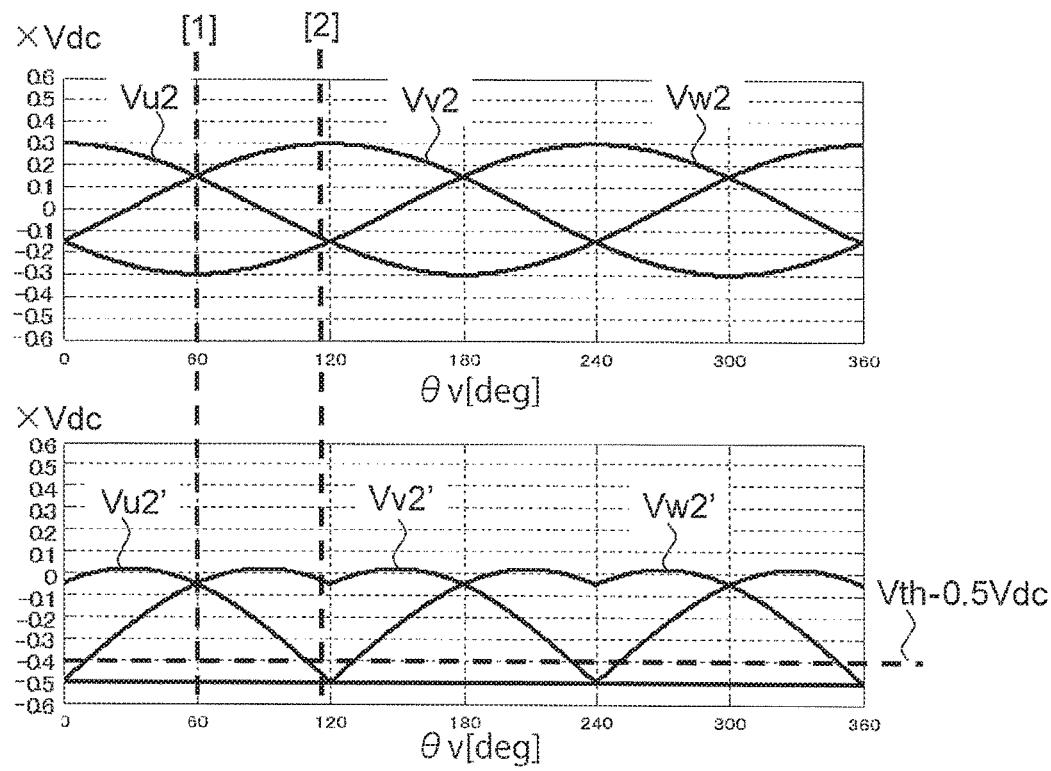
FIG. 10 is an illustrative diagram for the purpose of comparison with FIG. 5.
Figure 11A:
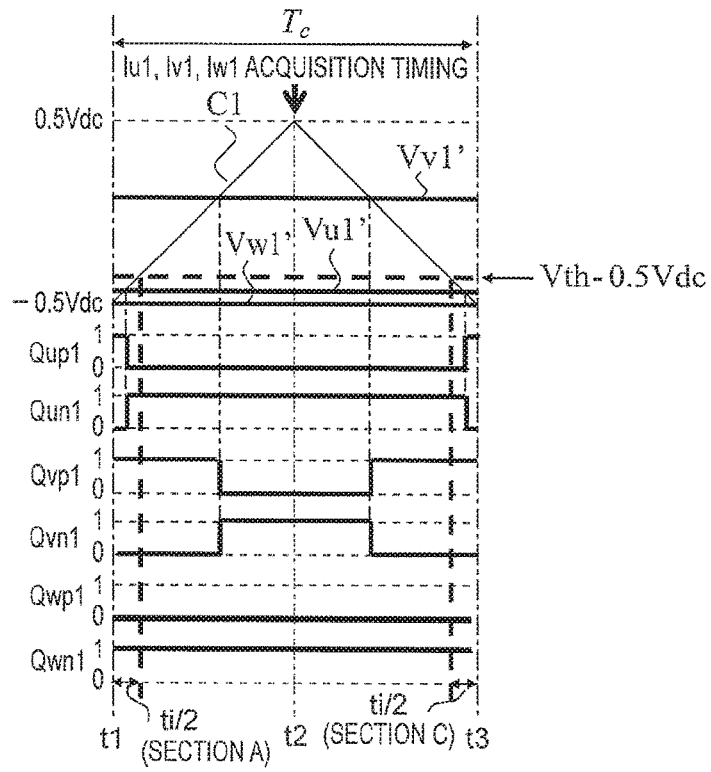
FIG. 11A is an illustrative diagram for comparison with FIG. 8A.
Figure 11B:
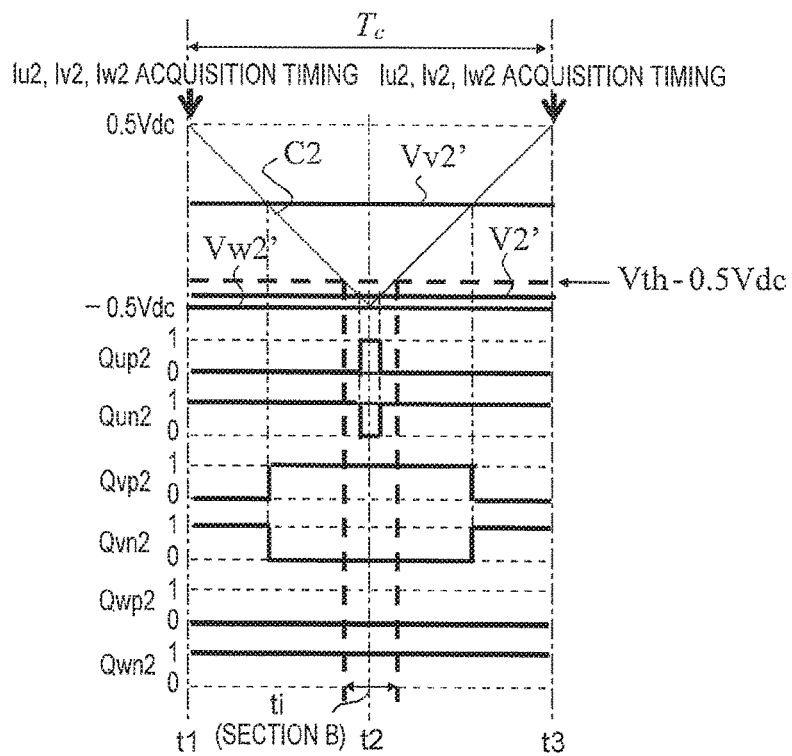
FIG. 11B is an illustrative diagram for comparison with FIG. 8B.

FIG. 9 is an illustrative diagram for the purpose of comparison with FIG. 3. FIG. 10 is an illustrative diagram for the purpose of comparison with FIG. 5. FIG. 11A is an illustrative diagram for the purpose of comparison with FIG. 8A. FIG. 11B is an illustrative diagram for the purpose of comparison with FIG. 8B.

If the first offset calculator 7a executes steps S120 and S122 but does not execute steps S121 and S123 illustrated in FIG. 2 (in other words, if the first offset calculator 7a only executes the first calculation process), then the application voltages in the first three-phase application voltage are as illustrated in FIG. 9. In other words, FIG. 9 shows the first three-phase application voltage which is obtained when the first two-phase modulation indicated in PTL 1 is applied to the first three-phase voltage command.

Furthermore, at moment [2] in FIG. 9, the waveforms of the parameters in the carrier period Tc are as indicated in FIG. 11A.

As can be seen from FIG. 9, at moment [2], the first medium phase voltage command Vmid1 and the first minimum phase voltage command Vmin1 are close to each other. Therefore, when the first calculation process is executed in this state, the voltage applied to the phase corresponding to the first medium phase voltage command Vmid1 is lower than the reference voltage lower limit value Vlo.

In this case, as illustrated in FIG. 11A, switching of the switching signals Qup1 and Qun1 corresponding to the U phase, which is the phase corresponding to the first medium phase voltage command Vmid1, occurs in the section A and the section C. As a result of this, the AC rotary machine 1 produces vibrations and noise.

Similarly, if the second offset calculator 7b executes steps S130 and S132 but does not execute steps S131 and S133 illustrated in FIG. 4 (in other words, if the second offset calculator 7b only executes the third calculation process), then the application voltages in the second three-phase application voltage are as illustrated in FIG. 10. In other words, FIG. 10 shows the second three-phase application voltage which is obtained when the first two-phase modulation indicated in PTL 1 is applied to the second three-phase voltage command.

Furthermore, at moment [2] in FIG. 10, the waveforms of the parameters in the carrier period Tc are as indicated in FIG. 11B.

As can be seen from FIG. 10, at moment [2], the second medium phase voltage command Vmid2 and the second minimum phase voltage command Vmin2 are close to each other. Therefore, when the third calculation process is executed in this state, the voltage applied to the phase corresponding to the second medium phase voltage command Vmid2 is lower than the reference voltage lower limit value Vlo.

In this case, as illustrated in FIG. 11B, switching of the switching signals Qup2 and Qun2 corresponding to the U phase, which is the phase corresponding to the second medium phase voltage command Vmid2, occurs in the section B. As a result of this, the AC rotary machine 1 produces vibrations and noise.

As can be seen from this comparative example, by adopting a configuration in which the second calculation process is executed if the first medium phase voltage command Vmid1 and the first minimum phase voltage command Vmin1 are close to each other, then the application voltages in the first three-phase application voltage do not become lower than the reference voltage lower limit value Vlo. Therefore, switching of the switching signals Qup1 to Qwn1 does not occur in the current detection period of the second current detector 9b, and consequently, it is possible to reduce the vibrations and noise produced by the rotary AC machine 1.

Similarly, by adopting a configuration wherein the fourth calculation process is executed when the second medium phase voltage command Vmid2 and the second minimum phase voltage command Vmin2 are close to each other, then the application voltages in the second three-phase application voltage do not become lower than the reference voltage lower limit value Vlo. Therefore, switching of the switching signals Qup2 to Qwn2 does not occur in the current detection period of the first current detector 9a, and consequently, it is possible to reduce the vibrations and noise produced by the rotary AC machine 1.

According to the first embodiment described above, if the first differential value, which is the difference between the first medium phase voltage command and the first minimum phase voltage command, is equal to or greater than the previously established reference voltage threshold value, then the offset calculator executes the first calculation process for calculating the first three-phase application voltage by changing all of the voltage commands in the first three-phase voltage command by the same amount mutually, in such a manner that the voltage applied to the phase corresponding to the first minimum phase voltage command becomes equal to the minimum value of the first carrier wave signal, and if the first differential value is less than the reference voltage threshold value, then the offset calculator executes the second calculation process for calculating the first three-phase application voltage from the first three-phase voltage command in such a manner that the voltage applied to the phase corresponding to the first minimum phase voltage command becomes equal to or greater than a reference voltage lower limit value which is the sum of the reference voltage threshold value and the minimum value of the first carrier wave signal.

Furthermore, if the second differential value, which is the difference between the second medium phase voltage command and the second minimum phase voltage command, is equal to or greater than the reference voltage threshold value, then the offset calculator executes the third calculation process for calculating the second three-phase application voltage by changing all of voltage commands in the second three-phase voltage command by the same amount mutually, in such a manner that the voltage applied to the phase corresponding to the second minimum phase voltage command becomes equal to the minimum value of the second carrier wave signal, and if the second differential value is less than the reference voltage threshold value, then the offset calculator executes the fourth calculation process for calculating the second three-phase application voltage from the second three-phase voltage command, in such a manner that the voltage applied to the phase corresponding to the second minimum phase voltage command becomes equal to or greater than the reference voltage lower limit value.

More specifically, in the second calculation process, the offset calculator calculates the first three-phase application voltage by setting all of the voltage commands in the first three-phase voltage command to the first three-phase application voltage, and in the fourth calculation process, the offset calculator calculates the second three-phase application voltage by setting all of the voltage commands in the second three-phase voltage command to the second three-phase application voltage.

Therefore, switching in the second power converter is avoided during the current detection period of the first current detector, and switching in the first power converter is avoided during the current detection period of the second current detector. As a result of this, it is possible to improve the accuracy of current detection by the first current detector and the second current detector, while suppressing ripple current in the smoothing capacitor. Moreover, since the current detection accuracy is improved, it is possible to reduce vibrations and noise produced by the AC rotary machine 1.

Second Embodiment

In the first embodiment, a case has been described in which the first calculation process and the second calculation process are switched in accordance with the difference between the first medium phase voltage command Vmid1 and the first minimum phase voltage command Vmin1, and the third calculation process and the fourth calculation process are switched in accordance with the difference between the second medium phase voltage command Vmid2 and the second minimum phase voltage command Vmin2. On the other hand, in a second embodiment according to the present invention, a case is described in which the first calculation process and the second calculation process are switched, and the third calculation process and the fourth calculation process are switched, in accordance with the voltage phase θv.

In the second embodiment, points which are the same as the first embodiment above are not explained and the points which are different from the first embodiment will be described.

Figure 12:
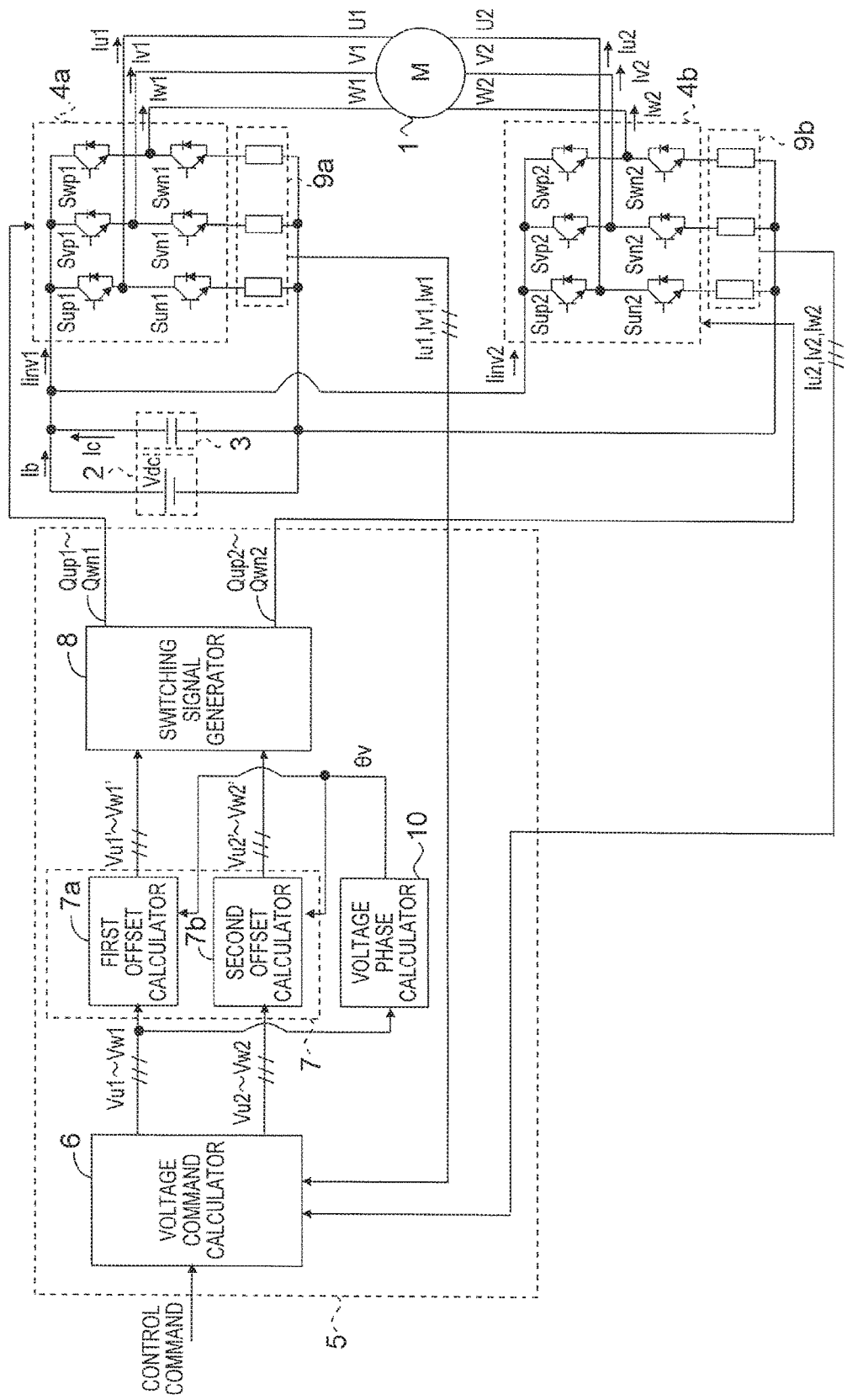
FIG. 12 is a schematic drawing showing the whole of a power conversion device according to a second embodiment of the present invention.

FIG. 12 is a schematic drawing showing the whole of a power conversion device according to the second embodiment of the present invention. As illustrated in FIG. 12, the power conversion device according to the second embodiment comprises the smoothing capacitor 3, the first power converter 4a, the second power converter 4b, the control unit 5, the first current detector 9a and the second current detector 9b.

Furthermore, the control unit 5 includes the voltage command calculator 6, the offset calculator 7 including the first offset calculator 7a and the second offset calculator 7b, the switching signal generator 8, and the voltage phase calculator 10.

The voltage phase calculator 10 calculates the voltage phase θv using the first three-phase voltage command input from the voltage command calculator 6. Furthermore, the voltage command calculator 6 outputs the calculated voltage phase θv to the first offset calculator 7a and the second offset calculator 7b.

More specifically, the voltage command calculator 6 calculates the voltage phase θv in accordance with Equation (1) described below, using the first three-phase voltage command input from the voltage command calculator 6.

[Math. 1]

$$\theta_v = \arctan\left(\frac{\frac{\sqrt{3}}{2}(V_{v1} - V_{w1})}{V_{u1} - 0.5V_{v1} - 0.5V_{w1}}\right) \quad (1)$$

The voltage phase calculator 10 may convert the voltage commands in the first three-phase voltage command to voltages Vα and Vβ on a stationary two-axis coordinates system, and use the voltages Vα and Vβ to calculate the voltage phase θv in accordance with Equation (2) below.

[Math. 2]

$$\theta_v = \arctan\left(\frac{V_\beta}{V_\alpha}\right) \quad (2)$$

Furthermore, the voltage phase calculator 10 may convert the voltage commands in the first three-phase voltage command to voltages Vd and Vq on a rotational two-axis coordinates system, and use the voltages Vd and Vq to calculate the voltage phase θv in accordance with Equation (3) below. In Equation (3), θ is the rotational phase of the AC rotary machine 1.

[Math. 3]

$$\theta_v = \arctan\left(\frac{V_q}{V_d}\right) + \theta \quad (3)$$

Here, in the second embodiment, a case is described in which the voltage phase θv is calculated using the first three-phase voltage command, but it is also possible to calculate the voltage phase θv similarly using the second three-phase voltage command. Furthermore, the voltage phase calculator 10 may be configured so as to output the average value of the voltage phase calculated using the first three-phase voltage command and the voltage phase calculated using the second three-phase voltage command, as a voltage phase θv.

Next, the operations of the first offset calculator 7a and the second offset calculator 7b according to the second embodiment are described with reference to FIG. 13 to FIG. 15.

Figure 13:
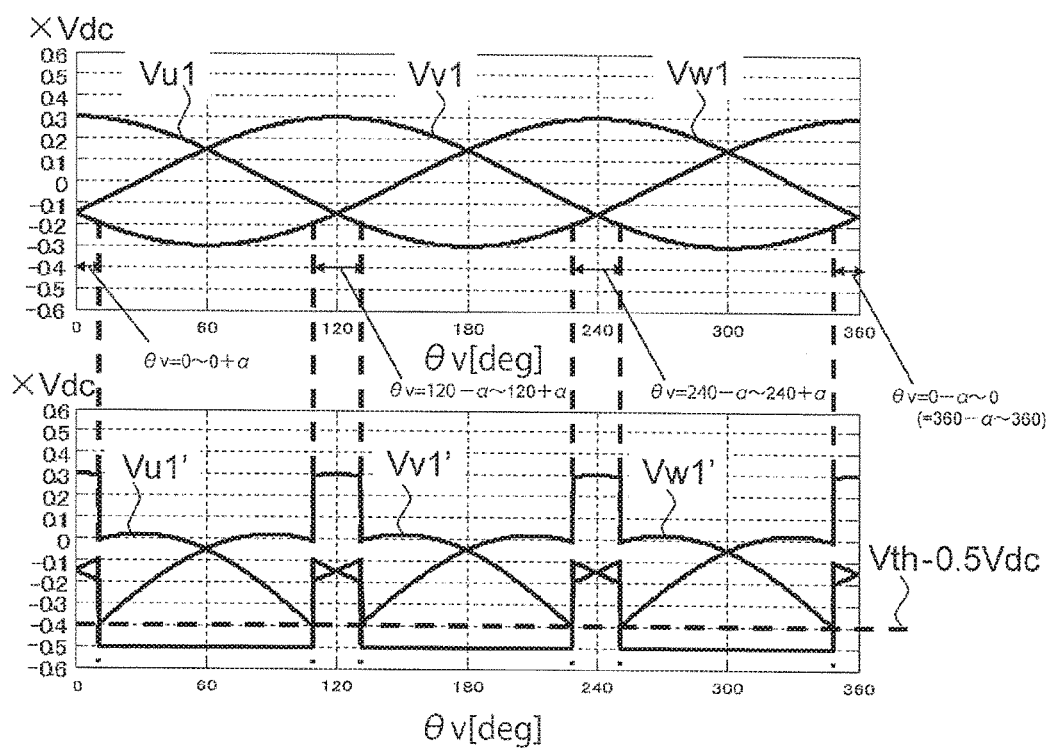
FIG. 13 is an illustrative diagram depicting a first three-phase voltage command output by a voltage command calculator, and a first three-phase application voltage output by a first offset calculator, in the second embodiment of the present invention.

FIG. 13 is an illustrative diagram depicting the first three-phase voltage command output by the voltage command calculator 6, and the first three-phase application voltage output by the first offset calculator 7a, in the second embodiment of the present invention. FIG. 14 is a flowchart showing operations performed when the first offset calculator 7a calculates the first three-phase application voltage in the second embodiment of the present invention. FIG. 15 is a flowchart showing operations performed when the second offset calculator 7b calculates the second three-phase application voltage in the second embodiment of the present invention.

As can be seen from FIG. 13, in the second embodiment, the waveform of the first three-phase voltage command output by the voltage command calculator 6 and the waveform of the first three-phase application voltage output by the first offset calculator 7a are similar to FIG. 3 described above.

Furthermore, in accordance with the voltage phase θv input by the voltage phase calculator 10, the first offset calculator 7a executes either one of the first calculation process and the second calculation process, depending on whether or not the voltage phase θv is within a previously established specific range.

More specifically, as illustrated in FIG. 13, the first offset calculator 7a executes the second calculation process when the value of the voltage phase θv is in a range from 360−α to 360, a range from 0 to α, a range from 120−α to 120+α, and a range from 240−α to 240+α. On the other hand, the first offset calculator 7a executes the first calculation process when the value of the voltage phase θv is outside of these ranges.

In this way, the first offset calculator 7a switches the first calculation process and the second calculation process in accordance with the voltage phase θv input from the voltage phase calculator 10. α is a fixed value and may be set previously in accordance with the first three-phase voltage command which is output by the voltage command calculator 6.

Figure 14:
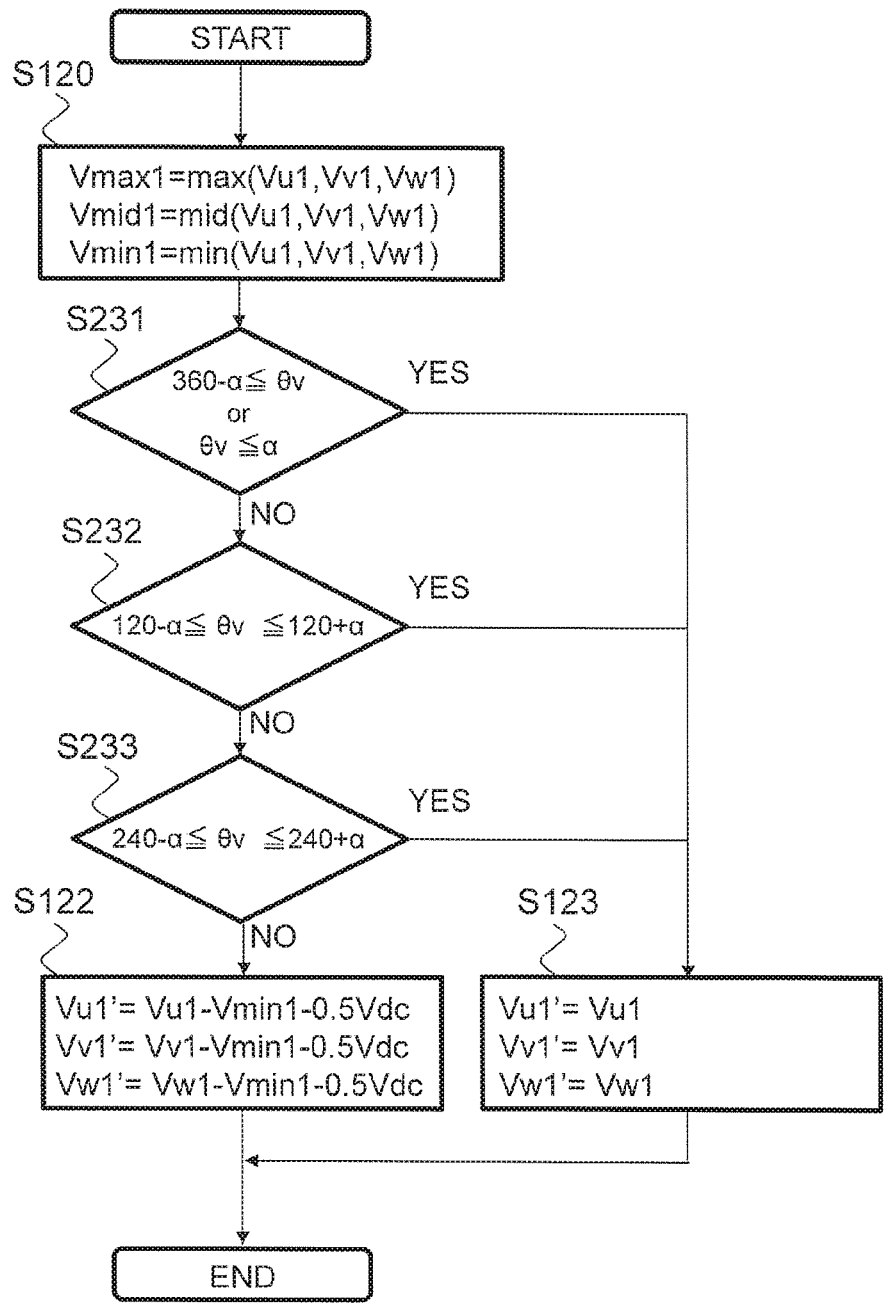
FIG. 14 is a flowchart showing operations performed when the first offset calculator calculates the first three-phase application voltage in the second embodiment of the present invention.

The operation for calculating the first three-phase application voltage performed by the first offset calculator 7a is as illustrated in FIG. 14. As illustrated in FIG. 14, the first offset calculator 7a advances to step S231 after executing step S120.

In step S231, the first offset calculator 7a determines whether or not the voltage phase θv input from the voltage phase calculator 10 satisfies 360−α≤θv or θv≤α.

If it is determined that 360−α≤θv or θv≤α is satisfied (in other words, YES), then the first offset calculator 7a advances to step S123 and executes the second calculation process. On the other hand, if it is determined 360−α≤θv or θv≤α is not satisfied (in other words, NO), then the first offset calculator 7a advances to step S232.

In step S232, the first offset calculator 7a determines whether or not the voltage phase θv input from the voltage phase calculator 10 satisfies 120−α≤θv≤120+α.

If it is determined that 120−α≤θv≤120+α is satisfied (in other words, YES), then the first offset calculator 7a advances to step S123 and executes the second calculation process. On the other hand, if it is determined 120−α≤θv≤120+α is not satisfied (in other words, NO), then the first offset calculator 7a advances to step S233.

In step S233, the first offset calculator 7a determines whether or not the voltage phase θv input from the voltage phase calculator 10 satisfies 240−α≤θv≤240+α.

If it is determined that 240−α≤θv≤240+α is satisfied (in other words, YES), then the first offset calculator 7a advances to step S123 and executes the second calculation process. On the other hand, if it is determined that 240−α≤θv≤240+α is not satisfied (in other words, NO), then the first offset calculator 7a advances to step S122 and executes the first calculation process.

Figure 15:
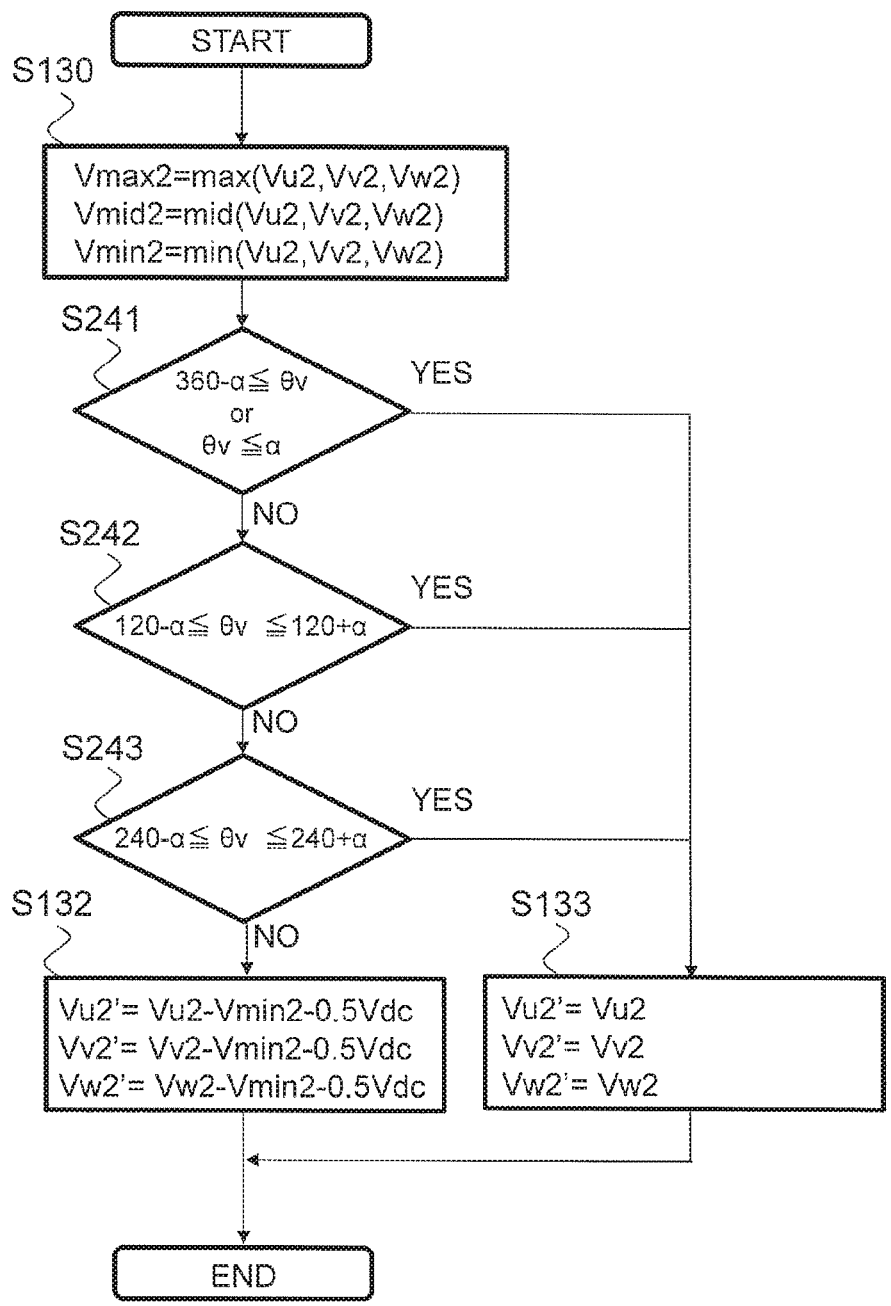
FIG. 15 is a flowchart showing operations performed when a second offset calculator calculates a second three-phase application voltage in the second embodiment of the present invention.

The operation for calculating the second three-phase application voltage performed by the second offset calculator 7b is as illustrated in FIG. 15. As can be seen from FIG. 15, this flowchart comprises step S130, steps S241 to S243 which are similar to steps S231 to S233, step S132 for executing the third calculation process, and step S133 for executing the fourth calculation process.

In other words, the second offset calculator 7b, similarly to the first offset calculator 7a, switches the third calculation process and the fourth calculation process in accordance with the voltage phase θv input from the voltage phase calculator 10.

Consequently, the waveform of the second three-phase voltage command output by the voltage command calculator 6 and the waveform of the second three-phase application voltage output by the second offset calculator 7b are similar to FIG. 13.

According to the second embodiment described above, compared to the first embodiment, either one of the first calculation process and the second calculation process is executed in accordance with the voltage phase input from the voltage phase calculator, rather than in accordance with the difference between the first medium phase voltage command and the first minimum phase voltage command, depending on whether or not the voltage phase is within a previously established specific range. Furthermore, the offset calculator executes either one of the third calculation process and the fourth calculation process in accordance with the voltage phase input from the voltage phase calculator, rather than the difference between the second medium phase voltage command and the second minimum phase voltage command, depending on whether or not the voltage phase is within a specific range. Consequently, similar beneficial effects to the first embodiment described above can be obtained.

Third Embodiment

In a third embodiment of the present invention, the contents of the second calculation process and the fourth calculation process are different to the first and second embodiments. In the third embodiment, points which are the same as the first and second embodiments above are not explained and the points which are different from the first and second embodiments will be described.

Here, in the third embodiment, the first offset calculator 7a, in the second calculation process, calculates the first three-phase application voltage by changing all of the voltage commands in the first three-phase voltage command by the same amount mutually, in such a manner that the voltage applied to the phase corresponding to the first minimum phase voltage command Vmin1 is equal to or greater than the reference voltage lower limit value Vlo.

Furthermore, the second offset calculator 7b, in the fourth calculation process, calculates the second three-phase application voltage by changing all of the voltage commands in the second three-phase voltage command by the same amount mutually, in such a manner that the voltage applied to the phase corresponding to the second minimum phase voltage command Vmin2 is equal to or greater than the reference voltage lower limit value Vlo.

Here, a specific example is described in which the first offset calculator 7a changes all of the voltage commands in the first three-phase voltage command by the same amount mutually in such a manner that the voltage applied to the phase corresponding to the first minimum phase voltage command Vmin1 matches the reference voltage lower limit value Vlo. Here, an example is described in which the second offset calculator 7b changes all of the voltage commands in the second three-phase voltage command by the same amount mutually in such a manner that the voltage applied to the phase corresponding to the second minimum phase voltage command Vmin2 matches the reference voltage lower limit value Vlo.

The operations of the first offset calculator 7a and the second offset calculator 7b according to the third embodiment are described with reference to FIG. 16 to FIG. 19.

Figure 16:
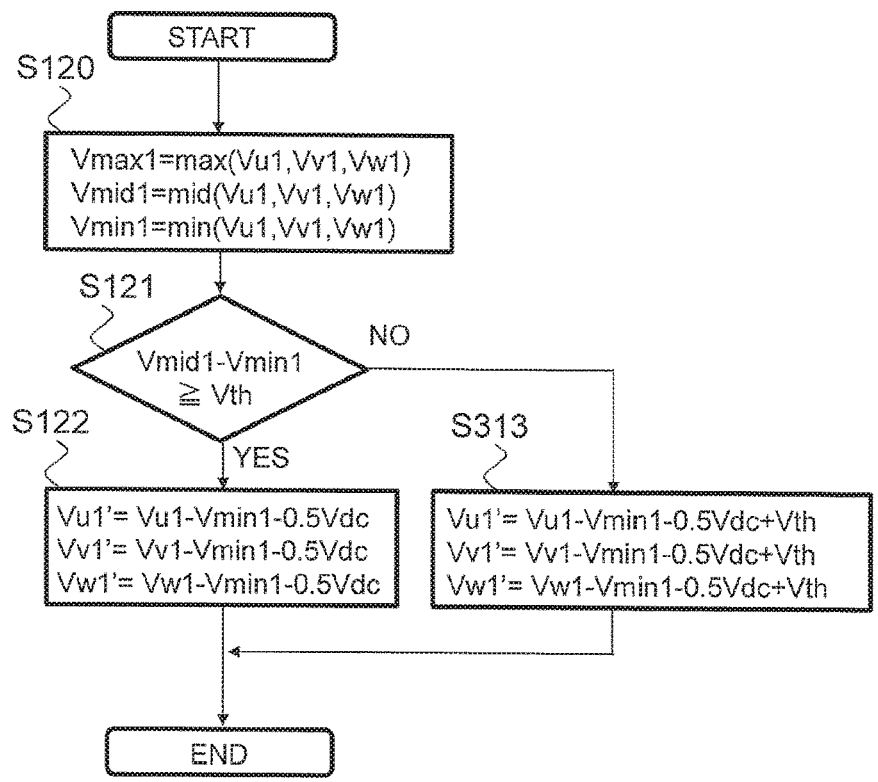
FIG. 16 is a flowchart showing operations performed when a first offset calculator calculates a first three-phase application voltage in a third embodiment of the present invention.
Figure 17:
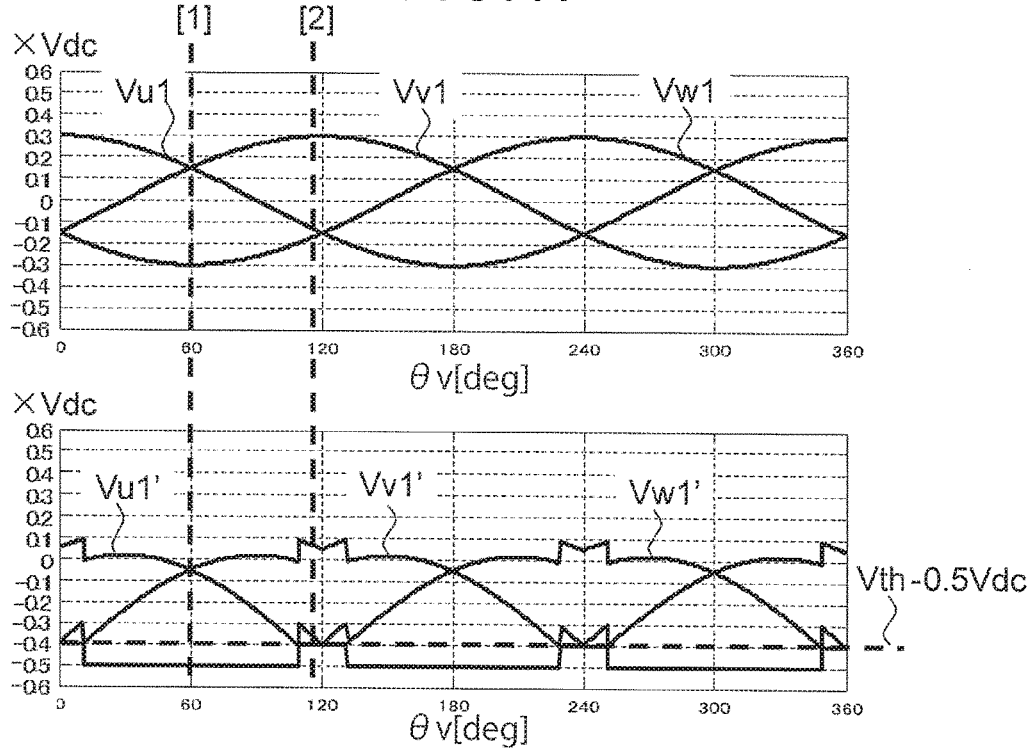
FIG. 17 is an illustrative diagram depicting a first three-phase voltage command output by a voltage command calculator, and the first three-phase application voltage output by the first offset calculator, in the third embodiment of the present invention.
Figure 18:
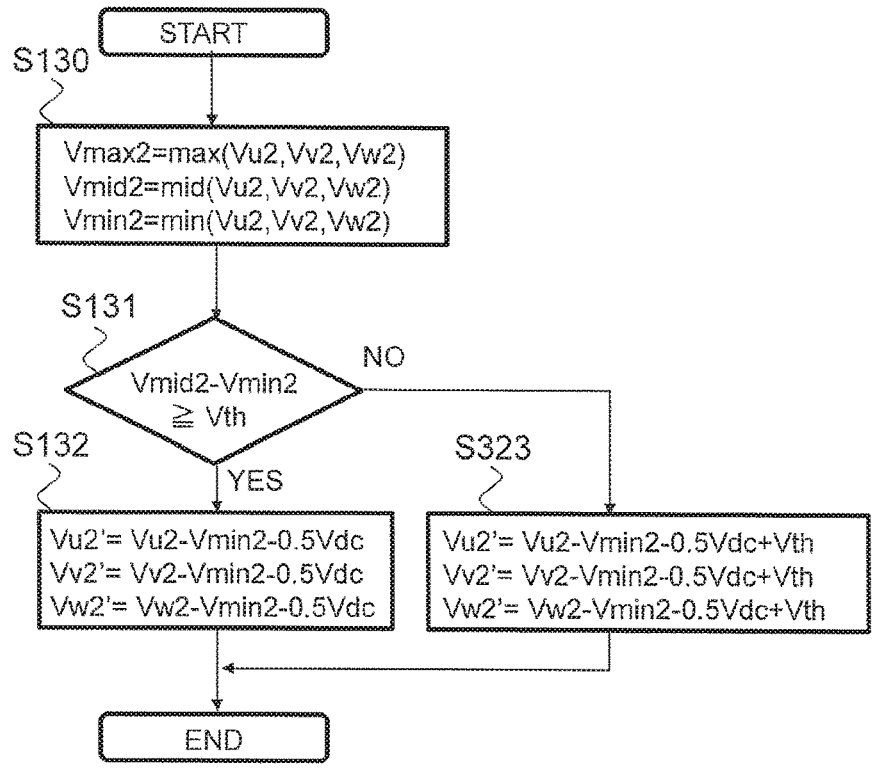
FIG. 18 is a flowchart showing operations performed when a second offset calculator calculates a second three-phase application voltage in the third embodiment of the present invention.
Figure 19:
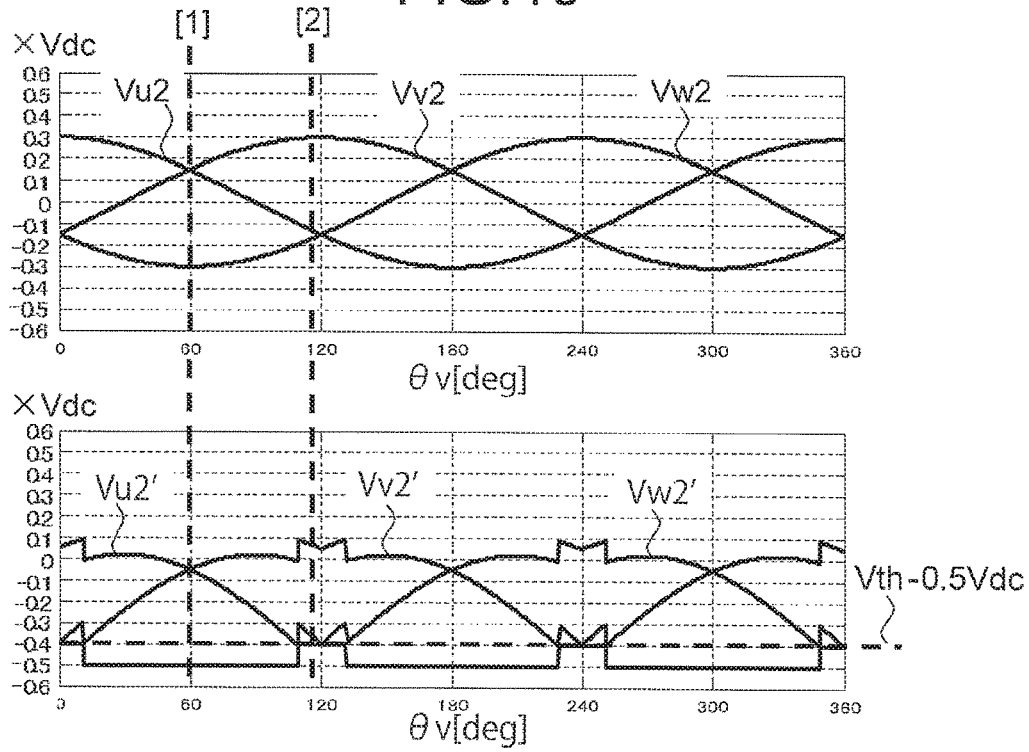
FIG. 19 is an illustrative diagram depicting a second three-phase voltage command output by the voltage command calculator, and the second three-phase application voltage output by the second offset calculator, in the third embodiment of the present invention.

FIG. 16 is a flowchart showing operations performed when the first offset calculator 7a calculates the first three-phase application voltage in the third embodiment of the present invention. FIG. 17 is an illustrative diagram depicting the first three-phase voltage command output by the voltage command calculator 6, and the first three-phase application voltage output by the first offset calculator 7a, in the third embodiment of the present invention. FIG. 18 is a flowchart showing operations performed when the second offset calculator 7b calculates the second three-phase application voltage in the third embodiment of the present invention. FIG. 19 is an illustrative diagram depicting the second three-phase voltage command output by the voltage command calculator 6, and the second three-phase application voltage output by the second offset calculator 7b, in the third embodiment of the present invention.

As illustrated in FIG. 16, the first offset calculator 7a advances to step S121 after executing step S120. The first offset calculator 7a executes step S121 and then, if the difference between the first medium phase voltage command Vmid1 and the first minimum phase voltage command Vmin1 is equal to or greater than the reference voltage threshold value Vth, executes step S122, or if the difference between the first medium phase voltage command Vmid1 and the first minimum phase voltage command Vmin1 is less than the reference voltage threshold value Vth, executes step S313.

Here, when the first three-phase application voltage calculated by executing step S313 and the first three-phase application voltage calculated by executing step S122 are compared, then the value from step S313 is larger in accordance with the addition of the reference voltage threshold value Vth. Consequently, the application voltage of the phase corresponding to the first minimum phase voltage command Vmin1, in the first three-phase application voltage calculated by the execution of step S313, matches the reference voltage lower limit value Vlo.

As can be seen from FIG. 17, at moment [2], for example, the first medium phase voltage command Vmid1 and the first minimum phase voltage command Vmin1 are close to each other, and therefore the first offset calculator 7a executes step S313 as the second calculation process. In this case, the voltage Vw1' applied to the W phase, which is the phase corresponding to the first minimum phase voltage command Vmin1, matches the reference voltage lower limit value Vlo.

In this way, the first offset calculator 7a shifts all of the voltage commands of the first three-phase voltage command, equally, in the negative direction, in such a manner that the voltage applied to the phase corresponding to the first minimum phase voltage command Vmin1 is equal to the minimum value of the first carrier wave signal C1, and adds the value of the reference voltage threshold value Vth. Consequently, the application voltages in the first three-phase application voltage are equal to or greater than the reference voltage lower limit value Vlo, and therefore switching of the switching signals Qup1 to Qwn1 does not occur during the current detection period, similarly to the first embodiment above.

The operation for calculating the second three-phase application voltage performed by the second offset calculator 7b is as illustrated in FIG. 18. As can be seen from FIG. 18, this flowchart comprises step S130, step S131, step S132 for executing the third calculation process, and step S323 for executing the fourth calculation process, similarly to step S313.

In other words, the second offset calculator 7b calculates the second three-phase application voltage, similarly to the first offset calculator 7a. Consequently, as illustrated in FIG. 19, the waveform of the second three-phase voltage command output by the voltage command calculator 6 and the waveform of the second three-phase application voltage output by the second offset calculator 7b are similar to FIG. 17.

In this way, the application voltages in the second three-phase application voltage are equal to or greater than the reference voltage lower limit value Vlo, and therefore switching of the switching signals Qup2 to Qwn2 does not occur during the current detection period, similarly to the first embodiment above.

According to the third embodiment described above, the offset calculator, in the second calculation process, calculates the first three-phase application voltage by changing all of the voltage commands in the first three-phase voltage command by the same amount mutually, in such a manner that the voltage applied to the phase corresponding to the first minimum phase voltage command is equal to or greater than the reference voltage lower limit value. Furthermore, the offset calculator, in the fourth calculation process, calculates the second three-phase application voltage by changing all of the voltage commands in the second three-phase voltage command by the same amount mutually, in such a manner that the voltage applied to the phase corresponding to the second minimum phase voltage command is equal to or greater than the reference voltage lower limit value. Consequently, similar beneficial effects to the first embodiment described above are obtained.

Furthermore, the offset calculator, in the second calculation process, changes all of the voltage commands of the first three-phase voltage command, by the same amount mutually, in a negative direction in which the voltage applied to the phase corresponding to the first minimum phase voltage command approaches the reference voltage lower limit value. Furthermore, the offset calculator, in the fourth calculation process, changes all of the voltage commands of the second three-phase voltage command, by the same amount mutually, in a negative direction in which the voltage applied to the phase corresponding to the second minimum phase voltage command approaches the reference voltage lower limit value.

Consequently, by executing the second calculation process, the voltage applied to the phase corresponding to the first minimum phase voltage command approaches the minimum value of the first carrier wave signal, and by executing the fourth calculation process, the voltage applied to the phase corresponding to the second minimum phase voltage command approaches the minimum value of the second carrier wave signal. As a result of this, it is possible to further suppress ripple current in the smoothing capacitor, compared to the first and second embodiments above.

Fourth Embodiment

In a fourth embodiment of the present invention, the contents of the second calculation process and the fourth calculation process are different to the first to third embodiments. In the fourth embodiment, points which are the same as the first to third embodiments above are not explained and the points which are different from the first to third embodiments will be described.

Here, in the fourth embodiment, the first offset calculator 7a, in the second calculation process, calculates the first three-phase application voltage by changing all of the voltage commands in the first three-phase voltage command by the same amount mutually, in such a manner that the voltage applied to the phase corresponding to the first minimum phase voltage command Vmin1 is equal to or greater than the reference voltage lower limit value Vlo, and in such a manner that the voltage applied to the phase corresponding to the first maximum phase voltage command Vmax1 is equal to or lower than the maximum value of the first carrier wave signal C1.

Furthermore, the second offset calculator 7b, in the fourth calculation process, calculates the second three-phase application voltage by changing all of the voltage commands in the second three-phase voltage command by the same amount mutually, in such a manner that the voltage applied to the phase corresponding to the second minimum phase voltage command Vmin2 is equal to or greater than the reference voltage lower limit value Vlo, and in such a manner that the voltage applied to the phase corresponding to the second maximum phase voltage command Vmax2 is equal to or lower than the maximum value of the second carrier wave signal C2.

Here, a specific example is described in which the first offset calculator 7a changes all of the voltage commands in the first three-phase voltage command by the same amount mutually in such a manner that the voltage applied to the phase corresponding to the first maximum phase voltage command Vmax1 matches the maximum value of the first carrier wave signal C1. Moreover, an example is described in which the second offset calculator 7b changes all of the voltage commands in the second three-phase voltage command by the same amount mutually in such a manner that the voltage applied to the phase corresponding to the second maximum phase voltage command Vmax2 matches the maximum value of the second carrier wave signal C2.

The operations of the first offset calculator 7a and the second offset calculator 7b according to the fourth embodiment are described with reference to FIG. 20 to FIG. 23.

Figure 20:
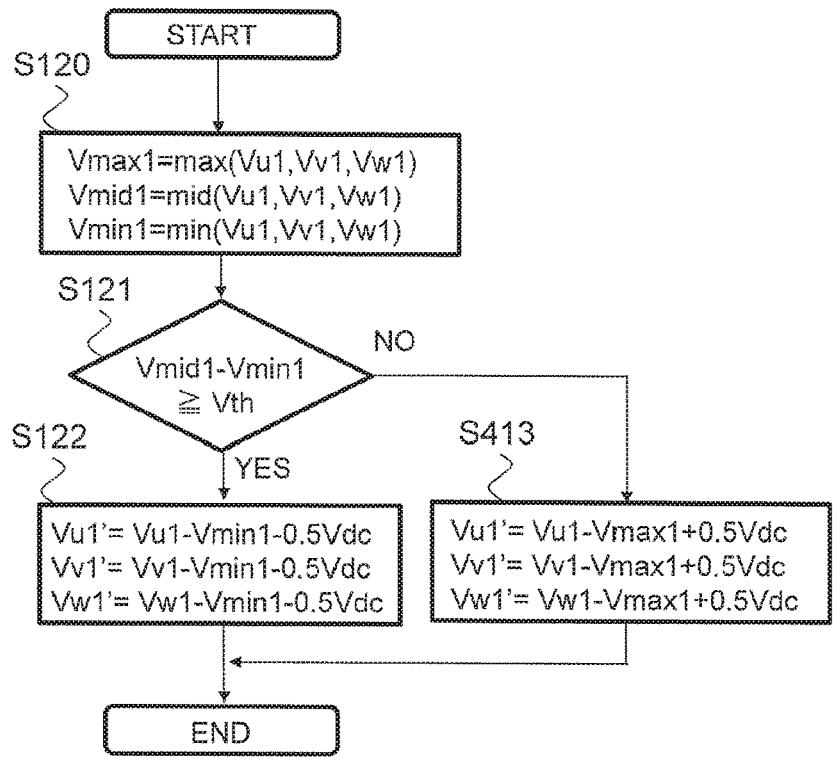
FIG. 20 is a flowchart showing operations performed when a first offset calculator calculates a first three-phase application voltage in a fourth embodiment of the present invention.
Figure 21:
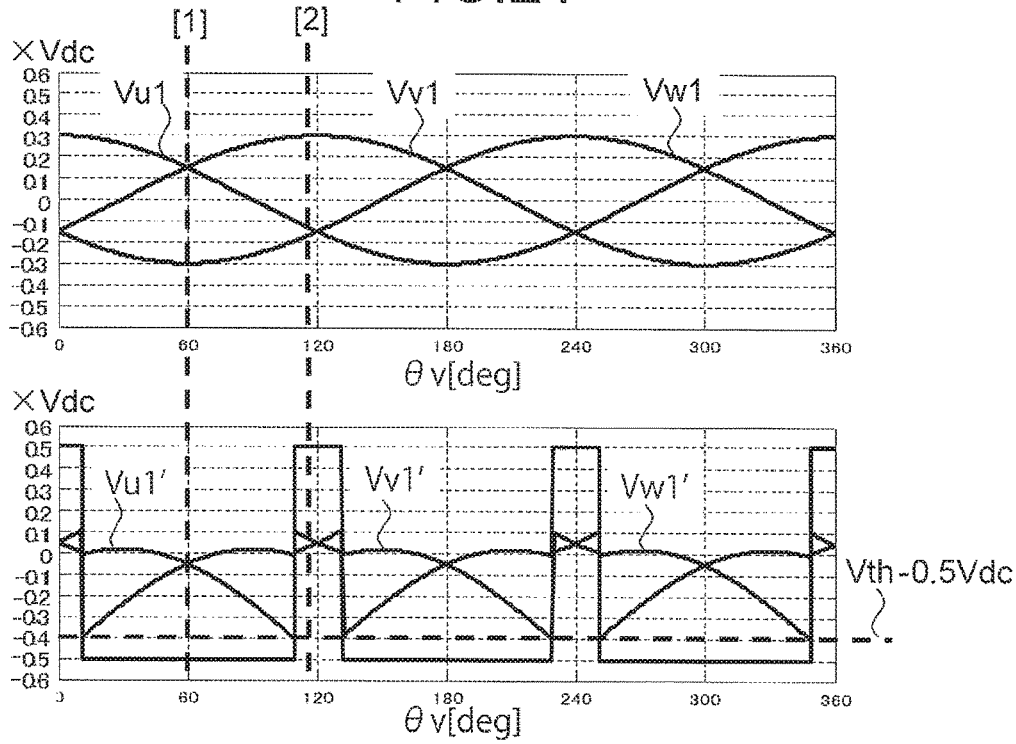
FIG. 21 is an illustrative diagram depicting a first three-phase voltage command output by a voltage command calculator, and the first three-phase application voltage output by the first offset calculator, in the fourth embodiment of the present invention.
Figure 22:
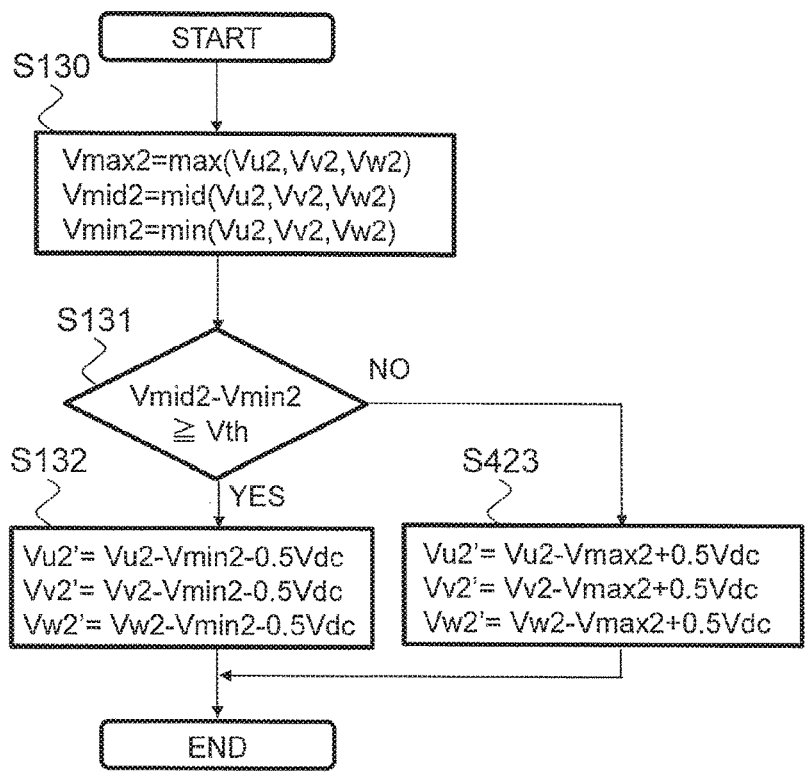
FIG. 22 is a flowchart showing operations performed when a second offset calculator calculates a second three-phase application voltage in the fourth embodiment of the present invention.
Figure 23:
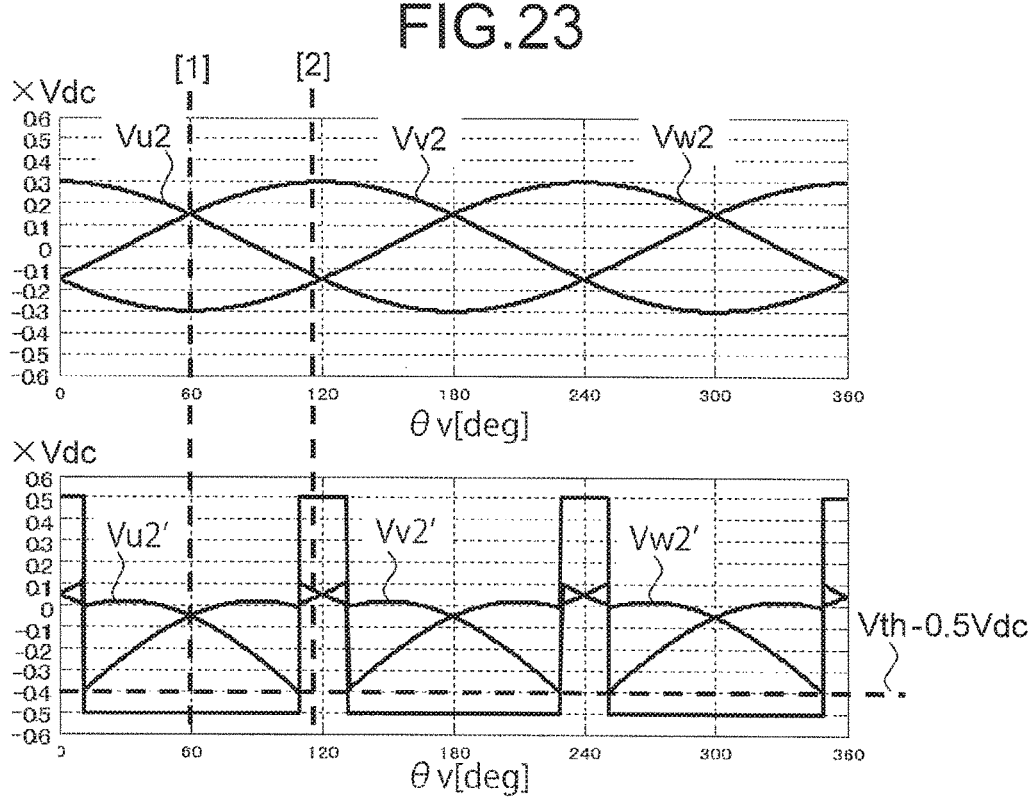
FIG. 23 is an illustrative diagram depicting a second three-phase voltage command output by the voltage command calculator, and the second three-phase application voltage output by the second offset calculator, in the fourth embodiment of the present invention.

FIG. 20 is a flowchart showing operations performed when the first offset calculator 7a calculates the first three-phase application voltage in the fourth embodiment of the present invention. FIG. 21 is an illustrative diagram depicting the first three-phase voltage command output by the voltage command calculator 6, and the first three-phase application voltage output by the first offset calculator 7a, in the fourth embodiment of the present invention. FIG. 22 is a flowchart showing operations performed when the second offset calculator 7b calculates the second three-phase application voltage in the fourth embodiment of the present invention. FIG. 23 is an illustrative diagram depicting the second three-phase voltage command output by the voltage command calculator 6, and the second three-phase application voltage output by the second offset calculator 7b, in the fourth embodiment of the present invention.

As illustrated in FIG. 20, the first offset calculator 7a advances to step S121 after executing step S120. The first offset calculator 7a executes step S121 and then, if the difference between the first medium phase voltage command Vmid1 and the first minimum phase voltage command Vmin1 is equal to or greater than the reference voltage threshold value Vth, executes step S122, or if the difference between the first medium phase voltage command Vmid1 and the first minimum phase voltage command Vmin1 is less than the reference voltage threshold value Vth, executes step S413.

Here, in step S413, the value of the first three-phase application voltage is calculated by changing all of the voltage commands in the first three-phase voltage command by the same amount mutually in such a manner that the voltage applied to the phase corresponding to the first maximum phase voltage command Vmax1 matches the maximum value of the first carrier wave signal C1.

Consequently, the application voltage of the phase corresponding to the first maximum phase voltage command Vmax1, in the first three-phase application voltage calculated by the execution of step S413, matches the maximum value of the first carrier wave signal.

As can be seen from FIG. 21, at moment [2], for example, the first medium phase voltage command Vmid1 and the first minimum phase voltage command Vmin1 are close to each other, and therefore the first offset calculator 7a executes step S413 as the second calculation process. In this case, the voltage Vv1' applied to the V phase, which is the phase corresponding to the first maximum phase voltage command Vmax1, matches the maximum value of the first carrier wave signal C1.

In this way, the first offset calculator 7a shifts all of the voltage commands of the first three-phase voltage command, equally, in the positive direction, in such a manner that the voltage applied to the phase corresponding to the first maximum phase voltage command Vmax1 is equal to the maximum value of the first carrier wave signal C1. In this case, the difference between the application voltages in the first three-phase application voltage and the reference voltage lower limit value Vlo becomes greater.

If the difference between the application voltages in the first three-phase application voltage and the reference voltage lower limit value Vlo is large, then the amplitude range of the first three-phase voltage command in which the application voltages in the first three-phase application voltage can be set to values equal to or greater than the reference voltage lower limit value Vlo is expanded.

Consequently, compared to the first to third embodiments, even if the amplitude of the first three-phase voltage command has become large, the application voltages in the first three-phase application voltage does not become lower than the reference voltage lower limit value Vlo. As a result of this, switching of the switching signals Qup1 to Qwn1 in the current detection period does not occur, and the second current detector 9b is able to detect the second three-phase current accurately.

The operation for calculating the second three-phase application voltage performed by the second offset calculator 7b is as illustrated in FIG. 22. As can be seen from FIG. 22, this flowchart comprises step S130, step S131, step S132 for executing the third calculation process, and step S423 for executing the fourth calculation process, similarly to step S413. In other words, the second offset calculator 7b calculates the second three-phase application voltage, similarly to the first offset calculator 7a. Consequently, as illustrated in FIG. 23, the waveform of the second three-phase voltage command output by the voltage command calculator 6 and the waveform of the second three-phase application voltage output by the second offset calculator 7b are similar to FIG. 21.

In this way, the difference between the application voltages in the second three-phase application voltage and the reference voltage lower limit value Vlo becomes larger, and therefore, compared to the first to third embodiments above, the application voltages in the second three-phase application voltage do not become lower than the reference voltage lower limit value Vlo, even if the amplitude of the second three-phase voltage command is large. As a result of this, switching of the switching signals Qup2 to Qwn2 in the current detection period does not occur, and the first current detector 9a is able to detect the first three-phase current accurately.

According to the fourth embodiment, the offset calculator, in the second calculation process, calculates the first three-phase application voltage by changing all of the voltage commands in the first three-phase voltage command by the same amount mutually, in such a manner that the voltage applied to the phase corresponding to the first minimum phase voltage command is equal to or greater than the reference voltage lower limit value, and in such a manner that the voltage applied to the phase corresponding to the first maximum phase voltage command is equal to or lower than the maximum value of the first carrier wave signal. Furthermore, the offset calculator, in the fourth calculation process, calculates the second three-phase application voltage by changing all of the voltage commands in the second three-phase voltage command by the same amount mutually, in such a manner that the voltage applied to the phase corresponding to the second minimum phase voltage command is equal to or greater than the reference voltage lower limit value, and in such a manner that the voltage applied to the phase corresponding to the second maximum phase voltage command is equal to or lower than the maximum value of the second carrier wave signal. Consequently, similar beneficial effects to the first embodiment described above are obtained.

Furthermore, the offset calculator, in the second calculation process, changes all of the voltage commands of the first three-phase voltage command, by the same amount mutually, in a positive direction in which the voltage applied to the phase corresponding to the first maximum phase voltage command approaches the maximum value of the first carrier wave signal. Moreover, the offset calculator, in the fourth calculation process, changes all of the voltage commands of the second three-phase voltage command, by the same amount mutually, in a positive direction in which the voltage applied to the phase corresponding to the second maximum phase voltage command approaches the maximum value of the second carrier wave signal.

Accordingly, compared to the first to third embodiments, since the first three-phase voltage command and the second three-phase voltage command can be set to a large amplitude, then the first current detector can detect the first three-phase current more accurately, and the second current detector can detect the second three-phase current more accurately.

Fifth Embodiment

In a fifth embodiment of the present invention, the contents of the second calculation process and the fourth calculation process are different to the first to fourth embodiments. In the fifth embodiment, points which are the same as the first to fourth embodiments above are not explained and the points which are different from the first to fourth embodiments will be described.

Here, in the fifth embodiment, the first offset calculator 7a, in the second calculation process, calculates the first three-phase application voltage by changing all of the voltage commands in the first three-phase voltage command by the same amount mutually, in a direction in which the voltage applied to the phase corresponding to the first maximum phase voltage command Vmax1 approaches a reference voltage upper limit value Vhi.

Furthermore, the second offset calculator 7b, in the fourth calculation process, calculates the second three-phase application voltage by changing all of the voltage commands in the second three-phase voltage command by the same amount mutually, in a direction in which the voltage applied to the phase corresponding to the second maximum phase voltage command Vmax2 approaches the reference voltage upper limit value Vhi.

Here, a specific example is described in which the first offset calculator 7a changes all of the voltage commands in the first three-phase voltage command by the same amount mutually in such a manner that the voltage applied to the phase corresponding to the first maximum phase voltage command Vmax1 matches the reference voltage upper limit value Vhi. Furthermore, an example is described here in which the second offset calculator 7b changes all of the voltage commands in the second three-phase voltage command by the same amount mutually in such a manner that the voltage applied to the phase corresponding to the second maximum phase voltage command Vmax2 matches the reference voltage upper limit value Vhi.

Next, the definition of the reference voltage upper limit value Vhi will be described. The reference voltage upper limit value Vhi is defined by the following equation, using the reference voltage threshold value Vth and the maximum value of the first carrier wave signal C1.

Reference voltage upper limit value $Vhi$=(maximum value of first carrier wave signal $C1$)−reference voltage threshold value $Vth$ As stated above, here, the maximum value of the first carrier wave signal C1 is taken to be 0.5 Vdc, and therefore in this case, the reference voltage upper limit value Vhi is expressed by "0.5 Vdc−Vth".

The operations of the first offset calculator 7a and the second offset calculator 7b according to the fifth embodiment are described with reference to FIG. 24 to FIG. 27.

Figure 26:
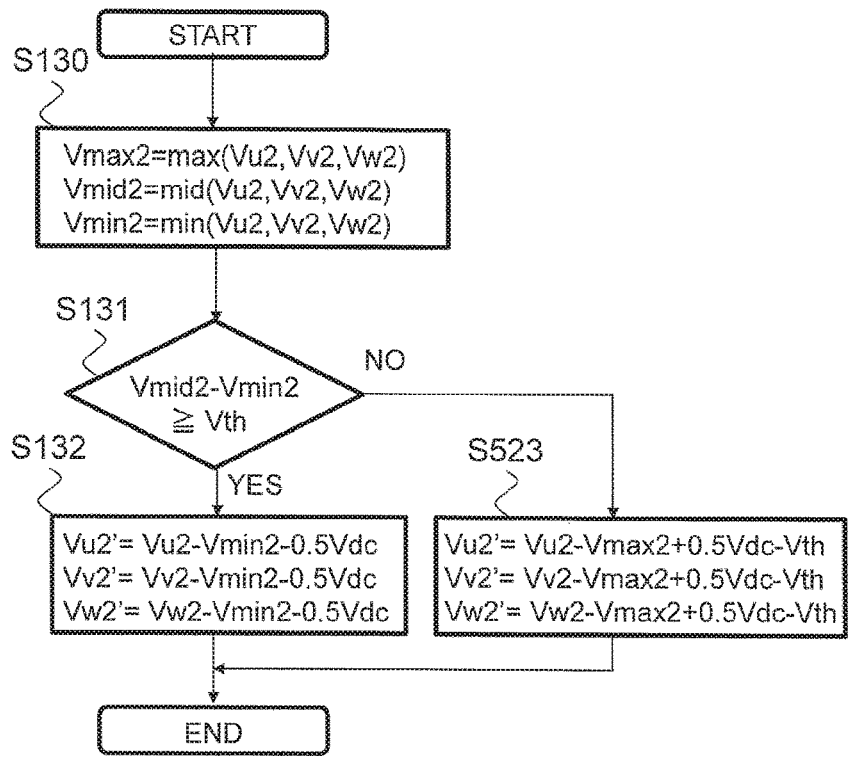
FIG. 26 is a flowchart showing operations performed when a second offset calculator calculates a second three-phase application voltage in the fifth embodiment of the present invention.
Figure 27:
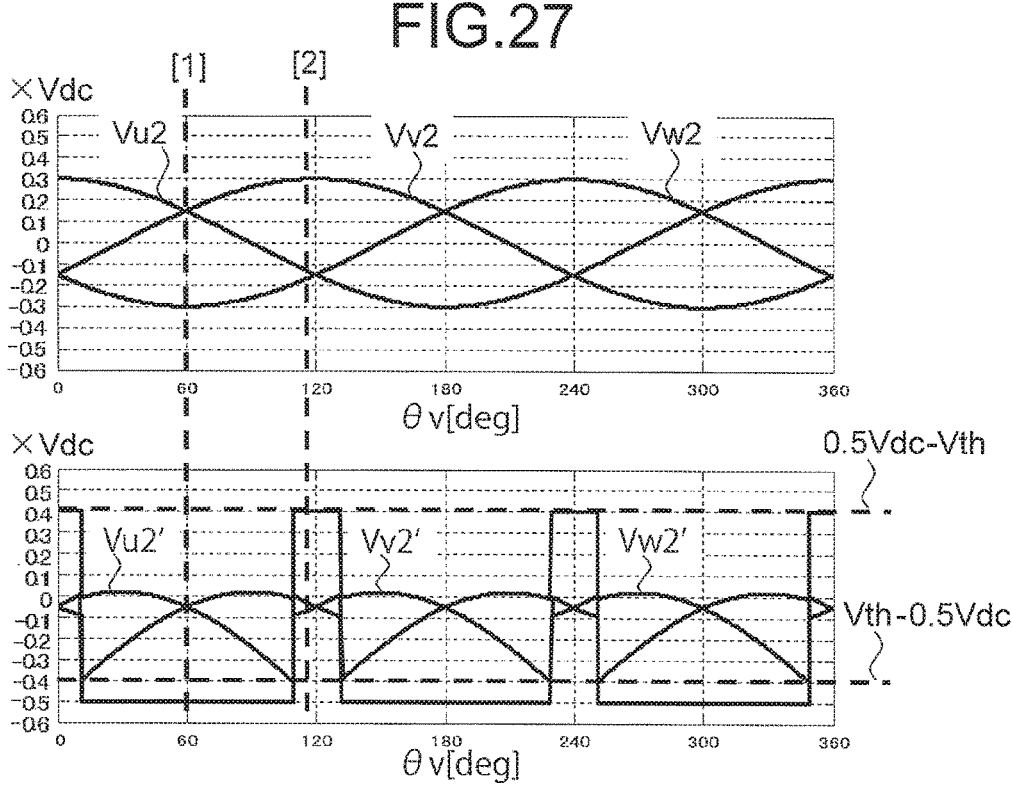
FIG. 27 is an illustrative diagram depicting a second three-phase voltage command output by the voltage command calculator, and the second three-phase application voltage output by the second offset calculator, in the fifth embodiment of the present invention.

FIG. 24 is a flowchart showing operations performed when the first offset calculator 7a calculates the first three-phase application voltage in the fifth embodiment of the present invention. FIG. 25 is an illustrative diagram depicting the first three-phase voltage command output by the voltage command calculator 6, and the first three-phase application voltage output by the first offset calculator 7a, in the fifth embodiment of the present invention. FIG. 26 is a flowchart showing operations performed when the second offset calculator 7b calculates the second three-phase application voltage in the fifth embodiment of the present invention. FIG. 27 is an illustrative diagram depicting the second three-phase voltage command output by the voltage command calculator 6, and the second three-phase application voltage output by the second offset calculator 7b, in the fifth embodiment of the present invention.

As illustrated in FIG. 24, the first offset calculator 7a advances to step S121 after executing step S120. The first offset calculator 7a executes step S121 and then, if the difference between the first medium phase voltage command Vmid1 and the first minimum phase voltage command Vmin1 is equal to or greater than the reference voltage threshold value Vth, executes step S122, or if the difference between the first medium phase voltage command Vmid1 and the first minimum phase voltage command Vmin1 is less than the reference voltage threshold value Vth, executes step S513.

Here, in step S513, the value of the first three-phase application voltage is calculated by changing all of the voltage commands in the first three-phase voltage command by the same amount mutually in such a manner that the voltage applied to the phase corresponding to the first maximum phase voltage command Vmax1 matches the reference voltage upper limit value Vhi.

Consequently, the application voltage of the phase corresponding to the first maximum phase voltage command Vmax1, in the first three-phase application voltage calculated by the execution of step S513, matches the reference voltage upper limit value Vhi.

As can be seen from FIG. 25, at moment [2], for example, the first medium phase voltage command Vmid1 and the first minimum phase voltage command Vmin1 are close to each other, and therefore the first offset calculator 7a executes step S513 as the second calculation process. In this case, the voltage Vv1' applied to the V phase, which is the phase corresponding to the first maximum phase voltage command Vmax1, matches the reference voltage upper limit value Vhi.

In this way, the first offset calculator 7a shifts all of the voltage commands of the first three-phase voltage command, equally, in the positive direction, in such a manner that the voltage applied to the phase corresponding to the first maximum phase voltage command Vmax1 is equal to the reference voltage upper limit value Vhi. In this case, the difference between the application voltages in the first three-phase application voltage and the reference voltage lower limit value Vlo becomes greater.

Consequently, similarly to the fourth embodiment above, compared to the first to third embodiments, even if the amplitude of the first three-phase voltage command has become large, the application voltages in the first three-phase application voltage does not become lower than the reference voltage lower limit value Vlo. As a result of this, switching of the switching signals Qup1 to Qwn1 in the current detection period does not occur, and the second current detector 9b is able to detect the second three-phase current accurately.

The operation for calculating the second three-phase application voltage performed by the second offset calculator 7b is as illustrated in FIG. 26. As can be seen from FIG. 26, this flowchart comprises step S130, step S131, step S132 for executing the third calculation process, and step S523 for executing the fourth calculation process, similarly to step S513. In other words, the second offset calculator 7b calculates the second three-phase application voltage, similarly to the first offset calculator 7a. Consequently, as illustrated in FIG. 27, the waveform of the second three-phase voltage command output by the voltage command calculator 6 and the waveform of the second three-phase application voltage output by the second offset calculator 7b are similar to FIG. 25.

In this way, the difference between the application voltages in the second three-phase application voltage and the reference voltage lower limit value Vlo becomes larger, and therefore, compared to the first to third embodiments above, the application voltages in the second three-phase application voltage do not become lower than the reference voltage lower limit value Vlo, even if the amplitude of the second three-phase voltage command has become large. As a result of this, switching of the switching signals Qup2 to Qwn2 in the current detection period does not occur, and the first current detector 9a is able to detect the first three-phase current accurately.

According to the fifth embodiment above, the offset calculator, in the second calculation process, changes all of the voltage commands of the first three-phase voltage command, by the same amount mutually, in a positive direction in which the voltage applied to the phase corresponding to the first maximum phase voltage command approaches the reference voltage upper limit value, which is the difference between the maximum value of the first carrier wave signal and the reference voltage threshold value. Moreover, the offset calculator, in the fourth calculation process, changes all of the voltage commands of the second three-phase voltage command, by the same amount mutually, in a positive direction in which the voltage applied to the phase corresponding to the second maximum phase voltage command approaches the reference voltage upper limit value. Consequently, similar beneficial effects to the fourth embodiment described above are obtained.

Here, as described in the first to fifth embodiments, if there is an 180° phase differential in the carrier wave signal between the first power converter 4a and the second power converter 4b, then the main combinations of calculation processes which are executed by the first offset calculator 7a and the second offset calculator 7b are a combination of the first calculation process and the third calculation process, and a combination of the second calculation process and the fourth calculation process.

If there is a phase difference between the first three-phase coil and the second three-phase coil, or if there is an impedance difference between the first three-phase coil and the second three-phase coil, a phase difference or an amplitude difference occurs between the first three-phase voltage command and the second three-phase voltage command. As a result of this, a combination of the first calculation process and the fourth calculation process, or a combination of the second calculation process and the third calculation process, occur as combinations of the calculation processes which are executed by the first offset calculator 7a and the second offset calculator 7b.

Even in cases of this kind, it is possible to further reduce ripple current in the smoothing capacitor 3, by combining the contents disclosed respectively in the first to fifth embodiments. Two examples are described below.

Example 1

By executing the first calculation process as described above, the first three-phase voltage command is shifted equally in the negative direction in such a manner that the application voltage of the phase corresponding to the first minimum phase voltage command, in the first three-phase application voltage, matches the minimum value of the first carrier wave signal C1.

Therefore, if calculation processing is executed by a combination of the first calculation process and the fourth calculation process, then in the fourth calculation process, the second three-phase application voltage is calculated by shifting the second three-phase voltage commands equally in the negative direction. In other words, when the first offset calculator 7a and the second offset calculator 7b seek to execute calculation processing by a combination of the first calculation process and the fourth calculation process, the second offset calculator 7b, in the fourth calculation process, changes all of the voltage commands in the second three-phase voltage command by the same amount mutually, in a negative direction in which the voltage applied to the phase corresponding to the second minimum phase voltage command Vmin2 approaches the reference voltage lower limit value Vlo.

Example 2

By executing the third calculation process as described above, the second three-phase voltage command is shifted equally in the negative direction in such a manner that the application voltage of the phase corresponding to the second minimum phase voltage command, in the second three-phase application voltage, matches the minimum value of the second carrier wave signal C2.

Therefore, if calculation processing is executed by a combination of the second calculation process and the third calculation process, then in the third calculation process, the first three-phase application voltage is calculated by shifting the first three-phase voltage commands equally in the negative direction. In other words, when the first offset calculator 7a and the second offset calculator 7b seek to execute calculation processing by a combination of the second calculation process and the third calculation process, the first offset calculator 7a, in the second calculation process, changes all of the voltage commands of the first three-phase voltage command by the same amount mutually, in a negative direction in which the voltage applied to the phase corresponding to the first minimum phase voltage command Vmin1 approaches the reference voltage lower limit value Vlo.

Sixth Embodiment

In a sixth embodiment of the present invention, if specific conditions are established, the first offset calculator 7a and the second offset calculator 7b calculate the first three-phase application voltage and the second three-phase application voltage by executing a fifth calculation process instead of the first to fourth calculation processes. In the sixth embodiment, points which are the same as the first to fifth embodiments above are not explained and the points which are different from the first to fifth embodiments will be described.

Here, in the sixth embodiment, if specific conditions are established, the first offset calculator 7a, in the fifth calculation process, calculates the first three-phase application voltage from the first three-phase voltage command such that a first average voltage Vave1 which is the average value of the application voltages in the first three-phase application voltage is 0.

Furthermore, if specific conditions are established, the second offset calculator 7b, in the fifth calculation process, calculates the second three-phase application voltage from the second three-phase voltage command such that a second average voltage Vave2 which is the average value of the application voltages in the second three-phase application voltage is 0.

The first average voltage Vave1 matches the average value of the voltages applied to the first three-phase coil from the power converter 4a, and the second average voltage Vave2 matches the average value of the voltages applied to the second three-phase coil from the power converter 4b.

Furthermore, the specific conditions under which the first offset calculator 7a and the second offset calculator 7b execute the fifth calculation process are when condition (1), condition (2) or condition (3) below is established.

Condition (1)
A rotational speed ω of the AC rotary machine 1 is equal to or lower than a rotational speed threshold value ωx.

Condition (2)
A current command Iref for the AC rotary machine 1 is equal to or lower than a current command threshold value Ix.

Condition (3)
An amplitude Vamp of the first three-phase voltage command is equal to or lower than an amplitude threshold value Vx.

Figure 28:
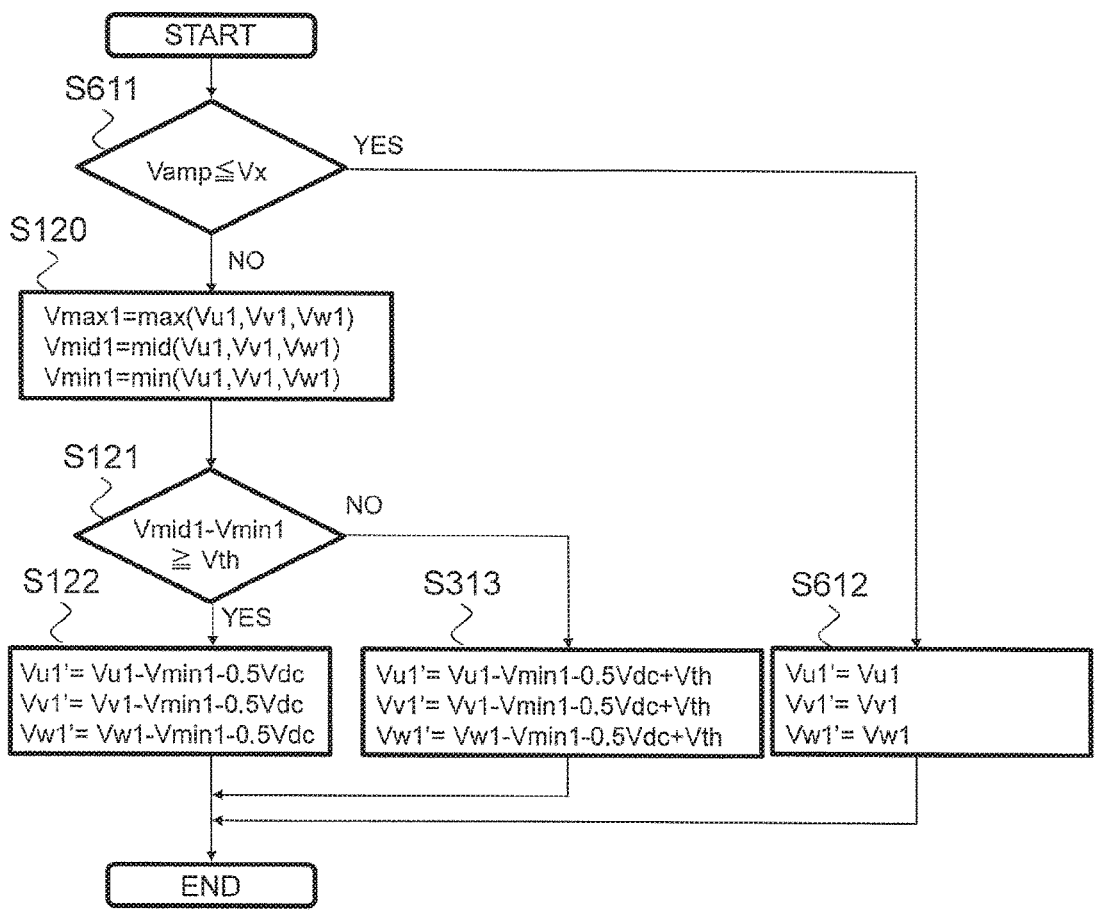
FIG. 28 is a flowchart showing operations performed when a first offset calculator calculates a first three-phase application voltage in a sixth embodiment of the present invention.
Figure 29:
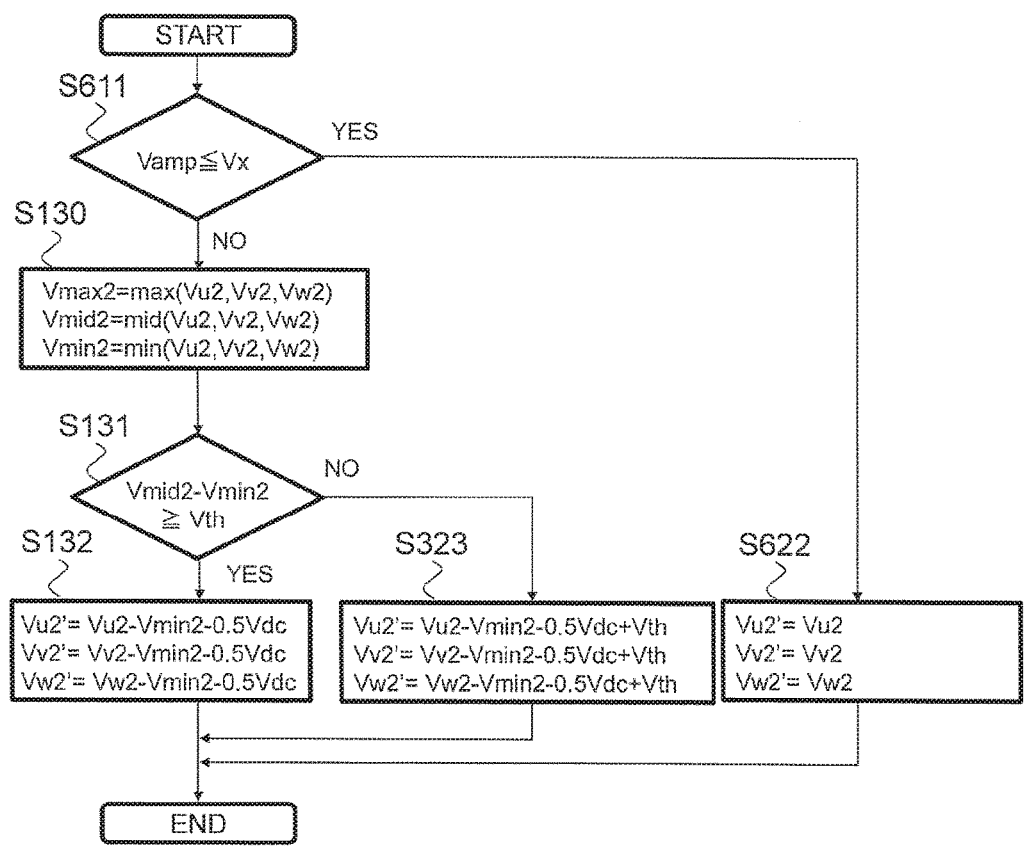
FIG. 29 is a flowchart showing operations performed when a second offset calculator calculates a second three-phase application voltage in the sixth embodiment of the present invention.

The operations of the first offset calculator 7a and the second offset calculator 7b according to the sixth embodiment are described with reference to FIG. 28 and FIG. 29. FIG. 28 is a flowchart showing operations performed when the first offset calculator 7a according to the sixth embodiment of the present invention calculates the first three-phase application voltage. FIG. 29 is a flowchart showing operations performed when the second offset calculator 7b according to the sixth embodiment of the present invention calculates the second three-phase application voltage.

As illustrated in FIG. 28, in step S611, the first offset calculator 7a determines whether or not condition (3) is established. In other words, the first offset calculator 7a determines whether or not the amplitude Vamp of the first three-phase voltage command is equal to or lower than the amplitude threshold value Vx.

The first offset calculator 7a advances to step S612 if it is determined that the amplitude Vamp is equal to or lower than the amplitude threshold value Vx (in other words, YES), and advances to step S120 if it is determined that the amplitude Vamp is greater than the amplitude threshold value Vx (in other words, NO).

In S611, it is also possible to determine whether or not condition (1) or condition (2) is established instead of condition (3).

In step S612, the first offset calculator 7a sets the voltage commands in the first three-phase voltage command directly as the first three-phase application voltage. Here, if the first three-phase voltage command is given as the balanced three-phase AC voltage as indicated in the upper part of FIG. 3, then the first average voltage Vave1 is 0 (=(Vu1'+Vv1'+Vw1')/3), and is a uniform value through one cycle of the electrical angle.

On the other hand, if the first offset calculator 7a has advanced to step S120, then the operations thereafter are similar to the first to fifth embodiments above. FIG. 28 shows an example in which the first offset calculator 7a carries out similar operations to the third embodiment above (see FIG. 16).

The operation for calculating the second three-phase application voltage performed by the second offset calculator 7b is as illustrated in FIG. 29. As can be seen from FIG. 29, this flowchart comprises a step S611, a step S622 for executing the fifth calculation process, similarly to step S612, step S130, step S131, step S132 and step S323. In other words, the second offset calculator 7b calculates the second three-phase application voltage, similarly to the first offset calculator 7a.

Consequently, if the second three-phase voltage command is given as the balanced three-phase AC voltage as indicated in the upper part of FIG. 5, then the second average voltage Vave2 is 0 (=(Vu2'+Vv2'+Vw2')/3), and is a uniform value through one cycle of the electrical angle.

Here, if the fifth calculation process is executed when specific conditions are established, then an advantage can be obtained in that vibration of the AC rotary machine 1 can be suppressed to a maximum extent, and a drawback arises in that the ripple current in the smoothing capacitor 3 increases and the voltage amplitude cannot be made large. To give a specific example in respect of the voltage amplitude, when the first calculation process is executed, the maximum voltage gain is 86.6% compared to when the first calculation process is executed.

Therefore, it is possible to suppress vibration of the AC rotary machine 1 by setting the current command threshold value Ix to a range wherein the ripple current in the smoothing capacitor 3 is not especially problematic, as condition (2), and then executing the fifth calculation process if the current command Iref is equal to or lower than the current command threshold value Ix. In this case, it is necessary to adopt a configuration wherein the offset calculator 7 is able to acquire the current command Iref.

Furthermore, it is possible to suppress vibration of the AC rotary machine 1 by setting an amplitude threshold value Vx on the basis of the voltage amplitude that can be output by the offset calculator 7 when the fifth calculation process is executed, as condition (3), and executing the fifth calculation process if the amplitude Vamp is equal to or lower than the amplitude threshold value Vx.

Furthermore, it is also possible to suppress vibration of the AC rotary machine 1 by setting a rotational speed threshold value ωx on the basis of the amplitude threshold value Vx, utilizing the fact that the voltage amplitude and the rotational speed of the AC rotary machine 1 are directly proportional, in condition (1), and then executing the fifth calculation process when the rotational speed ω is equal to or lower than the rotational speed threshold value ωx. In this case, it is necessary to adopt a configuration wherein the offset calculator 7 is able to acquire the rotational speed ω of the AC rotary machine 1.

According to the sixth embodiment described above, when condition (1), (2) or (3) is established, the offset calculator carries out the fifth calculation process, instead of the first to fourth calculation processes, whereby the first three-phase application voltage is calculated from the first three-phase voltage command such that the first average voltage becomes 0, and the second three-phase application voltage is calculated from the second three-phase voltage command such that the second average voltage becomes 0. Consequently, it is possible to further suppress vibration of the AC rotary machine, in comparison with the first to fifth embodiments.

Seventh Embodiment

In a seventh embodiment of the present invention, if condition (1), (2) or (3) described in the sixth embodiment above is established, the first offset calculator 7a and the second offset calculator 7b calculate the first three-phase application voltage and the second three-phase application voltage by executing a sixth calculation process, instead of the fifth calculation process. In the seventh embodiment, points which are the same as the first to sixth embodiments above are not explained and the points which are different from the first to sixth embodiments will be described.

Here, in the seventh embodiment, the first offset calculator 7a, in the sixth calculation process, calculates the first three-phase application voltage from the first three-phase voltage command, in such a manner that the first average voltage Vave1 is a first set voltage value less than 0. Furthermore, in the sixth calculation process, the second offset calculator 7b calculates the second three-phase application voltage from the second three-phase voltage command, in such a manner that the second average voltage Vave2 is the first set voltage value.

Furthermore, the first offset calculator 7a and the second offset calculator 7b calculate the first three-phase application voltage and the second three-phase application voltage by executing the sixth calculation process when condition (1), (2) or (3) is established.

The operation of the first offset calculator 7a and the second offset calculator 7b according to the seventh embodiment are described here with reference to FIG. 30 to FIG. 33.

Figure 30:
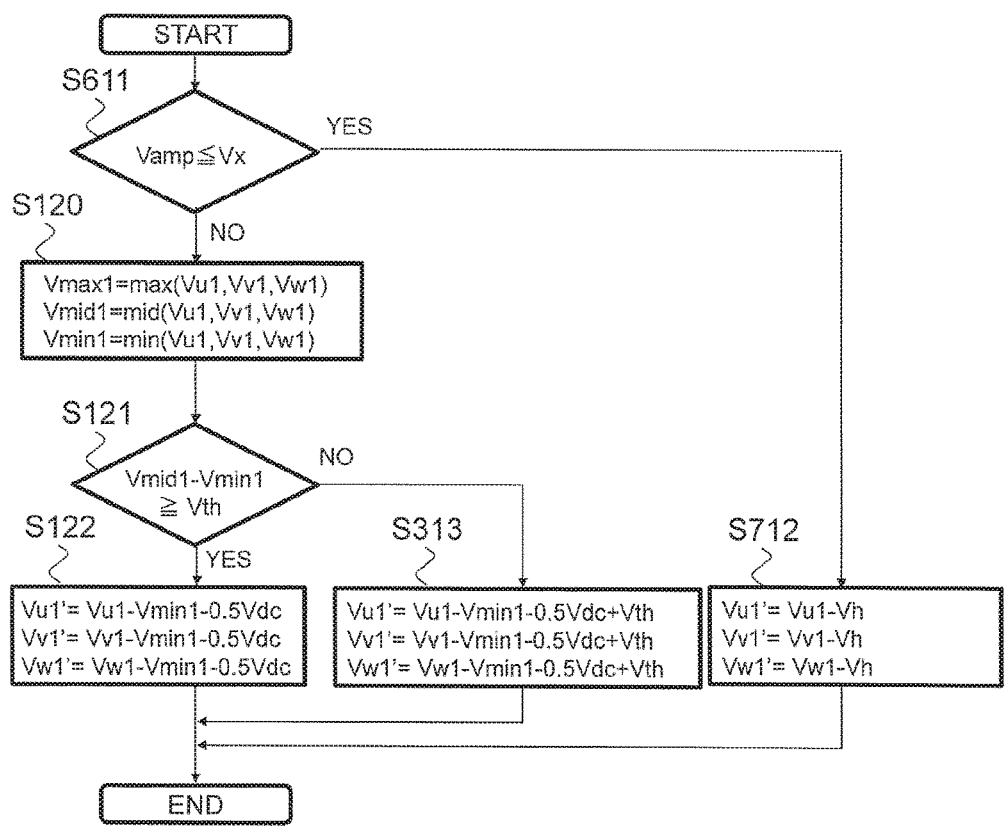
FIG. 30 is a flowchart showing operations performed when a first offset calculator calculates a first three-phase application voltage in a seventh embodiment of the present invention.
Figure 31:
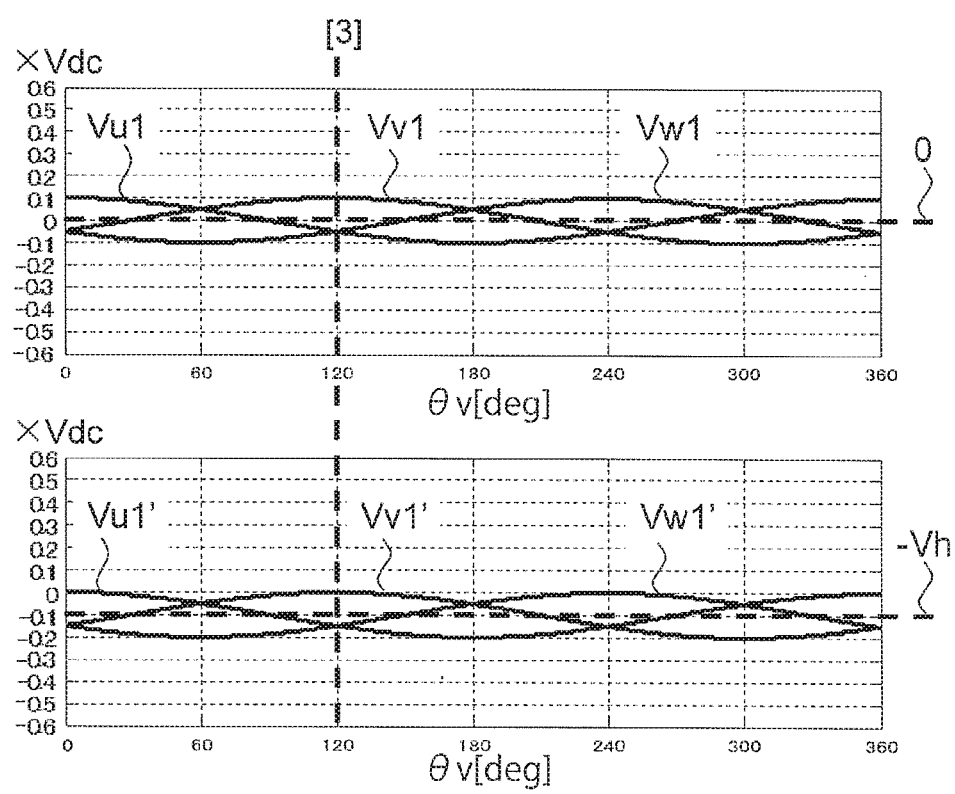
FIG. 31 is an illustrative diagram depicting a first three-phase voltage command output by a voltage command calculator, and the first three-phase application voltage output by the first offset calculator, in the seventh embodiment of the present invention.
Figure 32:
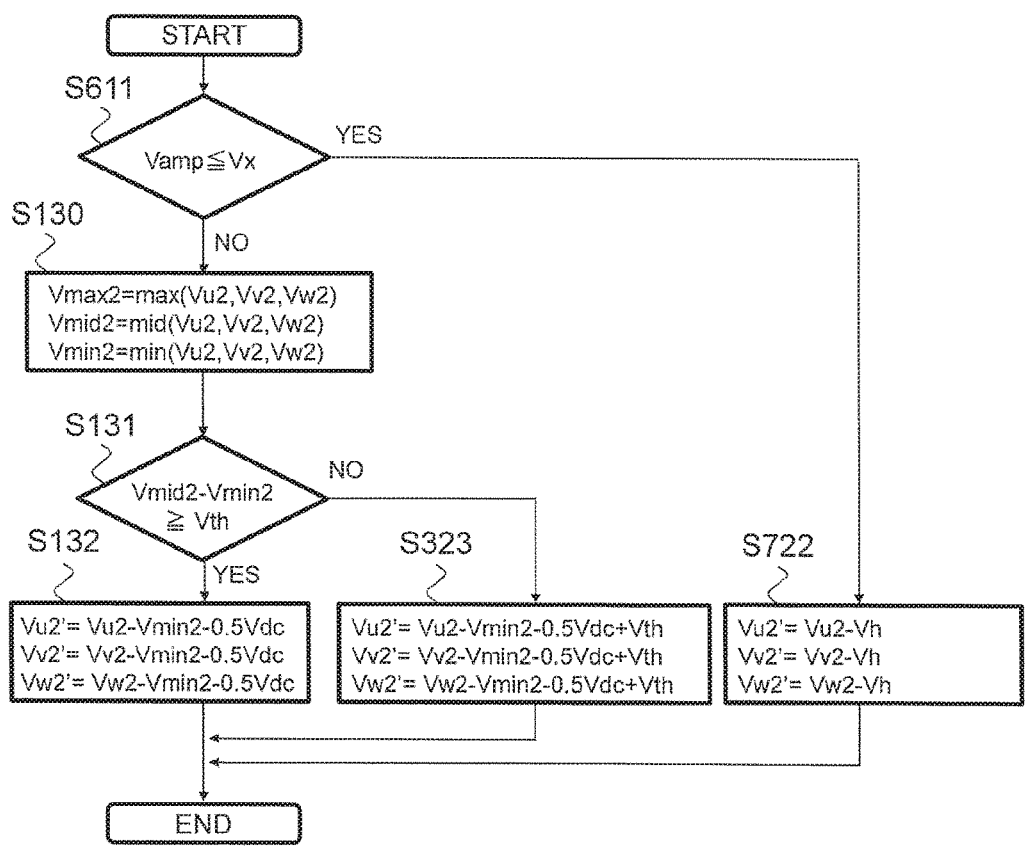
FIG. 32 is a flowchart showing operations performed when a second offset calculator calculates a second three-phase application voltage in the seventh embodiment of the present invention.
Figures 33, 34:
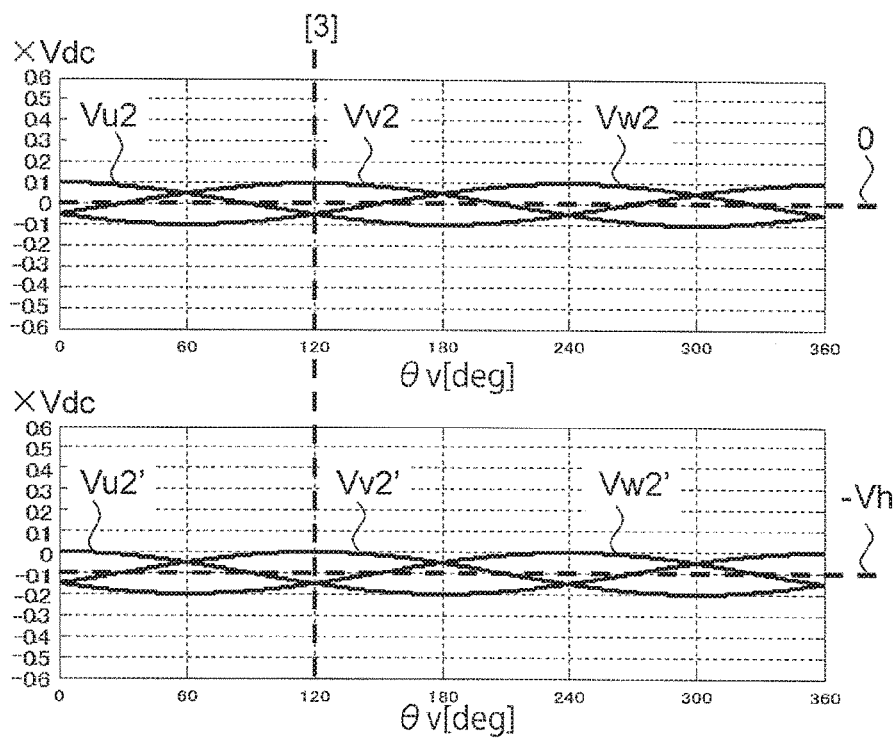
FIG. 33 is an illustrative diagram depicting a second three-phase voltage command output by the voltage command calculator, and the second three-phase application voltage output by the second offset calculator, in the seventh embodiment of the present invention.
FIG. 34 is an illustrative diagram for describing the relationship between a first switching signal, a first voltage vector and a first bus line current in the seventh embodiment of the present invention.

FIG. 30 is a flowchart showing operations performed when the first offset calculator 7a calculates the first three-phase application voltage in the seventh embodiment of the present invention. FIG. 31 is an illustrative diagram depicting the first three-phase voltage command output by the voltage command calculator 6, and the first three-phase application voltage output by the first offset calculator 7a, in the seventh embodiment of the present invention. FIG. 32 is a flowchart showing operations performed when the second offset calculator 7b calculates the second three-phase application voltage in the seventh embodiment of the present invention. FIG. 33 is an illustrative diagram depicting the second three-phase voltage command output by the voltage command calculator 6, and the second three-phase application voltage output by the second offset calculator 7b, in the seventh embodiment of the present invention.

As illustrated in FIG. 30, the first offset calculator 7a executes step S611, and advances to step S712 if condition (3) is established, and advances to step S120 if condition (3) is not established. In FIG. 30, at step S611, it is determined whether or not condition (3) is established, but as stated above, a configuration may also be adopted in which it is determined whether or not condition (1) or condition (2) is established.

In step S712, the first offset calculator 7a calculates the first three-phase application voltage as a value obtained by subtracting the offset voltage Vh from the voltage commands of the first three-phase voltage command. The offset voltage Vh is a value greater than 0 and is set in advance. Here, to give a specific example, the offset voltage Vh is 0.1 Vdc.

In this way, the first offset calculator 7a calculates the first three-phase application voltage from the first three-phase voltage command in such a manner that the first average voltage Vave1 becomes the first set voltage value (=−Vh) which is less than 0.

On the other hand, if the first offset calculator 7a has advanced to step S120, then the operations thereafter are similar to the first to fifth embodiments above. FIG. 30 shows an example in which the first offset calculator 7a carries out similar operations to the third embodiment above (see FIG. 16).

Here, if the first three-phase voltage command is given as a balanced three-phase AC voltage as indicated in the upper part of FIG. 31, then the first average voltage Vave1 is −Vh (=(Vu1'+Vv1'+Vw1')/3), and is a uniform value through one cycle of the electrical angle. Furthermore, FIG. 31 shows an example in which the first average voltage Vave1 is −0.1 Vdc.

The operation for calculating the second three-phase application voltage performed by the second offset calculator 7b is as illustrated in FIG. 32. As can be seen from FIG. 32, this flowchart comprises a step S611, a step S722 for executing the sixth calculation process similarly to step S712, step S130, step S131, step S132 and step S323. In other words, the second offset calculator 7b calculates the second three-phase application voltage, similarly to the first offset calculator 7a.

Here, if the second three-phase voltage command is given as a balanced three-phase AC voltage as indicated in the upper part of FIG. 33, then the second average voltage Vave2 is −Vh (=(Vu2'+Vv2'+Vw2')/3), and is a uniform value through one cycle of the electrical angle. Furthermore, FIG. 33 shows an example in which the second average voltage Vave2 is −0.1 Vdc.

Next, the advantages of adopting a configuration wherein the sixth calculation process is executed instead of the fifth calculation process, as in the seventh embodiment, will be described in comparison with the sixth embodiment above.

Firstly, the relationship between the switching signals Qup1 to Qwn1, a first voltage vector which is output by the first power converter 4a, and a first bus line current Iinv1 which flows into the first power converter 4a (illustrated in FIG. 1 above) is described with reference to FIG. 34. FIG. 34 is an illustrative diagram for describing the relationship between the first switching signal, the first voltage vector and the first bus line current Iinv1 in the seventh embodiment of the present invention.

The relationship illustrated in FIG. 34 is well known and therefore a detailed description is omitted here. Furthermore, the suffix (1) after the first voltage vectors is stated in order to represent the first voltage vectors, for the purposes of distinguishing same from second voltage vectors which are described below.

In FIG. 34, if the first voltage vector is V0(1) and V7(1) in accordance with the values of the switching signals Qup1 to Qwn1, then the first bus line current Iinv1 is 0. Here, the voltage vector at which the first bus line current Iinv1, such as V0(1) and V7(1), becomes 0 is called the "zero vector". In this way, when the first voltage vector is a zero vector, the first bus line current Iinv1 is 0.

In FIG. 34, when the first voltage vector is a vector other than the zero vectors V0(1) and V7(1), namely, V1(1) to V6(1), then the first bus line current Iinv1 is not 0. Here, a voltage vector such as V1(1) to V6(1) at which the first bus line current Iinv1 does not become 0 is called an "effective vector". In this way, when the first voltage vector is an effective vector, the first bus line current Iinv1 is not 0.

Furthermore, if the first voltage vector is an effective vector, as illustrated in FIG. 34, then the first bus line current Iinv1 has a value equal to one of the currents in the first three-phase current, or to the value of one of the currents with the sign thereof inverted. In this case, if this one current is not 0, then the first bus line current Iinv1 is not 0.

Figures 35, 36:
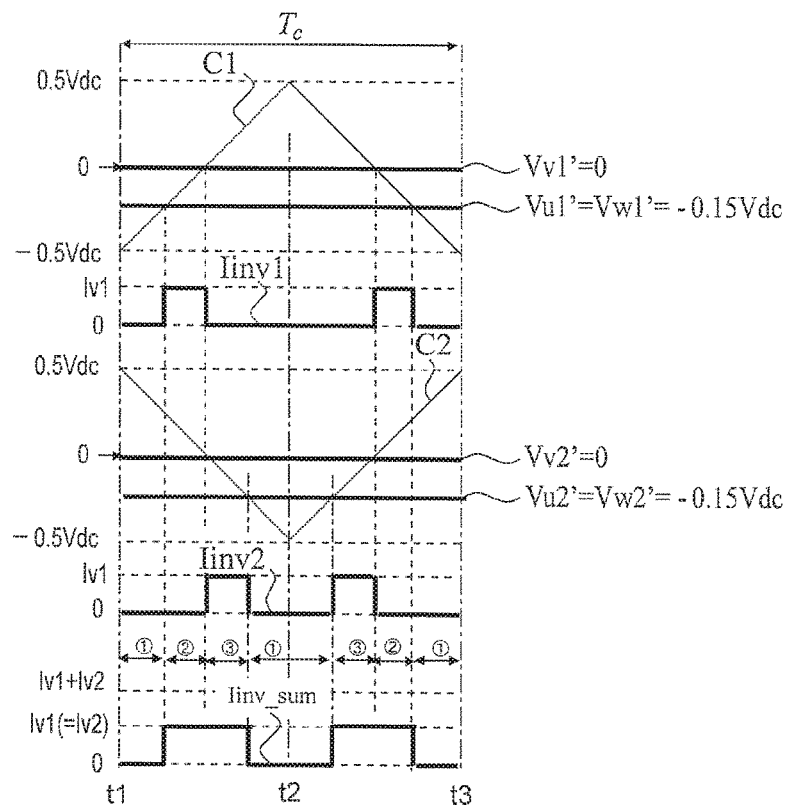
FIG. 35 is an illustrative diagram for describing the relationship between a second switching signal, a second voltage vector and a second bus line current in the seventh embodiment of the present invention.
FIG. 36 is an illustrative diagram depicting the relationship between a first carrier wave signal, a second carrier wave signal, the first three-phase application voltage, the second three-phase application voltage, the first bus line current, the second bus line current, and the sum of the bus line current, in the seventh embodiment of the present invention.

Next, the relationship between the switching signals Qup2 to Qwn2, the second voltage vector which is output by the second power converter 4b, and a second bus line current Iinv2 (illustrated in FIG. 1 above) which flows into the second power converter 4b is described with reference to FIG. 35. FIG. 35 is an illustrative diagram for describing the relationship between the second switching signal, the second voltage vector and the second bus line current Iinv2 in the seventh embodiment of the present invention.

The relationship illustrated in FIG. 35 is well known and therefore a detailed description is omitted here. Furthermore, the suffix (2) after the second voltage vectors is stated in order to represent the second voltage vectors, for the purpose of distinguishing same from the first voltage vectors.

In FIG. 35, if the second voltage vector is V0(2) and V7(2) in accordance with the values of the switching signals Qup2 to Qwn2, then the second bus line current Iinv2 is 0. Here, the voltage vector at which the second bus line current Iinv2, such as V0(2) and V7(2), becomes 0 is called the "zero vector" similarly to the above. In this way, when the second voltage vector is a zero vector, the second bus line current Iinv2 is 0.

In FIG. 35, when the second voltage vector is a vector other than the zero vectors V0(2) and V7(2), namely, V1(2) to V6(2), then the second bus line current Iinv2 is not 0. Here, a voltage vector at which the second bus line current Iinv2, such as V1(2) to V6(2), is not 0 is called an "effective vector" similarly to the above. In this way, when the second voltage vector is an effective vector, the second bus line current Iinv2 is not 0.

Furthermore, if the second voltage vector is an effective vector, as illustrated in FIG. 35, then the second bus line current Iinv2 has a value equal to one of the currents in the second three-phase current, or to the value of one of the currents with the sign thereof inverted. In this case, if this one current is not 0, then the second bus line current Iinv2 is not 0.

Next, the relationship between the first carrier wave signal C1, the second carrier wave signal C2, the first three-phase application voltage, the second three-phase application voltage, the first bus line current Iinv1, the second bus line current Iinv2, and a bus line current sum Iinv_sum which is the sum of the first bus line current Iinv1 and the second bus line current Iinv2, is described with reference to FIG. 36 and FIG. 37.

FIG. 36 is an illustrative diagram illustrating a relationship between the first carrier wave signal C1, the second carrier wave signal C2, the first three-phase application voltage, the second three-phase application voltage, the first bus line current Iinv1, the second bus line current Iinv2 and the bus line current sum Iinv_sum, in the seventh embodiment of the present invention. FIG. 37 is an illustrative diagram for the purpose of comparison with FIG. 36.

FIG. 36 shows the relationship between respective parameters at the moment indicated by [3] in FIG. 31 and FIG. 33 described above.

Figure 37:
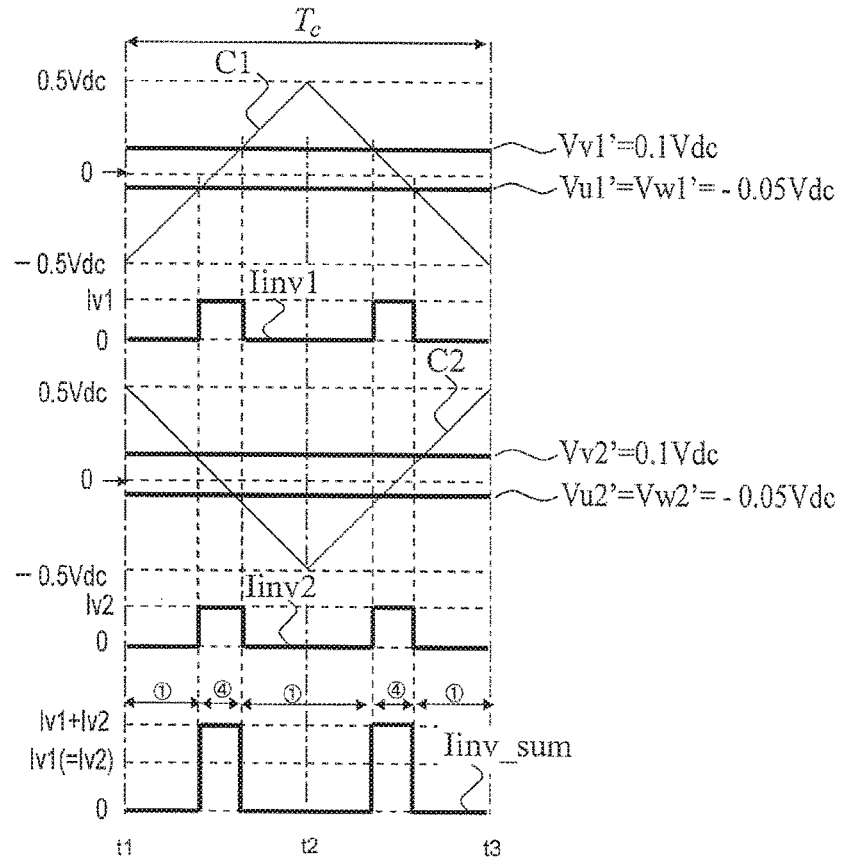
FIG. 37 is an illustrative diagram for the purpose of comparison with FIG. 36.

Furthermore, FIG. 37 shows the relationship between the respective parameters at the moment indicated by [3] when the offset voltage Vh is set to 0, as a comparative example corresponding to the sixth embodiment. In this case, the first average voltage Vave1 and the second average voltage Vave2 are 0.

Furthermore, in the carrier period Tc, in FIG. 36, $Vv1'=0$, $Vu1'=Vw1'=-0.15$ Vdc, and similarly, $Vv2'=0$, $Vu2'=Vw2'=-0.15$ Vdc.

Meanwhile, in the carrier period Tc, in FIG. 37, $Vv1'=0.1$ Vdc, $Vu1'=Vw1'=-0.05$ Vdc, and similarly, $Vv2'=0.1$ Vdc, $Vu2'=Vw2'=-0.05$ Vdc.

Here, the following modes <1> to <4> are defined in order to distinguish between the combinations of the type of the first voltage vector which is output by the first power converter 4a and the type of the second voltage vector which is output by the second power converter 4b, in the description of FIG. 36 and FIG. 37.

<1>:
The first power converter 4a and the second power converter 4b both output zero vectors.

<2>:
The first power converter 4a outputs an effective vector and the second power converter 4b outputs a zero vector.

<3>:
The first power converter 4a outputs a zero vector and the second power converter 4b outputs an effective vector.

<4>:
The first power converter 4a and the second power converter 4b both output effective vectors.

Next, the beneficial effects of the power conversion device according to the seventh embodiment, with respect to the sixth embodiment described above, will be described while comparing FIG. 36 and FIG. 37. In the drawings, the circled suffixes 1 to 4 correspond to modes <1> to <4>.

In FIG. 37, by executing the fifth calculation process, the first three-phase voltage command and the second three-phase voltage command are respectively equal to the first three-phase application voltage and the second three-phase application voltage. Therefore, as illustrated in FIG. 37, mode <1> in which the bus line current sum Iinv_sum is 0, and mode <4> in which the bus line current sum Iinv_sum is Iv1+Iv2, are repeated.

On the other hand, in FIG. 36, by executing the sixth calculation process, the values obtained by respectively subtracting the offset voltages Vh from the first three-phase voltage command and the second three-phase voltage command are the first three-phase application voltage and the second three-phase application voltage. In this case, as illustrated in FIG. 36, the period in which the first power converter 4a outputs an effective vector is shifted towards timing t1, compared to the timing at which the second power converter 4b outputs an effective vector, in the period between the timing t1 and timing t2, and is shifted towards timing t3, in the period between the timing t2 and the timing t3.

Consequently, as illustrated in FIG. 36, during the carrier period Tc, mode <2> in which the bus line current sum Iinv_sum is (Iv1+Iv2)/2 and mode <3> in which the bus line current sum Iinv_sum is (Iv1+Iv2)/2 occur respectively two times each, as a result of which the period of mode <4> is eliminated.

Figure 38:
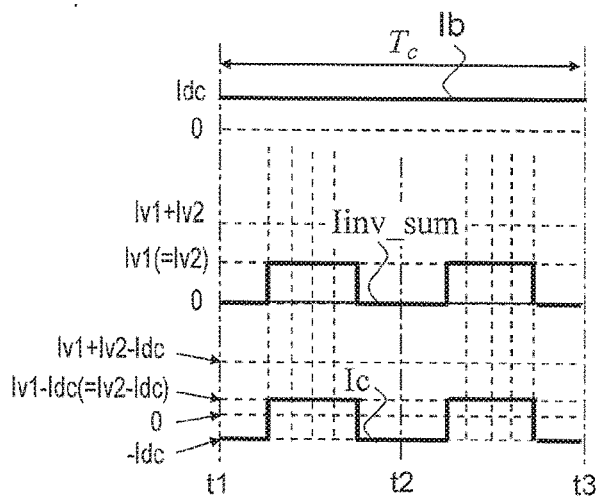
FIG. 38 is an illustrative diagram depicting a relationship between a DC current, which is the output current of the DC power source, a ripple current, which is an output current of a smoothing capacitor, and the sum of the bus line current, in the seventh embodiment of the present invention.

Next, the relationship between a DC current Ib of the DC power source 2, a ripple current Ic of the smoothing capacitor 3, and the bus line current sum Iinv_sum is described with reference to FIG. 38 and FIG. 39. FIG. 38 is an illustrative diagram illustrating the relationship between the DC current Ib, which is the output current of the DC power source 2, the ripple current Ic, which is the output current of the smoothing capacitor 3, and the bus line current sum Iinv_sum, in the seventh embodiment of the present invention. FIG. 39 is an illustrative diagram for the purpose of comparison with FIG. 38.

FIG. 38 shows the bus line current sum Iinv_sum depicted in FIG. 36, and FIG. 39 shows the bus line current sum Iinv_sum depicted in FIG. 37.

Here, as can be seen from FIG. 1 above, the relationship between the DC current Ib, the ripple current Ic and the bus line current sum Iinv_sum is represented by the following equations.

$$Iinv\_sum = Iinv1 + Iinv2 = Ib + Ic$$

Furthermore, if the DC current Ib is a uniform value Idc, then by rearranging the equation above, the ripple current Ic is expressed by the following equation.

$$Ic = Iinv1 + Iinv2 - Idc$$

With respect to FIG. 39, in FIG. 38, the period of mode <4> is eliminated, and therefore the period during which the peak value of the ripple current Ic (in other words, Iv1+Iv2-Idc) is output is eliminated.

Furthermore, in FIG. 38, due to existence of periods of mode <2> and mode <3>, the period of mode <4> is eliminated, and the period of mode <1> is also eliminated. As a result of this, in the seventh embodiment, compared to the sixth embodiment described above, it is possible to reduce the ripple current of the smoothing capacitor 3.

According to the seventh embodiment described above, when condition (1), (2) or (3) is established, the offset calculator calculates the sixth calculation process, instead of the first to fourth calculation processes, whereby the first three-phase application voltage is calculated from the first three-phase voltage command such that the first average voltage becomes the first set voltage value less than 0, and the second three-phase application voltage is calculated from the second three-phase voltage command such that the second average voltage becomes the first set voltage value.

Consequently, it is possible for one of the first power converter and the second power converter to output an effective vector and for the other thereof to output a zero vector, while suppressing vibration and noise in the AC rotary machine, by setting the first average voltage and the second average voltage to a uniform value, and therefore it is possible to reduce the ripple current of the smoothing capacitor.

The seventh embodiment describes an example where the offset voltage Vh is a value greater than 0, but similar beneficial effects are obtained if the offset voltage Vh is less than 0.

In this case, the offset calculator 7 executes a seventh calculation process, instead of the first to fourth calculation processes, whereby the first three-phase application voltage is calculated from the first three-phase voltage command such that the first average voltage becomes a second set voltage value greater than 0, and furthermore the second three-phase application voltage is calculated from the second three-phase voltage command such that the second average voltage becomes the second set voltage value.

Furthermore, it is also possible to adopt in the offset calculator 7a configuration wherein, when condition (1), (2) or (3) is established, one of the sixth calculation process and the seventh calculation process is executed while switching alternately therebetween. FIG. 40 is an illustrative diagram showing the first three-phase application voltage and the second three-phase application voltage output by the offset calculator 7 when the offset calculator 7 executes the sixth calculation process and the seventh calculation process in alternating fashion in the seventh embodiment.

FIG. 40 shows an example in which the offset voltage Vh corresponding to the sixth calculation process is set to 0.2 Vdc, and the offset voltage Vh corresponding to the seventh calculation process is set to −0.2 Vdc.

As illustrated in FIG. 40, after the selection of the sixth calculation process has continued in period T1, the process is switched from the sixth calculation process to the seventh calculation process, and after the selection of the seventh calculation process has continued in period T2, the process is switched from the seventh calculation process to the sixth calculation process.

In this way, the first offset calculator 7a and the second offset calculator 7b each alternately select the sixth calculation process and the seventh calculation process at a previously established timing. Desirably, the period T1 and the period T2 are set to the same value, and when set in this way, the sixth calculation process and the seventh calculation process are switched at a uniform time period.

Here, for example, if the switching from the sixth calculation process to the seventh calculation process does not occur, and the selection of the sixth calculation process is continued, then in the first power converter 4a and the second power converter 4b, the activation time of the high potential-side switching elements is shorter than the activation time of the low potential-side switching elements, and a balance in heat generation cannot be achieved. Similarly, if the switching from the seventh calculation process to the sixth calculation process does not occur, and the selection of the seventh calculation process is continued, then in the first power converter 4a and the second power converter 4b, the activation time of the high potential-side switching elements is longer than the activation time of the low potential-side switching elements, and a balance in heat generation cannot be achieved.

However, as illustrated in FIG. 40, by implementing switching from the sixth calculation process to the seventh calculation process, it is possible to improve the balance in heat generation, between the high potential-side switching elements and the low potential-side switching elements, in the first power converter 4a and the second power converter 4b.

In the third to seventh embodiments, a case has been described in which the first calculation process and the second calculation process are switched in accordance with the difference between the first medium phase voltage command Vmid1 and the first minimum phase voltage command Vmin1, and the third calculation process and the fourth calculation process are switched in accordance with the difference between the second medium phase voltage command Vmid2 and the second minimum phase voltage command Vmin2.

However, in the third to seventh embodiments, the first calculation process and the second calculation process may be switched, and furthermore the third calculation process and the fourth calculation process may be switched, in accordance with the voltage phase input from the voltage phase calculator 10, in the manner described in the second embodiment.

The invention claimed is:

1. A power conversion device to which a DC power source which outputs DC voltage and an AC rotary machine having a first three-phase coil and a second three-phase coil are connected,
the power conversion device comprising:
  a first power converter having a first high potential-side switching element and a first low potential-side switching element, and converting the DC voltage supplied from the DC power source into a first AC voltage and applying the first AC voltage to the first three-phase coil;
  a second power converter having a second high potential-side switching element and a second low potential-side switching element, and converting the DC voltage supplied from the DC power source into a second AC voltage and applying the second AC voltage to the second three-phase coil;
  a control unit which respectively controls the first high potential-side switching element and the first low potential-side switching element, and the second high potential-side switching element and the second low potential-side switching element;
  a first current detector which detects a first three-phase current flowing in the first three-phase coil; and
  a second current detector which detects a second three-phase current flowing in the second three-phase coil, wherein
  the control unit includes:
    a voltage command calculator which calculates a first three-phase voltage command for the first three-phase coil and a second three-phase voltage command for the second three-phase coil on the basis of a control command to the AC rotary machine, and outputs the calculated first three-phase voltage command and second three-phase voltage command;
    an offset calculator which calculates a first three-phase application voltage to be applied to the first three-phase coil from the first three-phase voltage command input from the voltage command calculator and outputs the calculated first three-phase application voltage, and also calculates a second three-phase application voltage to be applied to the second three-phase coil from the second three-phase voltage command input from the voltage command calculator and outputs the calculated second three-phase application voltage; and
    a switching signal generator which outputs a first switching signal to the first high potential-side switching element and the first low potential-side switching element by comparing the first three-phase application voltage input from the offset calculator with a first carrier wave signal, and outputs a second switching signal to the second high potential-side switching element and the second low potential-side switching element by comparing the second three-phase application voltage input from the offset calculator with a second carrier wave signal having a phase difference of 180° with respect to the first carrier wave signal; and
  when voltage commands in the first three-phase voltage command input from the voltage command calculator are taken to be a first maximum phase voltage command, a first medium phase voltage command, and a first minimum phase voltage command, in order of decreasing magnitude, and voltage commands in the second three-phase voltage command input from the voltage command calculator are taken to be a second maximum phase voltage command, a second medium phase voltage command and a second minimum phase voltage command, in order of decreasing magnitude, then
  the offset calculator,
  in accordance with a first differential value which is a difference between the first medium phase voltage command and the first minimum phase voltage command, wherein the first differential value is a first differential voltage value,
  executes a first calculation process for calculating the first three-phase application voltage by changing all of the voltage commands in the first three-phase voltage command by the same amount mutually in such a manner that the voltage applied to a phase corresponding to the minimum phase voltage command becomes equal to a minimum value of the first carrier wave signal, wherein the minimum value is a minimum voltage value, when the first differential value is equal to or greater than a previously established reference voltage threshold value;
  executes a second calculation process for calculating the first three-phase application voltage from the first three-phase voltage command in such a manner that the voltage applied to a phase corresponding to the first minimum phase voltage command is equal to or greater than a reference voltage lower limit value, which is a sum of the reference voltage threshold value and the minimum value of the first carrier wave signal, when the first differential value is less than the reference voltage threshold value, wherein the first switching signal is based on the first calculation process or the second calculation process; and
  in accordance with a second differential value which is a difference between the second medium phase voltage command and the second minimum phase voltage command, wherein the second differential value is a second differential voltage value;
  executes a third calculation process for calculating the second three-phase application voltage by changing all of the voltage commands of the second three-phase voltage command by the same amount mutually in such a manner that the voltage applied to a phase corresponding to the second minimum phase voltage command is equal to the minimum value of the second carrier wave signal, when the second differential value is equal to or greater than the reference voltage threshold value; and executes a fourth calculation process for calculating the second three-phase application voltage from the second three-phase voltage command in such a manner that the voltage applied to a phase corresponding to the second minimum phase voltage command is equal to or greater than the reference voltage lower limit value, when the second differential value is less than the reference voltage threshold value, wherein the second switching signal is based on the third calculation process or the fourth calculation process.

2. The power conversion device according to claim 1, wherein the offset calculator, in the second calculation process, calculates the first three-phase application voltage by setting all of the voltage commands in the first three-phase voltage command as the first three-phase application voltage; and in the fourth calculation process, calculates the second three-phase application voltage by setting all of the voltage commands in the second three-phase voltage command as the second three-phase application voltage.

3. The power conversion device according to claim 1, wherein the offset calculator, in the second calculation process, calculates the first three-phase application voltage by changing all of the voltage commands of the first three-phase voltage command by the same amount mutually in such a manner that the voltage applied to a phase corresponding to the first minimum phase voltage command is equal to or greater than the reference voltage lower limit value; and in the fourth calculation process, calculates the second three-phase application voltage by changing all of the voltage commands in the second three-phase voltage command by the same amount mutually in such a manner that the voltage applied to a phase corresponding to the second minimum phase voltage command is equal to or greater than the reference voltage lower limit value.

4. The power conversion device according to claim 3, wherein the offset calculator, in the second calculation process, changes all of the voltage commands of the first three-phase voltage command by the same amount mutually in a negative direction in which the voltage applied to a phase corresponding to the first minimum phase voltage command approaches the reference voltage lower limit value; and in the fourth calculation process, changes all of the voltage commands of the second three-phase voltage command, by the same amount mutually, in a negative direction in which the voltage applied to a phase corresponding to the second minimum phase voltage command approaches the reference voltage lower limit value.

5. The power conversion device according to claim 4, wherein the offset calculator, when executing calculation processing by a combination of the first calculation process and the fourth calculation process, changes all of the voltage commands of the second three-phase voltage command by the same amount mutually in the negative direction, in the fourth calculation process; and when executing calculation processing by a combination of the second calculation process and the third calculation process, changes all of the voltage commands of the first three-phase voltage command by the same amount mutually in the negative direction, in the second calculation process.

6. The power conversion device according to claim 3, wherein the offset calculator, in the second calculation process, calculates the first three-phase application voltage by changing all of the voltage commands in the first three-phase voltage command by the same amount mutually in such a manner that the voltage applied to a phase corresponding to the first minimum phase voltage command is equal to or greater than the reference voltage lower limit value, and in such a manner that the voltage applied to a phase corresponding to the first maximum phase voltage command is equal to or lower than a maximum value of the first carrier wave signal; and in the fourth calculation process, calculates the second three-phase application voltage by changing all of the voltage commands in the second three-phase voltage command by the same amount mutually in such a manner that the voltage applied to a phase corresponding to the second minimum phase voltage command is equal to or greater than the reference voltage lower limit value, and in such a manner that the voltage applied to a phase corresponding to the second maximum phase voltage command is equal to or lower than a maximum value of the second carrier wave signal.

7. The power conversion device according to claim 6, wherein the offset calculator, in the second calculation process, changes all of the voltage commands of the first three-phase voltage command by the same amount mutually in a positive direction in which the voltage applied to a phase corresponding to the first maximum phase voltage command approaches the maximum value of the first carrier wave signal; and in the fourth calculation process, changes all of the voltage commands of the second three-phase voltage command by the same amount mutually in a positive direction in which the voltage applied to a phase corresponding to the second maximum phase voltage command approaches the maximum value of the second carrier wave signal.

8. The power conversion device according to claim 6, wherein the offset calculator, in the second calculation process, changes all of the voltage commands of the first three-phase voltage command by the same amount mutually in a positive direction in which the voltage applied to a phase corresponding to the first maximum phase voltage command approaches a reference voltage upper limit value which is a difference between the maximum value of the first carrier wave signal and the reference voltage threshold value; and in the fourth calculation process, changes all of the voltage commands of the second three-phase voltage command by the same amount mutually in a positive direction in which the voltage applied to a phase corresponding to the second maximum phase voltage command approaches the reference voltage upper limit value.

9. The power conversion device according to claim 1, wherein the control unit further includes:

a voltage phase calculator which calculates a voltage phase from at least one of the first three-phase voltage command and the second three-phase voltage command and outputs the calculated voltage phase; and the offset calculator executes a calculation process of one of the first calculation process and the second calculation process in accordance with the voltage phase input from the voltage phase calculator, instead of the difference between the first medium phase voltage command and the first minimum phase voltage command, depending on whether or not the voltage phase is within a previously established specific range; and executes a calculation process of one of the third calculation process and the fourth calculation process in accordance with the voltage phase input from the voltage phase calculator, instead of the difference between the second medium phase voltage command and the second minimum phase voltage command, depending on whether or not the voltage phase is within the specific range.

10. The power conversion device according to claim 1, wherein the offset calculator, in cases where the rotational speed of the AC rotary machine is equal to or lower than a rotational speed threshold value, or where the current command to the AC rotary machine is equal to or lower than the current command threshold value, or where the amplitude of the first three-phase voltage command is equal to or lower than an amplitude threshold value;

executes, instead of the first calculation process, the second calculation process, the third calculation process and the fourth calculation process, a fifth calculation process, in which the first three-phase application voltage is calculated from the first three-phase voltage command in such a manner that a first average voltage, which is the average value of the application voltages in the first three-phase application voltage, becomes 0, and the second three-phase application voltage is calculated from the second three-phase voltage command, in such a manner that a second average voltage, which is the average value of the application voltages in the second three-phase application voltage, becomes 0.

11. The power conversion device according to claim 1, wherein the offset calculator, in cases where the rotational speed of the AC rotary machine is equal to or lower than a rotational speed threshold value, or where the current command to the AC rotary machine is equal to or lower than the current command threshold value, or where the amplitude of the first three-phase voltage command is equal to or lower than an amplitude threshold value, executes, instead of the first calculation process, the second calculation process, the third calculation process and the fourth calculation process, a sixth calculation process in which the first three-phase application voltage is calculated from the first three-phase voltage command in such a manner that a first average voltage, which is the average value of the application voltages in the first three-phase application voltage, becomes a first set voltage value which is less than 0, and the second three-phase application voltage is calculated from the second three-phase voltage command, in such a manner that a second average voltage, which is the average value of the application voltages in the second three-phase application voltage, becomes the first set voltage value.

12. The power conversion device according to claim 1, wherein the offset calculator, in cases where the rotational speed of the AC rotary machine is equal to or lower than a rotational speed threshold value, or where the current command to the AC rotary machine is equal to or lower than the current command threshold value, or where the amplitude of the first three-phase voltage command is equal to or lower than an amplitude threshold value;

executes, instead of the first calculation process, the second calculation process, the third calculation process and the fourth calculation process, a seventh calculation process in which the first three-phase application voltage is calculated from the first three-phase voltage command in such a manner that a first average voltage, which is the average value of the application voltages in the first three-phase application voltage, becomes a second set voltage value which is greater than 0, and the second three-phase application voltage is calculated from the second three-phase voltage command, in such a manner that a second average voltage, which is the average value of the application voltages in the second three-phase application voltage, becomes the second set voltage value.

13. The power conversion device according to claim 1, wherein the offset calculator, in cases where the rotational speed of the AC rotary machine is equal to or lower than a rotational speed threshold value, or where the current command to the AC rotary machine is equal to or lower than the current command threshold value, or where the amplitude of the first three-phase voltage command is equal to or lower than an amplitude threshold value, executes, instead of the first calculation process, the second calculation process, the third calculation process and the fourth calculation process, in alternately switching fashion, a sixth calculation process in which the first three-phase application voltage is calculated from the first three-phase voltage command in such a manner that a first average voltage, which is an average value of the application voltages in the first three-phase application voltage, becomes a first set voltage value which is less than 0, and the second three-phase application voltage is calculated from the second three-phase voltage command, in such a manner that a second average voltage, which is an average value of the application voltages in the second three-phase application voltage, becomes the first set voltage value; and a seventh calculation process in which the first three-phase application voltage is calculated from the first three-phase voltage command in such a manner that a first average voltage, which is an average value of the application voltages in the first three-phase application voltage, becomes a second set voltage value which is greater than 0, and the second three-phase application voltage is calculated from the second three-phase voltage command, in such a manner that a second average voltage, which is an average value of the application voltages in the second three-phase application voltage, becomes the second set voltage value.

14. The power conversion device according to claim 1, wherein the reference voltage threshold value is determined from activation times required for detection of currents by the first current detector and the second current detector respectively.

* * * * *